(12) United States Patent
Wilken et al.

(10) Patent No.: US 7,716,737 B2
(45) Date of Patent: May 11, 2010

(54) CONNECTION BASED DETECTION OF SCANNING ATTACKS

(75) Inventors: Benjamin Wilken, Woodland Hills, CA (US); Massimiliano Antonio Poletto, Cambridge, MA (US)

(73) Assignee: Riverbed Technology, Inc., San Francisco, CA (US)

( * ) Notice: Subject to any disclaimer, the term of this patent is extended or adjusted under 35 U.S.C. 154(b) by 1495 days.

(21) Appl. No.: 10/701,404

(22) Filed: Nov. 3, 2003

(65) Prior Publication Data

US 2004/0199793 A1 Oct. 7, 2004

Related U.S. Application Data

(60) Provisional application No. 60/423,557, filed on Nov. 4, 2002, provisional application No. 60/427,294, filed on Nov. 18, 2002, provisional application No. 60/429,050, filed on Nov. 25, 2002.

(51) Int. Cl.
*G06F 12/14* (2006.01)
*H04L 29/06* (2006.01)

(52) U.S. Cl. .................. 726/22; 713/151; 709/224

(58) Field of Classification Search ............. 726/22, 726/23, 25
See application file for complete search history.

(56) References Cited

U.S. PATENT DOCUMENTS

| | | | |
|---|---|---|---|
| 5,550,807 A | 8/1996 | Kuroshita | |
| 5,978,568 A * | 11/1999 | Abraham et al. | 709/224 |
| 6,182,146 B1 * | 1/2001 | Graham-Cumming, Jr. | 709/238 |
| 6,269,330 B1 * | 7/2001 | Cidon et al. | 714/43 |
| 6,321,338 B1 | 11/2001 | Porras et al. | |
| 6,484,203 B1 * | 11/2002 | Porras et al. | 709/224 |
| 6,947,996 B2 * | 9/2005 | Assa et al. | 709/232 |
| 6,986,161 B2 | 1/2006 | Billhartz | |
| 7,043,759 B2 | 5/2006 | Kaashoek et al. | |
| 7,222,366 B2 * | 5/2007 | Bruton et al. | 726/23 |
| 7,234,168 B2 * | 6/2007 | Gupta et al. | 726/25 |
| 2001/0014868 A1 | 8/2001 | Herz et al. | |
| 2002/0031134 A1 | 3/2002 | Poletto et al. | |
| 2002/0032855 A1 * | 3/2002 | Neves et al. | 713/154 |
| 2002/0032871 A1 * | 3/2002 | Malan et al. | 713/201 |
| 2002/0069200 A1 | 6/2002 | Cooper et al. | |
| 2002/0095492 A1 | 7/2002 | Kaashoek et al. | |
| 2003/0069952 A1 | 4/2003 | Tams et al. | |
| 2003/0217039 A1 * | 11/2003 | Kurtz et al. | 707/1 |

(Continued)

OTHER PUBLICATIONS

Symantec Antivirus For Macintosh—SAM. Cupertino, CA, pp. 4-9, 4-10, 5-6, 5-7.

(Continued)

*Primary Examiner*—Kaveh Abrishamkar
(74) *Attorney, Agent, or Firm*—Park, Vaughn & Fleming LLP

(57) ABSTRACT

A system for detecting network intrusions and other conditions in a network is described. The system includes a plurality of collector devices that are disposed to collect data and statistical information on packets that are sent between nodes on a network. An aggregator device is disposed to receive data and statistical information from the plurality of collector devices. The aggregator device produces a connection table that maps each node on the network to a record that stores information about traffic to or from the node. The aggregator runs processes that determine network events from aggregating of anomalies into network events.

35 Claims, 42 Drawing Sheets

U.S. PATENT DOCUMENTS

| | | | | |
|---|---|---|---|---|
| 2003/0226034 | A1* | 12/2003 | Howard et al. | 713/201 |
| 2004/0015582 | A1* | 1/2004 | Pruthi | 709/224 |
| 2004/0199576 | A1* | 10/2004 | Tan | 709/203 |
| 2004/0215976 | A1* | 10/2004 | Jain | 713/201 |

OTHER PUBLICATIONS

Central Point Virus Detection, Removal and Prevention, 1991, pp. 46.

Steve Bellovin. DDoS Attacks and Pushback. NANOG2 1, Feb. 18, 2001 http:/1www.aciri.org/pushback.

Ratul Manajan, Steven M. Bellovin, Sally Floyd, Vern Paxson, Scott Shenker, and John Ioannidis. Controlling High Bandwidth Aggregates in the Network, draft paper, Feb. 2001. http://www.aciri.org/pushback.

Stefan Savage, David Wetherall, Anna Karlin and Tom Anderson. Practical Network Support for IP Traceback. Proceedings of 2000 ACM SIGCOMM. Stockholm, Sweden, Aug. 2000. http://www.cs.washington.edu/homes/savage/traceback.html.

Steve Bellovin. ICMP Traceback Messages. AT&T Labs Research, Mar. 2000. http://www.research.att.com/-smb/papers/draft-bellovin-itrace-00.txt.

Cisco. Characterizing and Timing Packet Floods Using Cisco Routers. http://www.cisco.com/warp/public/707/22.html.

D. Senie. RFC2644 (BCP34), Changing the Default for Directed Broadcasts in Routers. IETF, , Aug. 1999. http://w\nu.ietf.orglrfc/rfc2644.ixt.

P. Ferguson, D. Seine. RFC2827 (BCP38): Network Ingress Filtering: Defeating Denial of Service Attacks which employ IP Source Address Spoofing. IETF, May 2000. http://www.ietf.org1rfdrfc2827.txt.

David G. Andersen, Hari Balakrishnan, and M. Frans Kaashoek, Robert Moms. The Case for Resilient Overlay Networks . . . Proc. of HotOS-VIII, Schlosr Elmau, Germany, May 2001. http:Nnms.1cs.mit.edu/papers/ron-hotos20I0.pdf.

Cisco. Web-Site Security and Denial-of-Service Protection. http://www.cisco.com/warp/public/cdpd/si/11000/prodlit/cswwis.hc tm.

Analysis of a Denial of Service Attack on TCP by Schuba et a 1 Proceedings of the 1997 IEEE Symposium on Security and Privacy (IEEE Computer Society Press, May 1997.

Stefan Savage, David Wetherall, Anna Karlin and Tom Anderson. Practical Network Support for IP Traceback. Work in progress Technical Report UW-CSE-00-02-01. Date unknown. http://www.cs.washington.edu/homes/savagd~ceback.html.

Web page entitled "Agregate Based Congestion Control and Pushback" last modified Apr. 2001 Found at http://www.a~iri.or~/~~sh.

D. Song et al., "Advanced and Authenticated Marking Schemes for IP Traceback", Proc. IEEE MFOCOM, Apr. 2001, pp. 878-886.

R. Stone, "CenterTrack: An IP Overlay Network for Tracking DoS Floods", Proceedings of 9th USENIX Security Symposium, Denver, CO, Aug. 2000, pp. 199-212.

H. Burch et al., "Tracing Anonymous Packets to Their Approximate Source", Proc. USENIX LISA 00, Dec. 2000, pp. 319-327.

Ohta, Kohei Detection, Defense, and Tracking of Internet Wide Illegal Access in a Distributed Manner, INET Proceedings, Jul. 18-21, 2000.

* cited by examiner

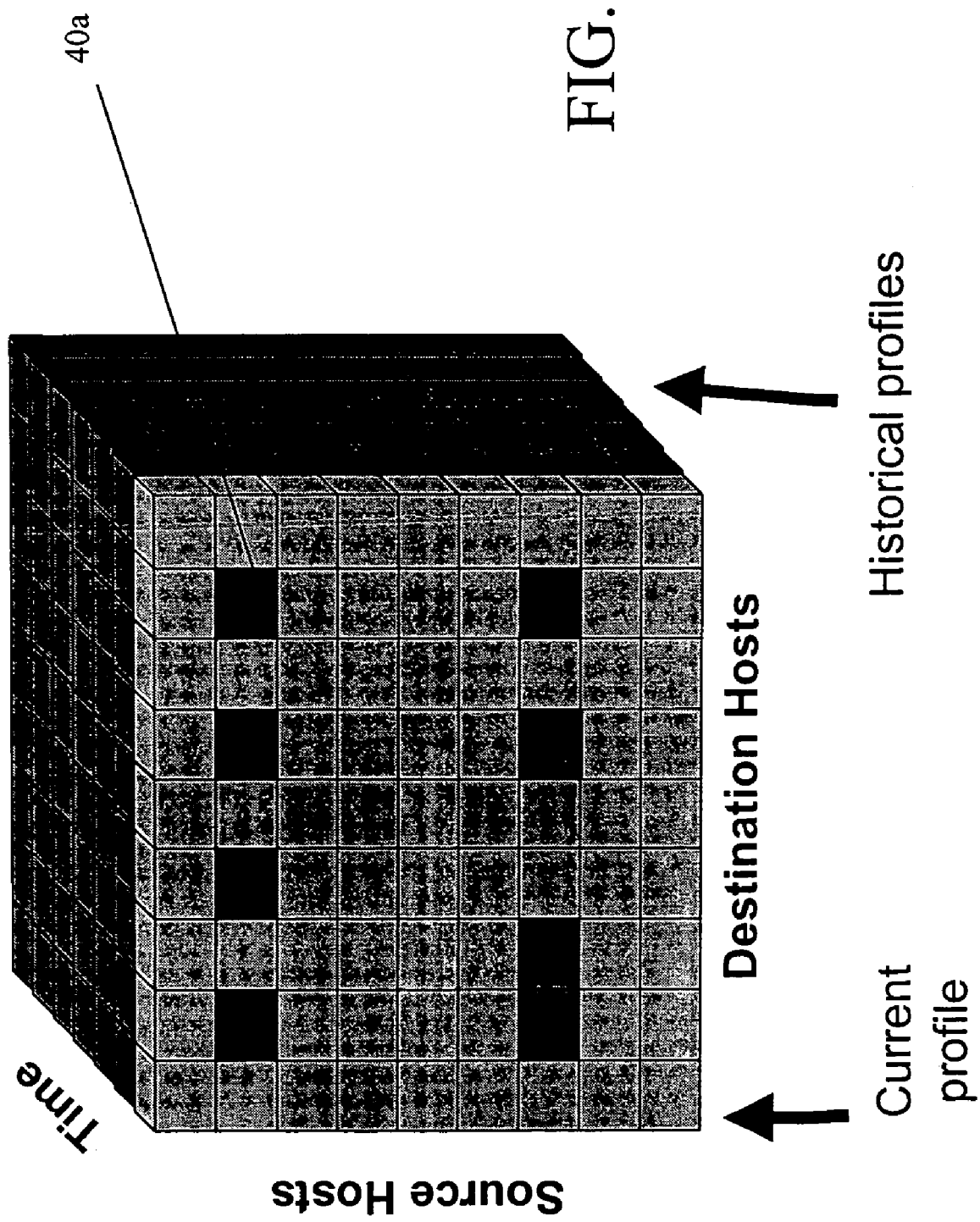

| Time Slice | Fri | Thu | Wed | ... | Sun | Sat | Fri |
|---|---|---|---|---|---|---|---|
| Services provided by A (Web Server) to B (Desktop) | | | | | | | |
| WWW (TCP:80) | | | | | | | |
| Bytes / sec | 2k | 3k | 1k | ... | 2k | 4k | 3k |
| Packets / sec | 5 | 6 | 2 | | 5 | 9 | 5 |
| Conn's. / hr | .3 | .5 | .3 | | .2 | .3 | .3 |
| SSH (TCP:22) | | | | | | | |
| Bytes / sec | 1k | 3k | 4k | ... | 1k | 2k | 3k |
| Packets / sec | 2 | 6 | 9 | | 2 | 5 | 6 |
| Conn's. / hr | .3 | .5 | .3 | | .3 | .3 | .5 |
| | | | | ... | | | |
| Services provided by B (Desktop) to A (Web Server) | | | | | | | |
| SSH (TCP:22) | | | | | | | |
| Bytes / sec | 21k | 0 | 0 | ... | 0 | 0 | 0 |
| Packets / sec | 10 | 0 | 0 | | 0 | 0 | 0 |
| Conn's. / hr | 1 | 0 | 0 | | 0 | 0 | 0 |

FIG. 5

CONNECTION BASED DETECTION OF SCANNING ATTACKS

This application claims the benefit of U.S. Provisional Application Ser. No. 60/423,557, filed Nov. 04, 2002 entitled "ALGORITHMS FOR NETWORK ANOMALY DETECTION IN THE MAZU NETWORK PROFILER"; U.S. Provisional Application Ser. No. 60/427,294, filed Nov. 18, 2002 entitled "ANOMALY DETECTION AND ROLE CLASSIFICATION IN A DISTRIBUTED COMPUTING NETWORK" and U.S. Provisional Application Ser. No. 60/429,050, filed Nov. 25, 2002 entitled "ROLE CLASSIFICATION OF HOSTS WITHIN ENTERPRISE NETWORKS BASED ON CONNECTION PATTERNS."

BACKGROUND

This invention relates to techniques to detect network anomalies.

Networks allow computers to communicate with each other whether via a public network, e.g., the Internet or private networks. For instance, many enterprises have internal networks (intranets) to handle communication throughout the enterprise. Hosts on these networks can generally have access to both public and private networks.

Managing these networks is increasingly costly, while the business cost of network problems becomes increasingly high. Managing an enterprise network involves a number of inter-related activities including establishing a topology, establishing policies for the network and monitoring network performance. Another task for managing a network is detecting and dealing with security violations, such as denial of service attacks, worm propagation and so forth.

SUMMARY

According to an aspect of the invention, a method of detecting scanning attacks includes adding host-pair connection records to a connection table each time a host accesses another host, at the end of a short update period, accessing the connection table to determine new host pairs, determining the number of new host pairs added to the table over the update period, and if a host has made more than a first threshold number "C1" host pairs, and the number of host pairs in the profile is smaller than the threshold number by a first factor value "C2", then indicating to a console that the new host is a scanner.

The constants "C1" and "C2" are adjustable thresholds. The connection table is a current time-slice connection table and host pair records are added to the current time slice connection table. The method aggregates records from the current time-slice table into a long update period table, checking for ping scans at the end of a long update period, and indicating hosts which produced more than "C3" new host pairs over the long update period.

According to an additional aspect of the invention, a method of detecting port scanning attacks includes retrieving from a connection table logged values of protocols and ports used for host pair connections in the table, determining if the number of ports used in the historical profile is considerably smaller by a factor "C1" than a current number of ports being scanned by a host and the current number is greater than a lower-bound threshold "C2", to record the anomaly and reporting a port scan to a console.

According to a still further aspect of the invention, a computer program product residing on a computer readable medium for detecting port scanning attacks, the computer program product includes instructions for causing a processor to retrieve from a connection table logged values of protocols and ports used for host pair connections in the table, determine if the number of ports used in the historical profile is considerably smaller by a factor "C1" than a current number of ports being scanned by a host and the current number is greater than a lower-bound threshold "C2", to record the anomaly, and report a port scan to a console.

According to a still further aspect of the invention, a apparatus includes circuitry for detecting scanning attacks, includes circuitry to add host-pair connection records to a connection table each time a host accesses another host, at the end of a short update period, accessing the connection table to determine new host pairs, circuitry to determine the number of new host pairs added to the table over the update-period, and if a host has made more than a first threshold number "C1" host pairs, and the number of host pairs in the profile is smaller than the threshold number by a first factor value "C2", then circuitry to indicate to a console that the new host is a scanner.

According to a still further aspect of the invention, a apparatus includes a processing device and a computer readable medium tangible embodying a computer program product for detecting scanning attacks, the computer program product comprising instructions for causing the processing device to add host-pair connection records to a connection table each time a host accesses another host, at the end of a short update period, accessing the connection table to determine new host pairs, determine the number of new host pairs added to the table over the update period and if a host has made more than a first threshold number "C1" host pairs, and the number of host pairs in the profile is smaller than the threshold number by a first factor value "C2", then indicate to a console that the new host is a scanner.

According to a still further aspect of the invention, a apparatus includes a processing device and a computer readable medium tangibly embodying a computer program product for detecting port scanning attacks, the computer program product comprises instructions for causing a processor to retrieve from a connection table logged values of protocols and ports used for host pair connections in the table determine if the number of ports used in the historical profile is considerably smaller by a factor "C1" than a current number of ports being scanned by a host and the current number is greater than a lower-bound threshold "C2", to record the anomaly and report a port scan to a console.

One or more aspects of the invention may provide one or more of the following advantages.

The scan detect process tracks ping scans with an application of the connection table. Each time a-host scans another host, a host pair record is added to the current time slice connection table. At the end of each short update period, the scan detect process accesses the time slice connection table to determine new host pairs that the process had not determined before in the profile. This will catch most ping scans since typically a ping scan will scan many hosts in a short time.

Stealthy ping scans ping the network slowly in order to avoid detection by many IDSs. Because a stealthy scan moves so slowly, the system will produce only a few new host pair records in each SUP. Over time the scan will still produce many new host pairs. The scan detect process detects stealthy scans by looking at the activity of each host over a longer period of time. The scan detection process thus examines host activity over a sufficiently long enough period of time to detect stealthy scans.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 4 is a block diagram depicting a connection table.
FIG. 5 is a block diagram depicting a record in the connection table.

DETAILED DESCRIPTION

Figure 1:
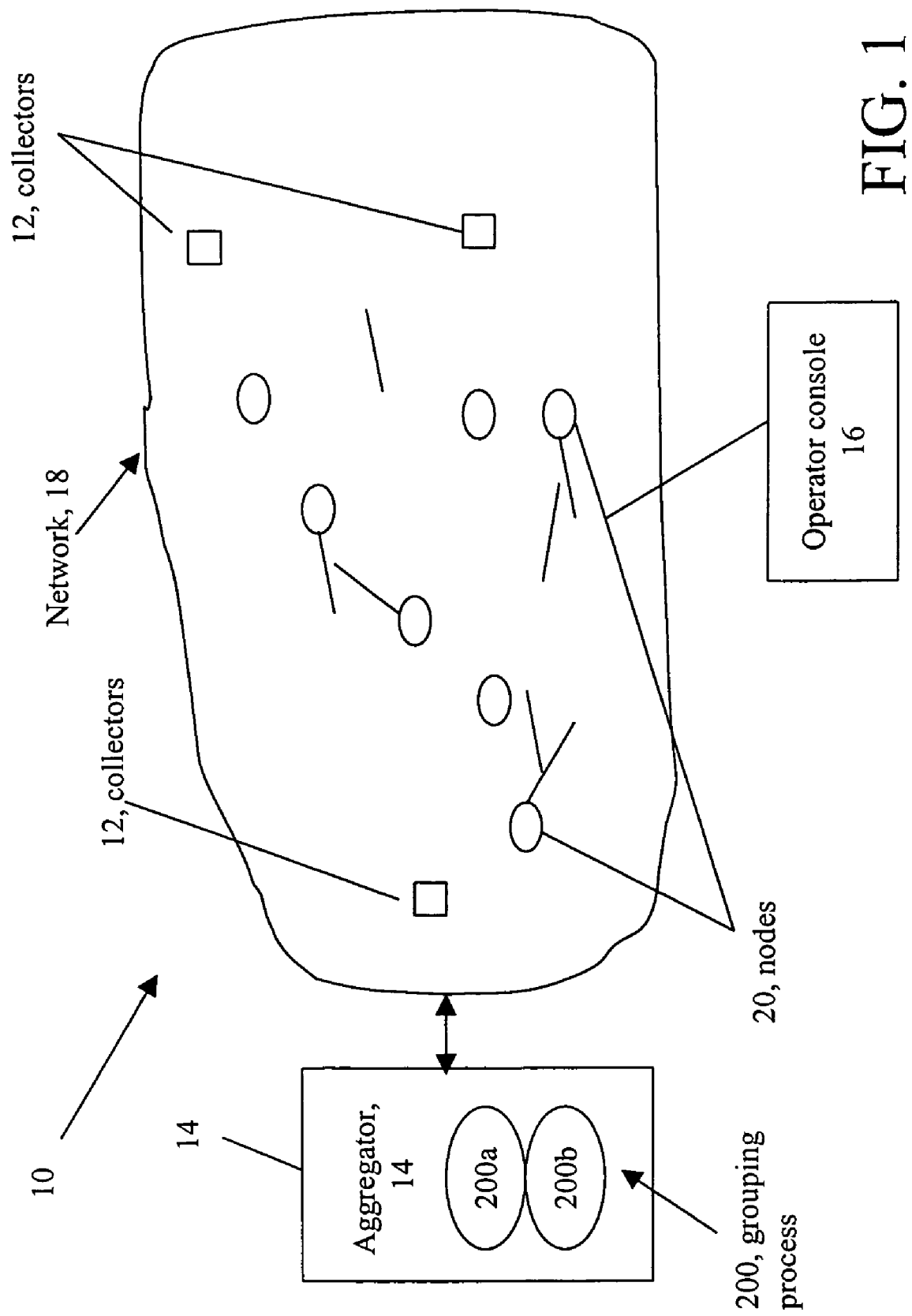
FIG. 1 is a block diagram of a network including anomaly detection.

Referring to FIG. 1, an anomaly detection system 10 to detect anomalies and process anomalies into events is shown. The anomaly detection system 10 can be used to detect denial of service attacks (DoS attacks), unauthorized access attempts, scanning attacks, worm propagation, network failures, and addition of new hosts in a network 18. The system 10 includes collector devices 12 and at least one aggregator device 14 and an operator console 16 that communicates with and can control collector devices 12 and the at least one aggregator device 14. The collector devices 12 and the at least one aggregator 14 are disposed in the network 18. The collector devices 12 connect to network devices, 15 e.g., switches, hosts, routers, etc. in line, or via a tap, e.g., using mirror, SPAN ports or other passive link taps. The collector devices 12 collect information such as source and destination addresses, transport protocol, source and destination ports, flags, and length. Periodically, the collector devices 12 send to the aggregator 14 a record of the number of packets, bytes, and connections between every host pair observed by the collector 12, broken down by port and protocol. In addition, the collector devices 12 send summary information concerning flags seen on TCP packets.

The aggregator 14 can also execute a grouping process 200 that efficiently partitions hosts on a network into groups in a way that exposes the logical structure of the network 18. The grouping process 200 assigns nodes to groups and includes a classification process 200a that classifies hosts by groups and a correlation process 200b that correlates groups. Details of the grouping process are discussed below.

Figure 2:
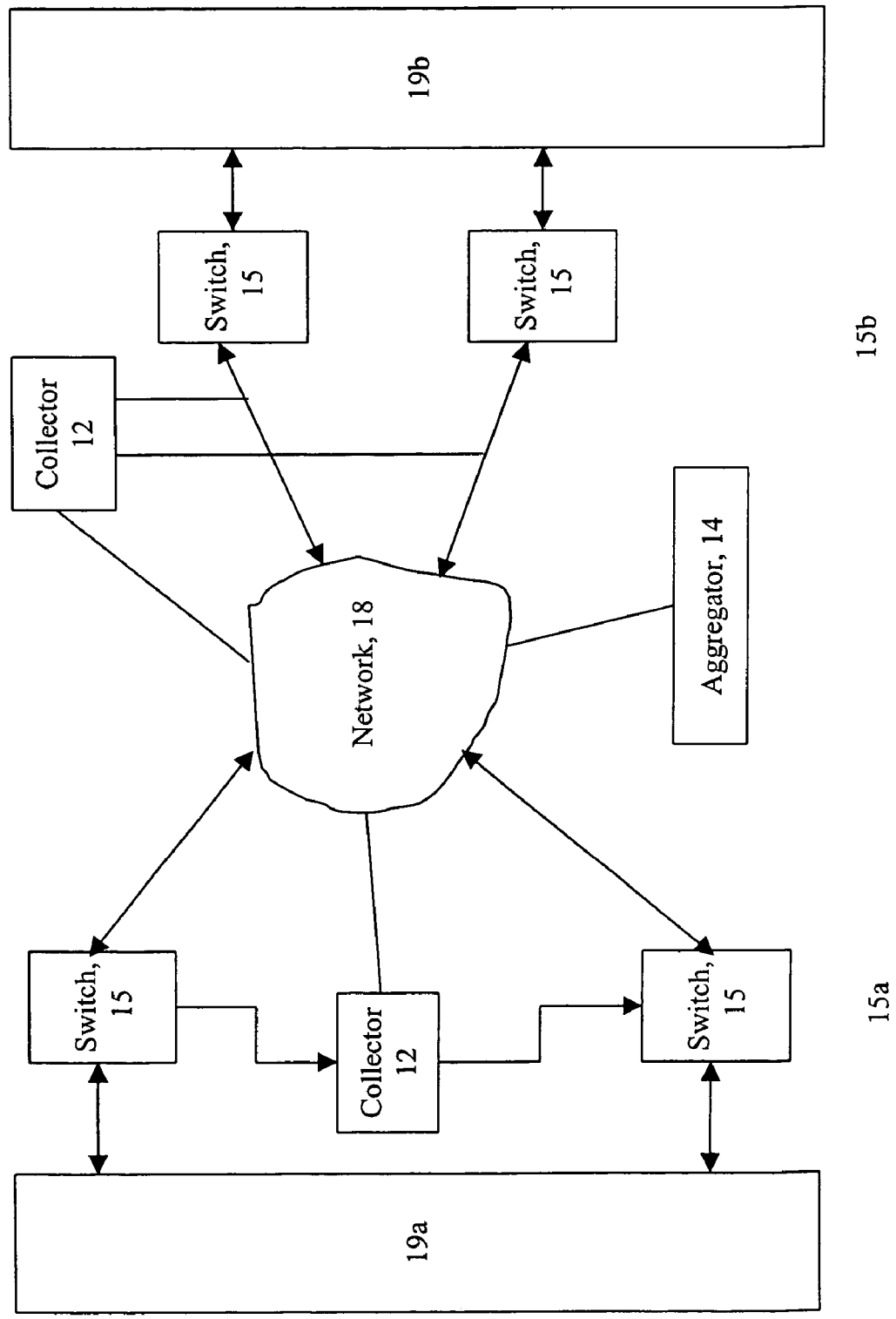
FIG. 2 is a block diagram depicting exemplary details of anomaly detection.

Referring to FIG. 2, collectors 12 are shown disposed to sample or collect information from network devices 15, e.g., switches as shown. The collector devices 12 send the information to the aggregator 14 over the network 18. The collectors 12 in one configuration sample all traffic from a downstream network 19a provided that the traffic traverses the switches 15, whereas in another configuration the collectors 12 sample traffic from downstream network 19b that enters and leaves the switches 15.

The architecture is based on an examination of current bytes/second, packets/second, connections/hour statistics, and so forth. The architecture compares these to historical data. The data collectors are devices that are coupled actively or passively on a link and collect the above mentioned as well as other statistics. Data collects 12 can be connected via a tap or can span port on a monitored device (e.g., router, etc.) over intervals of time. Over such intervals of time, e.g., every 30 seconds, the data collectors 12 send reports (not shown) to an aggregator. The report can be sent from the data collector to the aggregator over the network being monitored or over a hardened network (not shown).

There are a defined number of sources, a defined number of destinations, and a defined number of protocols on a given network. Over a defined interval (typically 30 seconds), the data collectors 12 monitor all connections between all pairs of hosts and destinations using any of the defined protocols. At the end of each interval, these statistics are summarized and reported to the aggregator 14. The values of the collected statistics are reset in the data collectors after reporting. The number of connections between ports using an unknown protocol is also monitored.

If more than one data collector saw the same source and destination communicating, the following could have occurred. The data collectors could be in parallel and each saw a portion of the communication. Alternatively, the data collectors could be in series and both data collectors saw the entire communication. Given the rate at which parallel connections may change, the aggregator assumes that the data collectors are in a series connection. The maximum of two received values is taken as a value for the connection and it is assumed that the lower value reflects dropped packets. Other arrangements are possible.

Figure 2A:
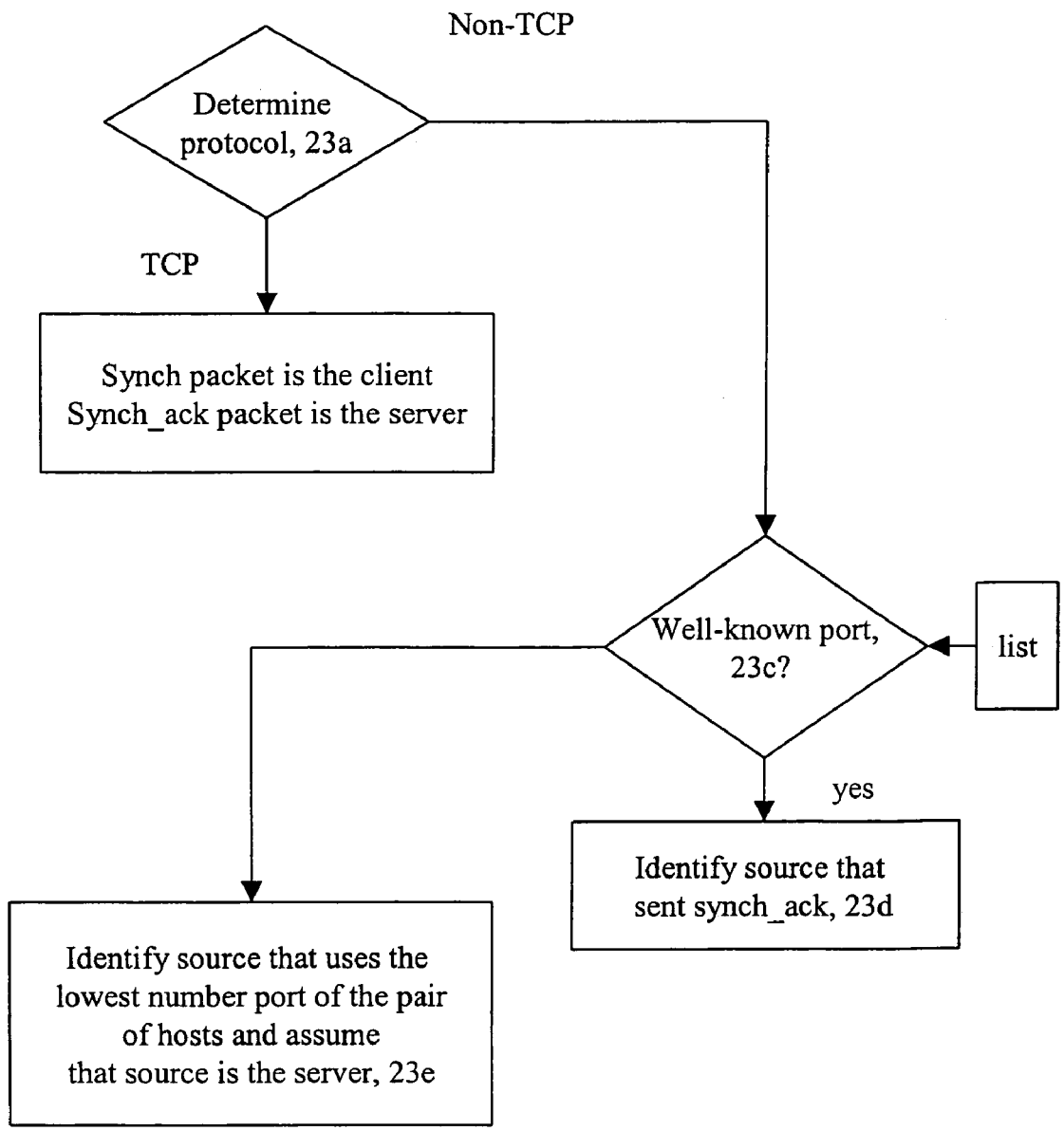
FIG. 2A is a flow chart of a process to identify client server pairs.

Referring to FIG. 2A, an aspect of data collection 22 on the collectors 12 is shown. Data collection is used to collect connection information to identify host connection pairs. Data collection uses heuristics to identify connections such as host A sending packets to host B, host B sending packets to host A. In addition, the data collection 22 determines host $A_{client}$ host $B_{server}$ and host $B_{client}$ and host $A_{server}$. To determine when hosts A and B are operating as clients or servers, data collection process determines 23a the protocol used in a connection. If the protocol is TCP, then the process identifies 23b, which host sent a sync packet, and which host sent a synch_ack packet. The source of the sync packet is the client and the source of the synch_ack is the server.

If the protocol is not TCP, e.g., UDP, the data collectors 12 will determine the ports that the hosts communicate over. If the hosts are transacting over a well-know port 23c, the data collector will examine a list of well-know ports. The list will determine 23d the source of the server from the list. The list is populated with identifications of hosts and is populated by a process that looks at previous sources of synch_ack packets. The host that sends the synch_ack packet back is assumed to be the server.

If a connection involves two ports, neither of which is known 23e, then the process will assume that the host that connects to the lower port number is the server process.

The host server/client statistics are useful in anomaly detection. For instance, these statistics are useful when attempting to identify worm intrusions and other types of intrusions.

Figure 3:
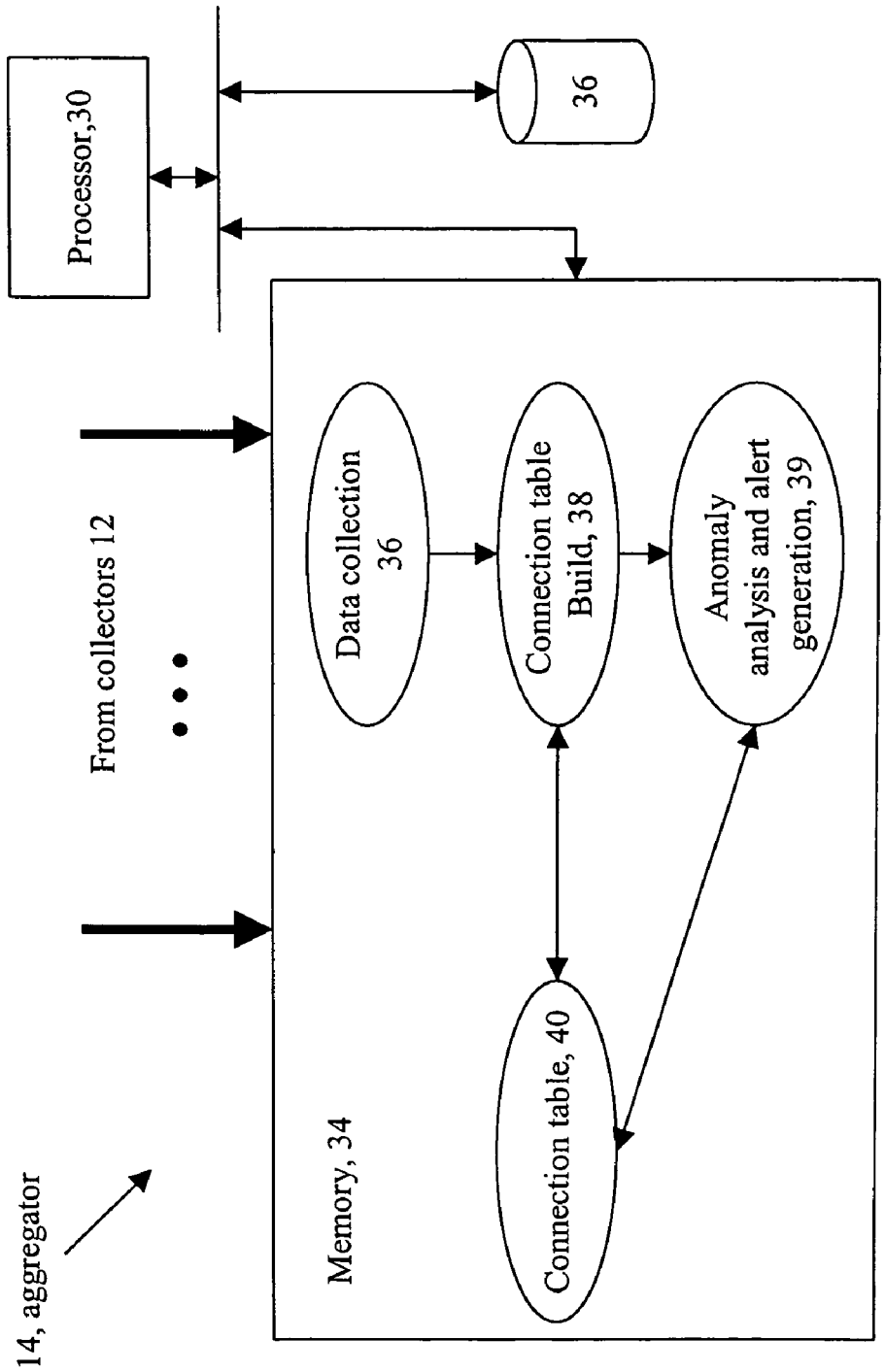
FIG. 3 is a block diagram depicting an aggregator.

Referring to FIG. 3, the aggregator 14 is a device (a general depiction of a general purpose computing device is shown) that includes a processor 30 and memory 32 and storage 34. Other implementations such as Application Specific Integrated Circuits are possible. The aggregator 14 includes a process 36 to collect data from collectors 12 and a process 38 to produce a connection table 40. In addition, the aggregator includes anomaly analysis and event process 39 to detect anomalies and process anomalies into events that are reported to the operator console or cause the system 10 to take action in the network 18. Anomalies in the connection table can be identified as events including denial of service attacks, unauthorized access attempts, scanning attacks, worm propagation, network failures, addition of new hosts, and so forth.

Referring to FIG. 4, the connection table 40 is a data structure that maps each host (e.g., identified by IP address) to a "host object" that stores information about all traffic to or from that host. In one implementation of the table, source address is one dimension, destination is a second dimension and time is a third dimension. The time dimension allows a current record and historical records to be maintained.

Using IP addresses to uniquely identify hosts could be inadequate in environments with dynamic DHCP assignments. Thus alternatively, the administrator can configure a DHCP server to produce a MAC address to IP address map. The MAC address to IP address map is sent as a flat file to the aggregator 14. Thereafter, when a data collector 12 reports an IP address and counter to/from values, the aggregator 14, for each IP address checks in the most recent map. If the IP address is found in the map, then the host is managed by a DHCP server and the host ID is the host's MAC address, otherwise the Host ID is the host IP address.

The host object, e.g., 40a of a host "A" also maps any host (IP address) "B" with which "A" communicates to a "host pair record" that has information about all the traffic from "A" to "B" and "B" to "A". This two-level map enables the system 10 to efficiently obtain summary information about one host and about the traffic between any pair of hosts, in either direction.

Hashing is used to "lookup or update" information about any host or host pair on the network 18. The connection table 40 includes additional structure to allow efficient traversal of all hosts or host pairs and supports efficient representation of groups of related hosts, e.g., a role grouping mechanism as discussed below. Alternatively, the role grouping can be stored separately from the connection table.

The connection table uses a hash map from host identifiers (IP or MAC addresses) to "Host" objects, as discussed. Each Host object maintains aggregate traffic statistics for the associated host ("H"), and a hash map (a 2nd level hash map) from host identifiers (IP addresses) of peers of host H (i.e., hosts that host H had communicated with) as "HostPair" objects. Each HostPair object maintains traffic statistics for each pair of hosts (H and H's peer). To allow more efficient, analysis HostPair objects are duplicated across Host objects. For instance, the HostPair "AB" is maintained both in the hash map within Host "A" and in the hash map within Host "B." Group information is embedded in the connection table, with each Host object storing information about the group that the associated host belonged to. The connection table maintains a list of all groups and their member hosts.

Figure 4A:
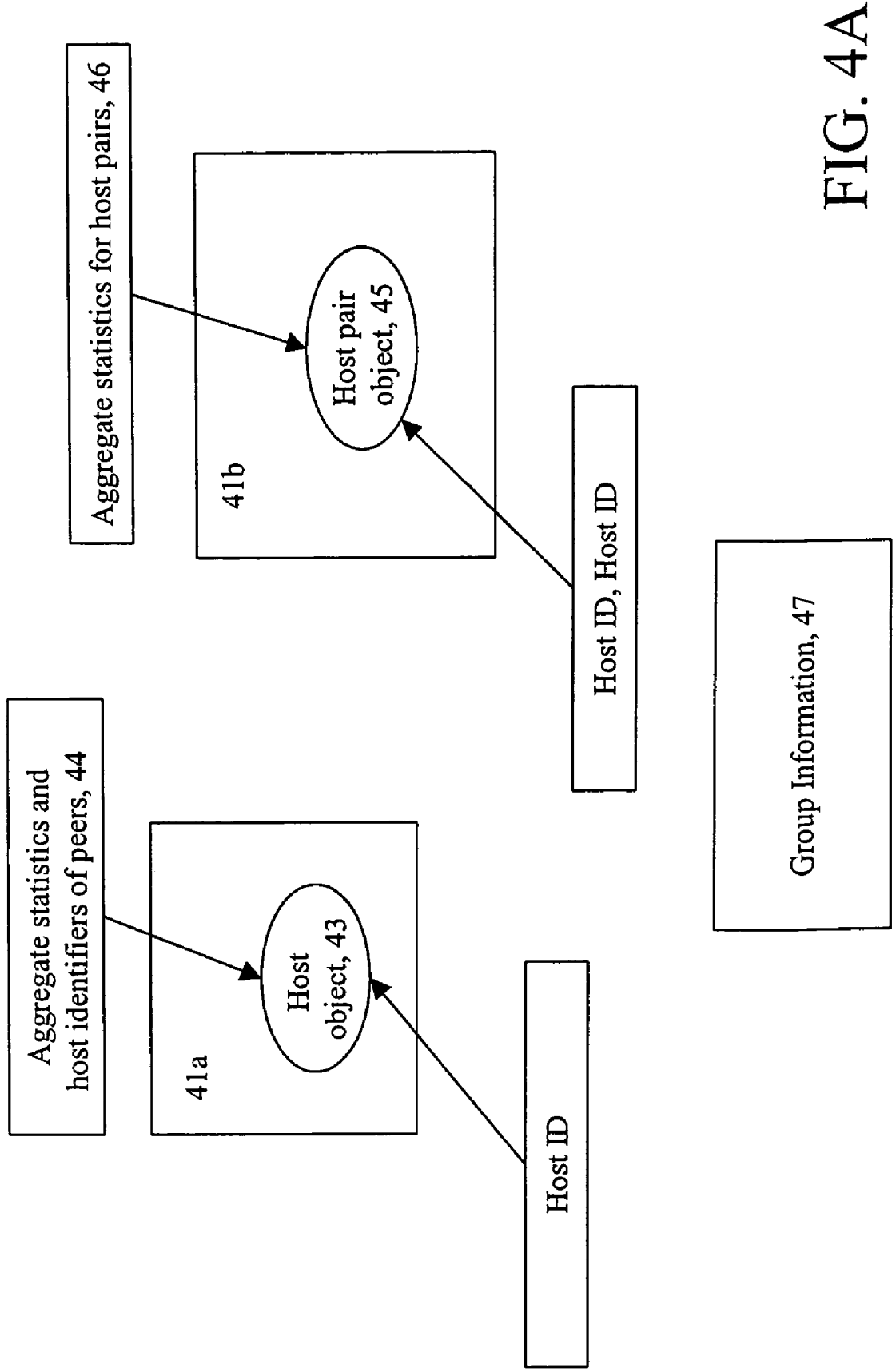
FIG. 4A is a block diagram of an alternative connection table.

Referring to FIG. 4A, in an alternative implementation 41 of the connection table 40, the connection table 41 is split into two hash maps 41a and 41b, a "host hash" map 41a and a "host pair" hash map 41b. The "host hash" map 41a maps host identifiers (IP or MAC addresses) to new Host objects 43. Each new Host object 43 has the aggregate traffic statistics for the associated host, as well as a list of the host identifiers (IP or MAC addresses) of all the peers of that host 44. The "host pair" hash map 41b maps pairs of host identifiers to Host Pair objects 45 that maintain traffic statistics 46 for pairs of hosts. In this implementation Host Pair objects 45 need not be longer duplicated, as discussed above.

For example, if host A and host B communicate, then the host map has a Host object 43 for A that lists B as a peer, the host map has a Host object 43 for B that lists A as a peer, and the host pair map has a Host Pair object 45 for AB. Group information is stored in a separate table 47 that is loaded, saved, and otherwise managed separately from the traffic statistics in the connection table. It does not need to be in memory unless it is actually needed.

Factoring out the group information and moving from many hash maps (top level map, plus one 2nd level map per Host object) to just two makes this implementation of the connection table more compact and decreases memory fragmentation, improving aggregator performance and scalability.

In one embodiment, only "internal hosts" (defined based on configurable IP address ranges) are tracked individually as described above. The aggregator 14 buckets all other ("external") hosts into a fixed number of bins according to 8- or 16-bit CIDR (Classless Inter-domain Routing) prefix. This approach preserves memory and computational resources for monitoring of the internal network 18 but still provides some information about outside traffic. Other arrangements are possible, for instance bucketing can be turned off if desired, so that each external host is tracked individually.

Referring to FIG. 5, exemplary contents of the host object 40a are depicted. Similar statistics can be collected for host objects 43. As shown, the contents of the host object 40a in the connection table 40 include a measure of the number of bytes, packets, and connections that occurred between hosts during a given time-period, here on a daily basis. Data is broken down per-protocol for every well-known transport protocol (e.g., TCP, UDP, ICMP, and the 132 others defined by the "Internet Assigned Numbers Authority" and for several hundred well-known application-level protocols (e.g., SSH, HTTP, DNS, and so forth). For every application-level protocol, and for every pair of hosts "A" and "B", the Connection Table stores statistics for traffic from host A to host B and from host B to host A both for the case where "A" is the server and the case where "B" is the server. Unknown protocols are counted together.

Since most hosts only use a small fraction of the well-known protocols, the footprint of the data structure is kept manageable by storing protocol-specific records as (protocol, count) key-value pairs. Further, since the protocol distribution is typically skewed (a few protocols account for the majority of traffic on each host), key-value pairs are periodically sorted by frequency to improve amortized update time.

Individual host records have no specific memory limit. If a particular host connects with many other hosts and uses many protocols, all that information will be recorded. However, the total memory used by the Aggregator 14 is bounded in order to avoid denial of service attacks on the Aggregator 14. For example, an attacker spoofing random addresses can cause the Aggregator 14 to allocate new host structures and quickly consume memory. If an Aggregator ever exceeds a memory utilization threshold "m_{hi}", it de-allocates records until its memory utilization falls below "m_{hi}". Several different algorithms can be used for picking records to de-allocate. Some of the algorithms that can be used include random eviction, picking low-connectivity hosts first, high-connectivity hosts first, and most recently added hosts first. Similar measures are also taken on the probes 12 to ensure high performance and limit Probe-Aggregator communication overhead.

Figure 6:
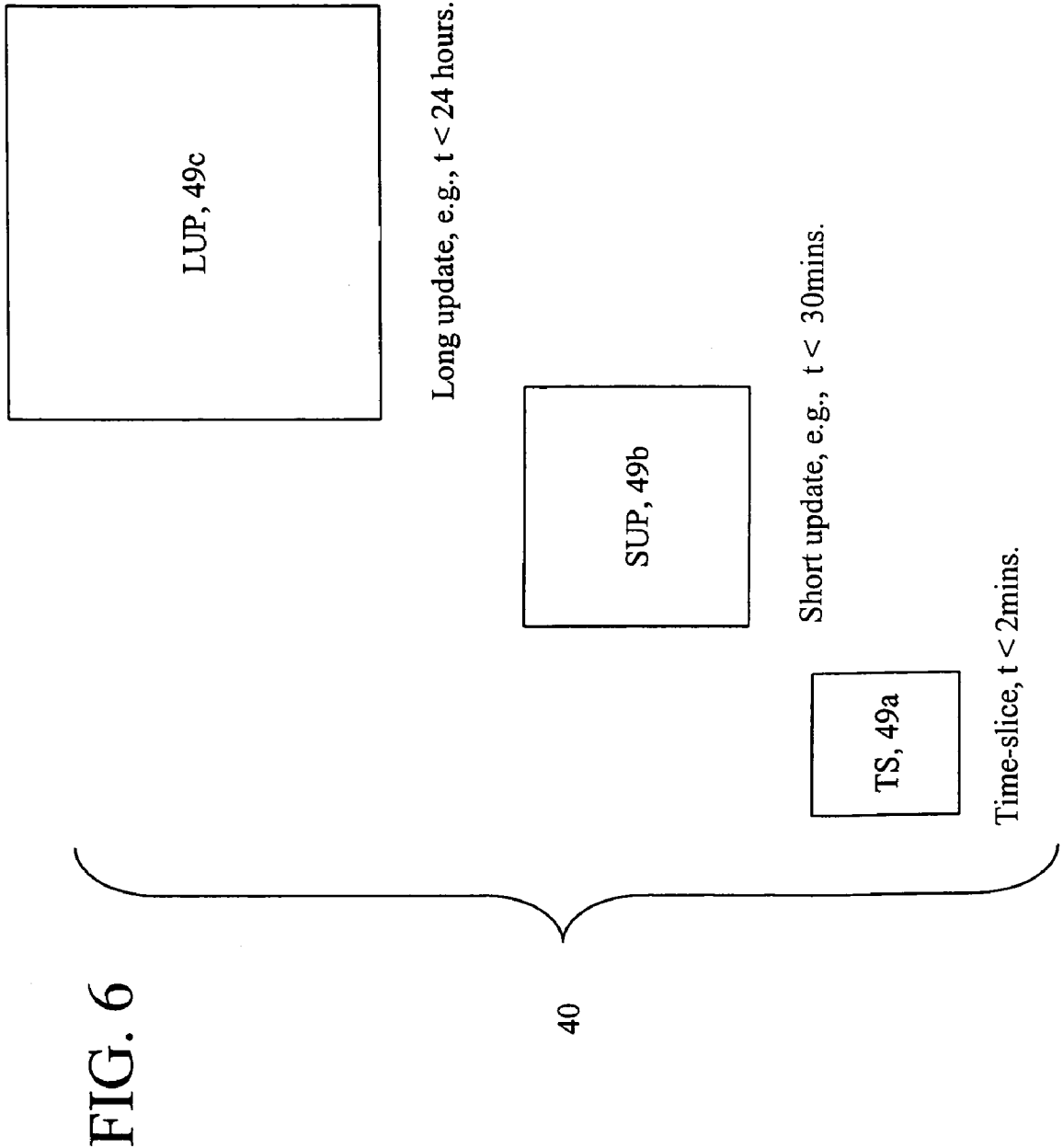
FIG. 6 is a block diagram depicting an arrangement of connection tables.

Referring to FIG. 6, the aggregator 14 uses different connection tables 40 to track data at different time scales. A first connection table 49a is a time-slice connection table that operates on the smallest unit of time, e.g., (a time-slice). A time-slice can be e.g., less than 30 seconds to maybe several minutes. The time-slice connection table is the sum of records received from all collectors during that the time-slice period, corrected for duplicates.

Aggregator analysis algorithms 39 operate primarily on a short update period (SUP} Connection Table 49b, which is the sum of time-slices across a period of, e.g., 10 to 30 minutes. A set of SUP connection tables is summed into a third connection table 49c covering a long update period (LUP), e.g., 2 to 24 hours. For each recorded parameter (such as TCP bytes from host "A" to host "B"), SUP and LUP tables track both the sum and sum of squares of values of the recorded parameter. These two values allow the aggregator to compute both the mean and variance of the recorded parameter across the table's time period. Given "N" samples $x_1$, $x_2$, ... $x_n$ mean is sum over the period of the samples divided by the number of samples. The variance is derived from the mean and sum of squares.

At the end of each long update period, that period's values are merged into a profile connection table that includes historical information for the corresponding period of the week. Merging uses the equation below for each value in the profile table. For instance, a LUP table covering the period 12 pm to 6 pm on a Monday is merged into a profile table with historical information about Mondays 12 pm to 6 pm. Values in the profile table are stored as exponentially weighted moving averages (EWMAs). At time "t", a new value "$x_t$" (from the LUP table, for example) is added to the EWMA for time "t−1", denoted by "$m_{t-1}$", to generate a new EWMA value according to the following Equation:

$$m_t = \alpha x_t + (1-\alpha) m_{t-1}$$

where $\alpha$ can be tuned to trade off responsiveness to new values against old ones. EWMAs provide a concise way of representing historical data (both values and variance) and adapting to gradual trends. Recent data is compared to historical profiles from the same time of, an historical time span, e.g., a week because the week is the longest time span that generally shows well-defined periodicity in traffic patterns. By spanning a week, the approach covers diurnal cycles and week/weekend cycles. Recurring events with longer time periods, for example, monthly payroll operations, are less likely to show similarly well-defined patterns.

A collector 12 should handle relatively high rates of network traffic. As the network grows and traffic volume increases, additional collectors 12 can be deployed in appropriate locations to tap new network traffic.

Figure 7:
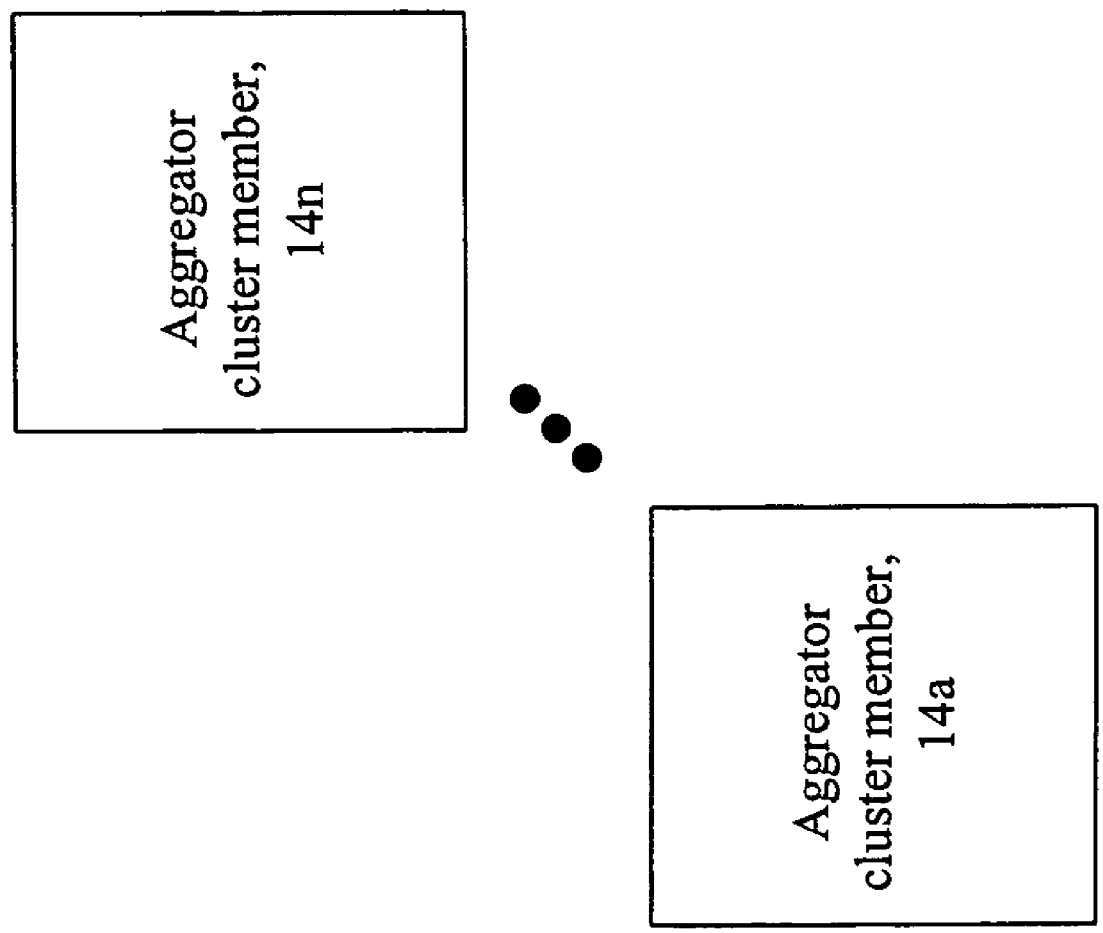
FIG. 7 is a block diagram depicting a clustered aggregator.

Referring to FIG. 7, factors affecting scalability of the Aggregator 14 include the amount of memory consumed by the connection tables and the time required for anomaly analysis algorithms to traverse the connection tables. As a result, connection tables can be distributed across multiple physical hosts. That is, the aggregator 14 can be configured as a cluster of aggregator members 14a-14n, such that the aggregator can grow over time to meet additional processing load. Each host record and its associated host pair records have enough information that they can be processed independently by analysis algorithms as discussed below. Information about different hosts can be dispatched to different cluster members 14a-14n and identical sets of algorithms run on all the cluster members 14a-14n. Furthermore, individual analysis algorithms can be implemented as independent threads, in a multiprocessor platform.

Figure 8:
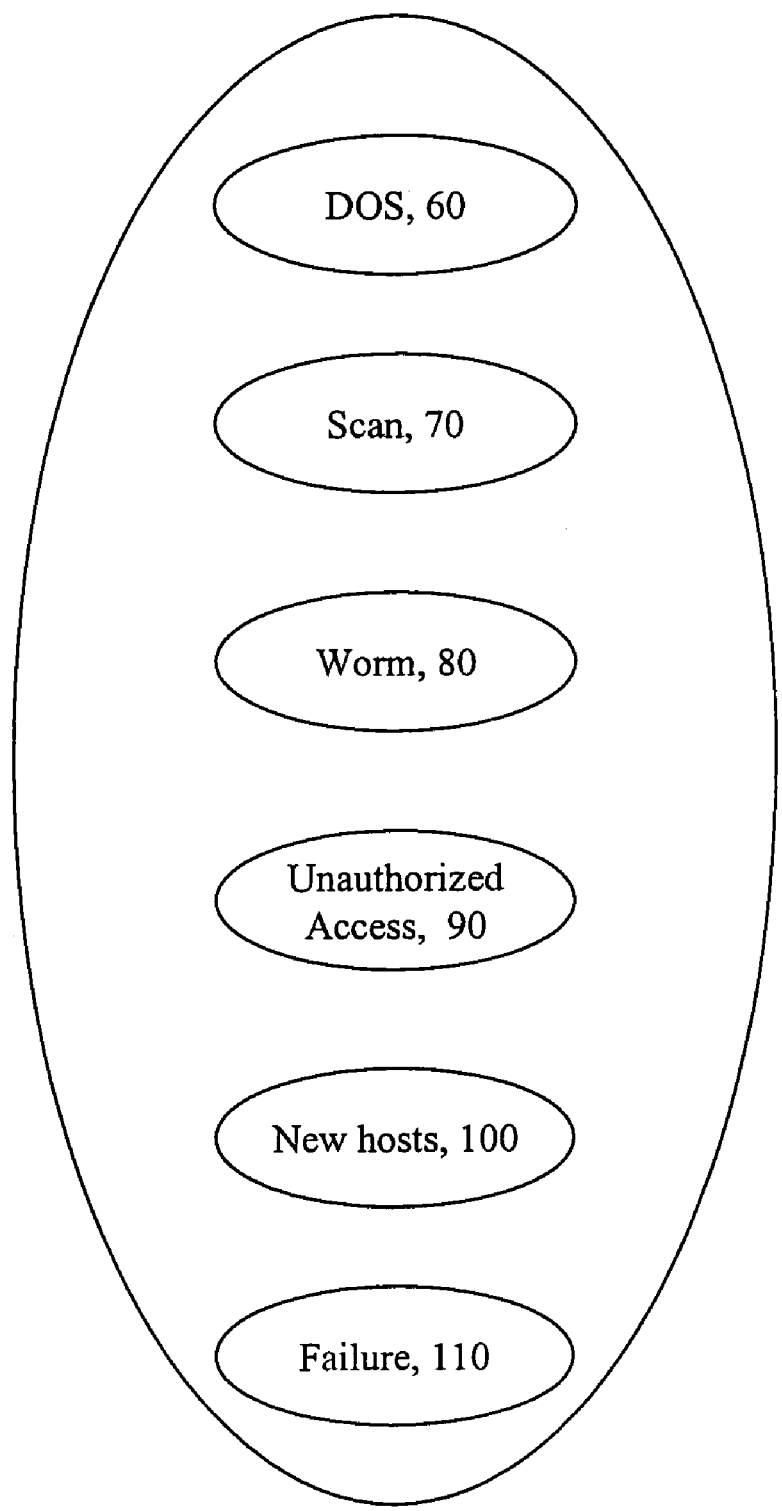
FIG. 8 is a flow chart of processes on the aggregator.

Referring to FIG. 8, the aggregator 14 also includes analysis processes 39 to detect network events. Such processes 39 can include a process 60 to detect bandwidth denial-of-service attacks, a process 70 to detect scanning and probing intrusions, a process 80 to detect worms, a process 90 to detect unauthorized access, a process 100 to detect new hosts on the network, and a process 110 to detect failure of hosts or routers. Other events can also be detected by addition of corresponding processes.

Before discussing each of these processes 49 individually, it is useful to focus on common characteristics of these processes 39.

Figure 9:
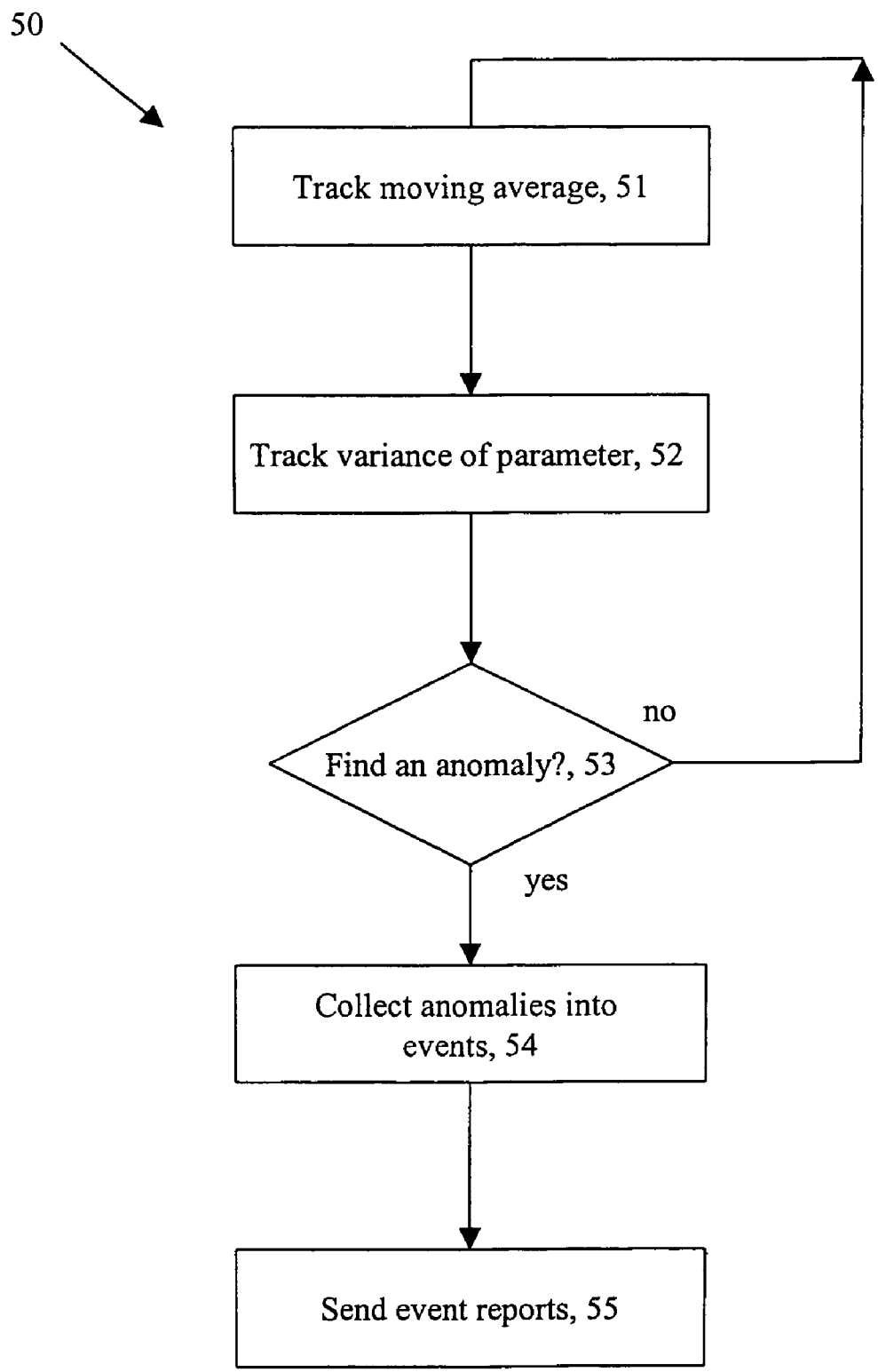
FIG. 9 is a flow chart depicting a generalized process for detection of anomalies and classification of events.

Referring to FIG. 9, a generic flow process 50 of an event detection process is shown. One characteristic of the generic flow process 50 is that in general the processes are historical and profile-driven. The generic flow process 50 tracks 51 a moving average that allow processes to adapt to slowly changing network conditions without user intervention. The generic flow process 50 also tracks 52 a variance of a parameter to allow the generic flow process 50 to account for burstiness in network traffic. Several of the algorithms can optionally be tuned via constants to alter parameters such as sensitivity. Historical analysis minimizes the amount of tuning that needs to be done. The benefits of historical analysis, therefore, are to decrease management complexity while improving analysis quality.

The generic flow process 50 operates at two conceptual levels, anomalies and events. The generic flow process 50 finds 53 anomalies, i.e., low-level discrepancies in the network, e.g., a host is receiving unusually high traffic, for example. Conventional intrusion detection would tend to report anomalies directly to the operator. This can be a problem because a single intrusion may correspond to many anomalies, and many anomalies are benign. In contrast, the system 10 using aggregator 14 collects anomalies into events 54. The operator is sent 55 event reports giving the operator more concise and useful information, while simplifying system management.

Figure 10:
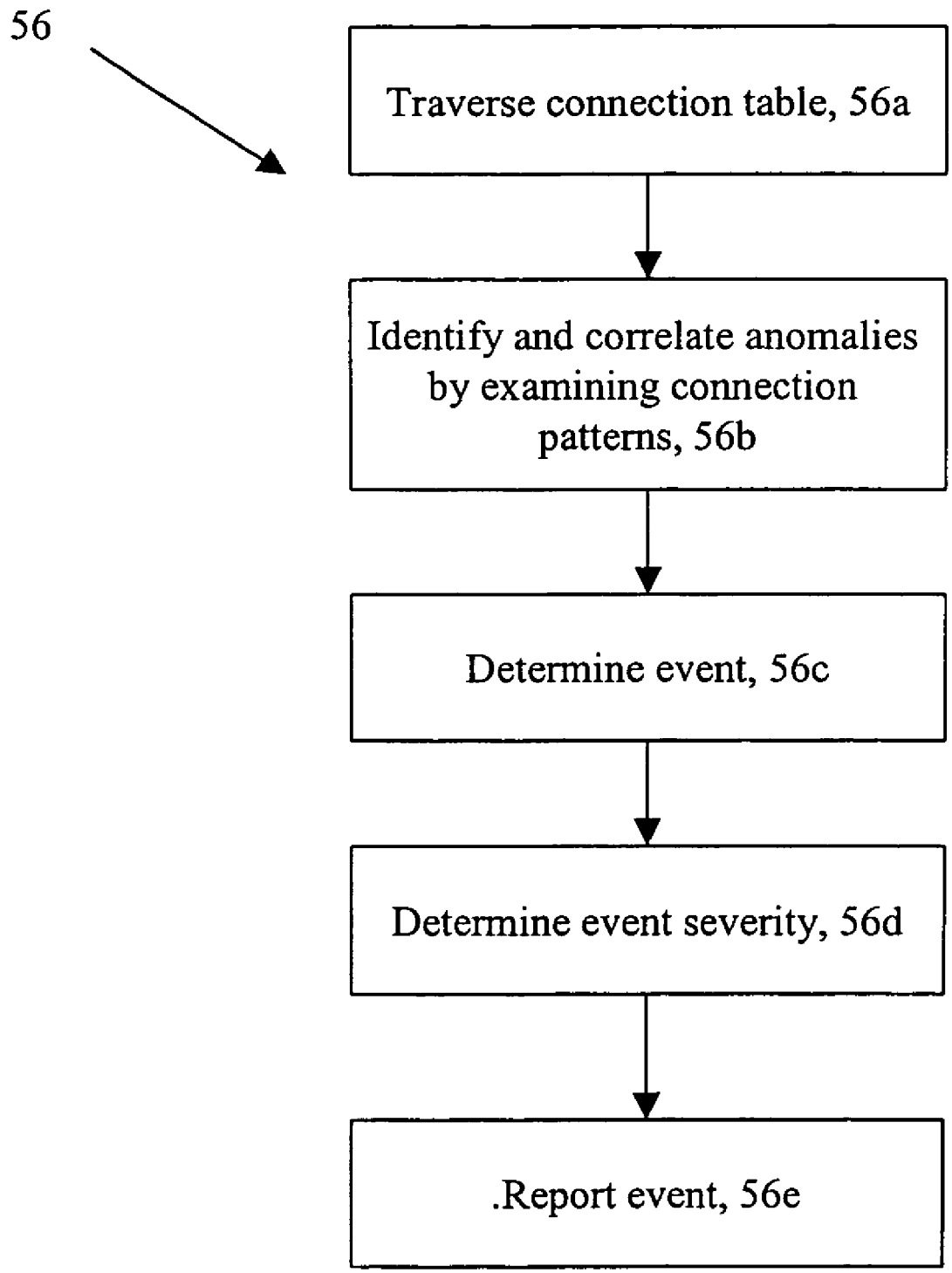
FIG. 10 is a flow chart depicting event processing.

Referring to FIG. 10, processes 39 handle events, i.e., high-level occurrences that have significance to a network administrator. The processes 39 distinguish among different classes of events. A general flow 56 that can underlie some of the processes 39, discover events by traversing 56a the connection table 40 and identifying 56b and correlating anomalies. From correlated anomalies events are produced 56c. For example, a DoS attack event may be identified because of an abnormal high level of traffic destined to some set of hosts. The generic flow process 50 examines connection patterns rather than packet signatures. Connection patterns can be more strongly correlated with a particular event.

Consider a worm. The presence of a worm, such as the NIMDA worm on a network may not be a threat if all hosts have been patched for NIMDA, but those packets will nonetheless generate reports (and potential false positives) from typical intrusion detection. Rather, a tree-like pattern of connections is much more definite proof that an actual worm infection is occurring. In order to decrease false positives, processes 39 look for more reliable evidence of suspicious activity, e.g., determine whether observed anomalies produce events and report the events rather than mere anomalies. The processes 39 determine 56d event severity as functions of the types, numbers, and severities of anomalies that led to the identification of the event. Events can be sorted by severity, of course, further simplifying management of the network. The processes 39 report 56e the event.

Denial of Service Attacks

Denial of service (DoS) attacks attempt to overload a victim server's resources by sending the victim more data than it can handle, e.g., a large number of packets or a high byte rate or both. In addition, some DoS attacks will randomly spoof source addresses so as to avoid detection, and to confuse any DoS detection tools that may be in place to protect the server.

Figure 11:
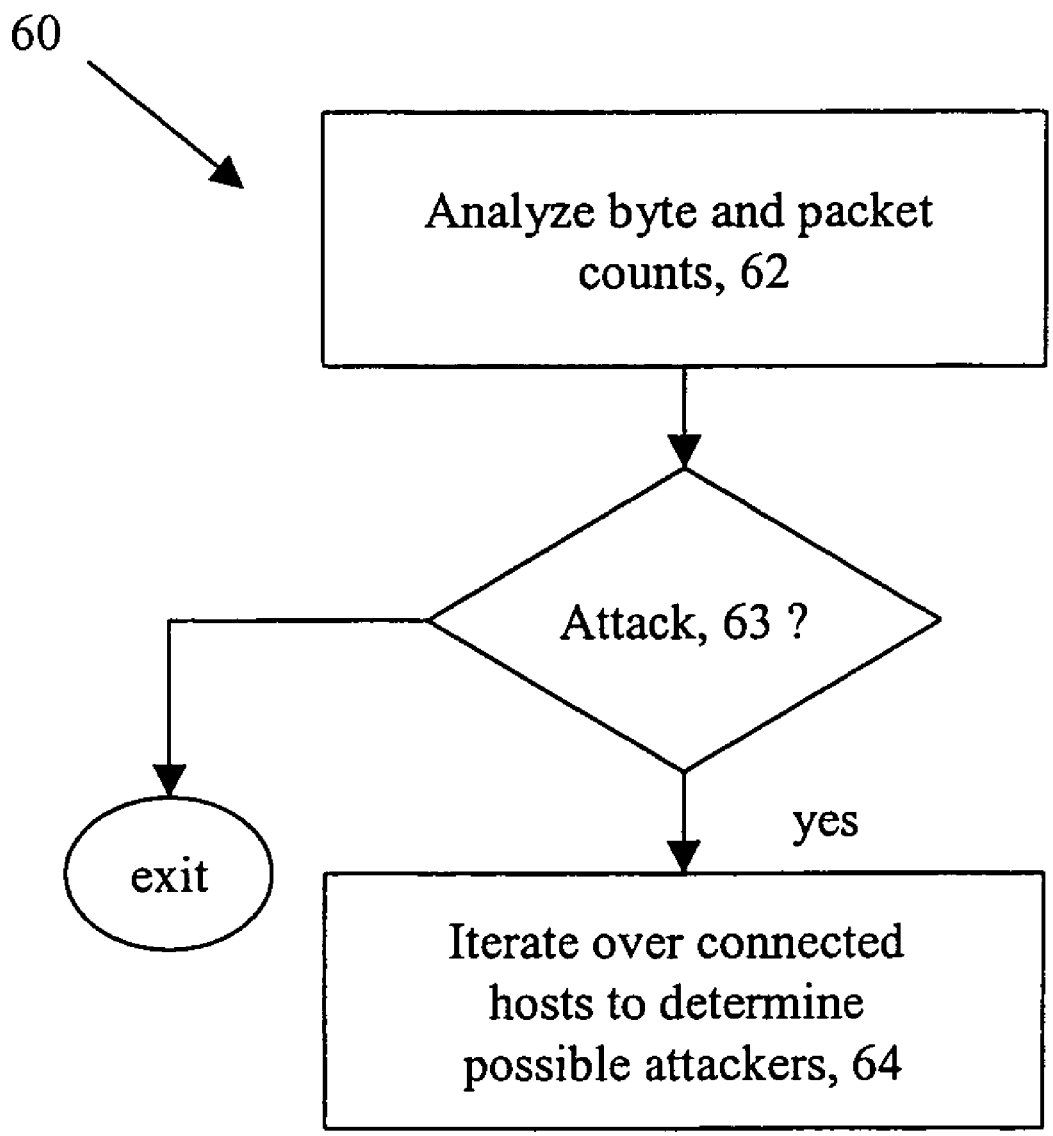
FIG. 11 is a flow chart depicting denial of service attack processing.

Referring to FIG. 11, denial of service detection process 60 detects bandwidth attacks against a host. The denial of service detection process 60 examines 62 both packet count and byte count to determine 63 whether a host is a potential DoS victim. In addition, if a host is determined to be a potential victim, the denial of service detection process 60 iterates 64 over all connected hosts to determine which hosts are possible attackers.

Figure 12:
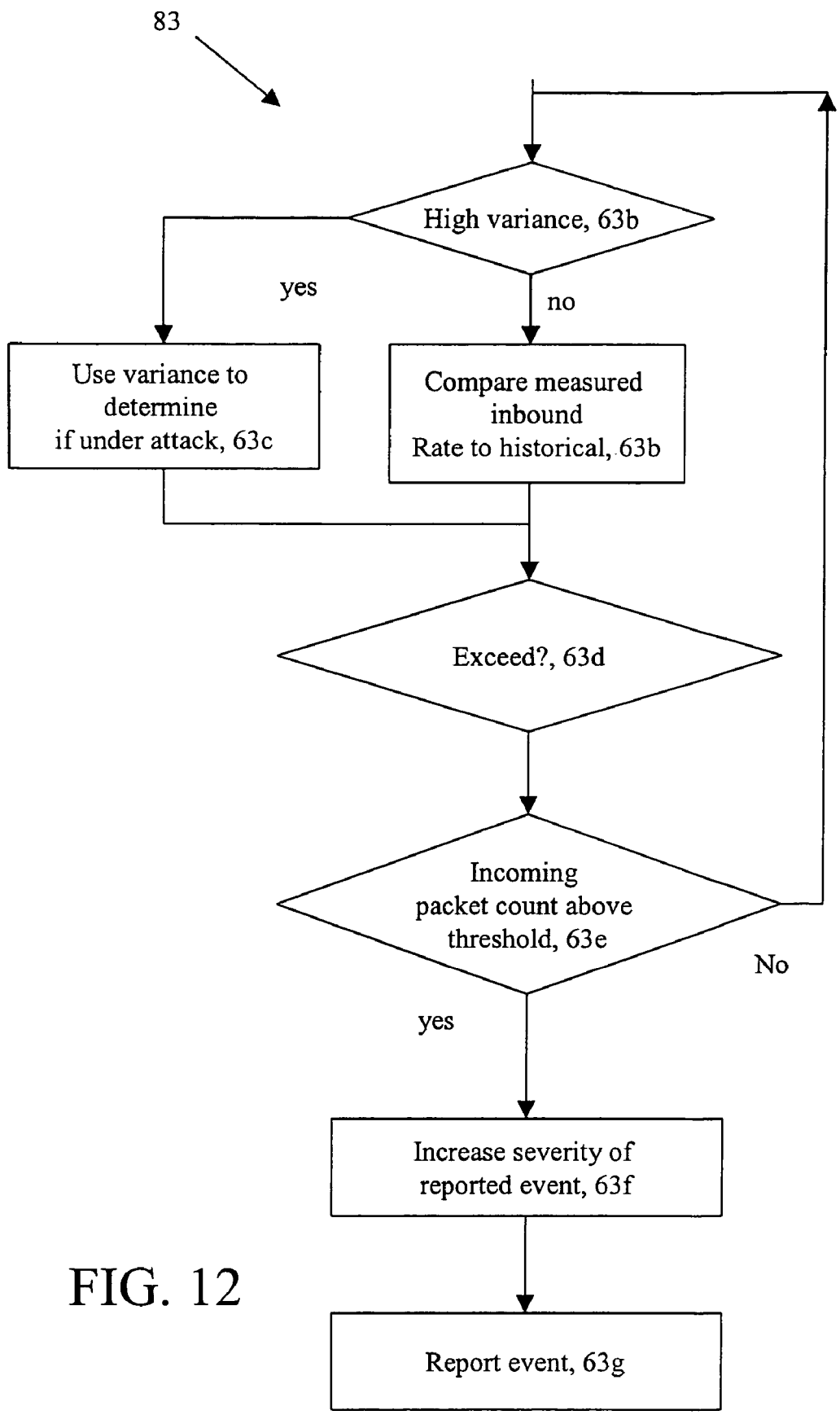
FIG. 12 is a flow chart depicting details of denial of service attack processing.

Referring to FIG. 12, to determine 63 whether a host "H" is a victim of a DoS attack, the process 60 determines 63a whether or not the host has a historically high variance in inbound packet rate. If the host does not have a high variance the process compares 63b the current measured inbound byte rate with "H's" historical average inbound byte rate for the current profiled time period. However, if a host has a large variance 63b in inbound packet and byte rate, the process avoids triggering an alert merely based on byte rate, but rather the process 60 uses 63c a stored profiled variance, as follows.

Let "$\sigma^2$" be the variance of "H's" inbound byte rate, stored in the appropriate profile connection table. Then "$\sigma$" is equal to one standard deviation. Let "c" be "H's" current incoming byte rate and "h" be "H's" historical average incoming byte rate. If the inequality (c>(h+C1*$\sigma$)*C2) is true, then process can consider the host H to under a possible DoS attack. To decrease the overhead associated with computing square roots, the process can calculate this in two passes. The first pass determines if "c>h*C2". If this is true, the process calculates the standard deviation, and uses it as shown. Otherwise, the process can conclude that the inequality that considers standard deviation will also be false, and can skip the complete calculation. "C1" and "C2" are tunable constants. Exemplary values are "C1=2" and "C2=2." Thus, in either case the process determines 63d if the parameter (variance or byte rate exceeds a historical amount.

In addition, the process 60 determines 63e if incoming packet count is above a certain threshold, to filter out new or low-traffic hosts that suddenly receive a low but still larger than normal amount of traffic. A value of, e.g., 500 to 2000, nominally 1000 packets per second is a reasonable number for this lower bound.

If these conditions are satisfied, then the process 60 increases 63f the severity of the reported event. The process 60 reports 63g the event to the operator (to reflect a high degree of certainty that this is an DOS attack). The process 60 applies a similar inequality to incoming packet rates.

Other factors that influence whether the event is a DoS attack include whether the suspected victim is receiving traffic from an unusually (relative to historical profile) large number of other hosts, a typical indication of a broadly spoofed attack. Another factor is whether most of the hosts connecting to the suspected victim do not exist in the profile connection table, almost certainly an indication of a spoofed attack. Another factor is whether most of the new traffic to the host is UDP, ICMP, or unknown protocols. Again, this is further proof to corroborate the symptoms of a typical bandwidth DoS attack. All or some of these can be used to elevate the severity of the event.

Once a host is determined to be a DoS victim, the process 42 examines the host's neighbors to determine which hosts are possible attackers. For each neighbor "$H\_\{0\}$" of "H", the process determines the byte rate from "$H\_\{0\}$" to "H". Let "$c\_\{0\}$" be the current byte rate from "$H\_\{0\}$" to "H", "$h\_\{0\}$" the historical average byte rate from "$H\_\{0\}$" to "H", and "$\sigma^2\_\{0\}$" the variance of the byte rate from "H" to "$H\_\{0\}$." If an inequality holds $$c\_\{0\} > (h\_\{0\} + C1 * \sigma^2\_\{0\}) * C2$$

then "$H\_\{0\}$" is a suspected attacker of "H".

The constants "C1" and "C2" can be the same as above. The process also examines the packet rates from "$H\_\{0\}$" to "H" in a similar way.

Since a spoofed source address DoS attack could have hundreds or even thousands of different source addresses, the process 60 can cap the number of source addresses that are reported. A reasonable number for the cap is 1000 addresses. If the cap is reached, process raises the severity of the attack reported, as noted above.

This approach to DoS detection differs from that of other techniques used in intrusion detection systems (IDSs) in several ways. For instance this process 60 measures usual network activity at a per-host level, and bases attack detection on proportional violations of those usual levels. This avoids the need for user-determined thresholds as is common in conventional IDS. Incorrect thresholds cause false positives and major operator costs in practice. Moreover the inclusion of variance in the formula reduces false positives based on network burstiness. "Burstiness" is another user-determined threshold in conventional intrusion detection systems. Since the "attack threshold" is measured per host, the process 60 automatically adapts to different server capacities. That is, if a server "A" usually handles a small fraction of server B's traffic, then a small attack on server A will cause an event, where that attack might be (properly) left in the noise on server B.

```
PROCEDURE DOSDETECTION (host H) { avg_p1 ← H's current average incoming pps
    his_p1 ← H's historical average incoming pss
    var_p1 ← variance of H's incoming pps
    avg_b1 ← H's current average incoming bps
    his_p1 ← H's historical average incoming bps
    var_b1 ← variance of H's incoming bps
    if (avg_p1 ≤ C1)

return false if (avg_p1 ≤ (his_p1 } C2 * √var_p1) * C3 and avg_b1 ≤ (his_b1 + C2 * √var_b1 ) * C3)

return false
    for each host H0 connected to H avg_p2 ← current average pps from H0 to H
        his_p2 ← historical average pps from H0 to H
        var_p2 ← variance of pps from H0 to H
        avg_b2 ← current average bps from H0 to H
        his_b2 ← historical average bps from H0 to H
        var_b2 ← variance of bps from H0 to H if (avg_p2 > {his_p2 + C2 * √var_p2 } * C3 or avg_b2 > (his_b2 + C2 * √var_b2 ) * C3)

add H2 to list of attackers
    return true
}
```

Exemplary pseudo code for detecting denial of service attacks and determining the host that is attacking is shown above.

Scanning and Probing Intrusions

A network scan is a probe by which an attacker learns more about computers on a network and their vulnerabilities. Scans are often caused by intruders trying to gain access, and may be done manually or automatically by an active worm. Two types of scans are ping scans and port scans. A ping scan detects the existence of hosts on a network, while a port scan detects which services are running on a particular host.

The purpose of a ping scan is to determine the IP addresses of other networked hosts. Packets are sent to many different IP addresses, and hosts that are up respond. A ping scan may use ICMP, TCP, or other protocols. It may iterate over a set of addresses, such as all addresses in a subnet or it may test many random addresses.

Figure 13:
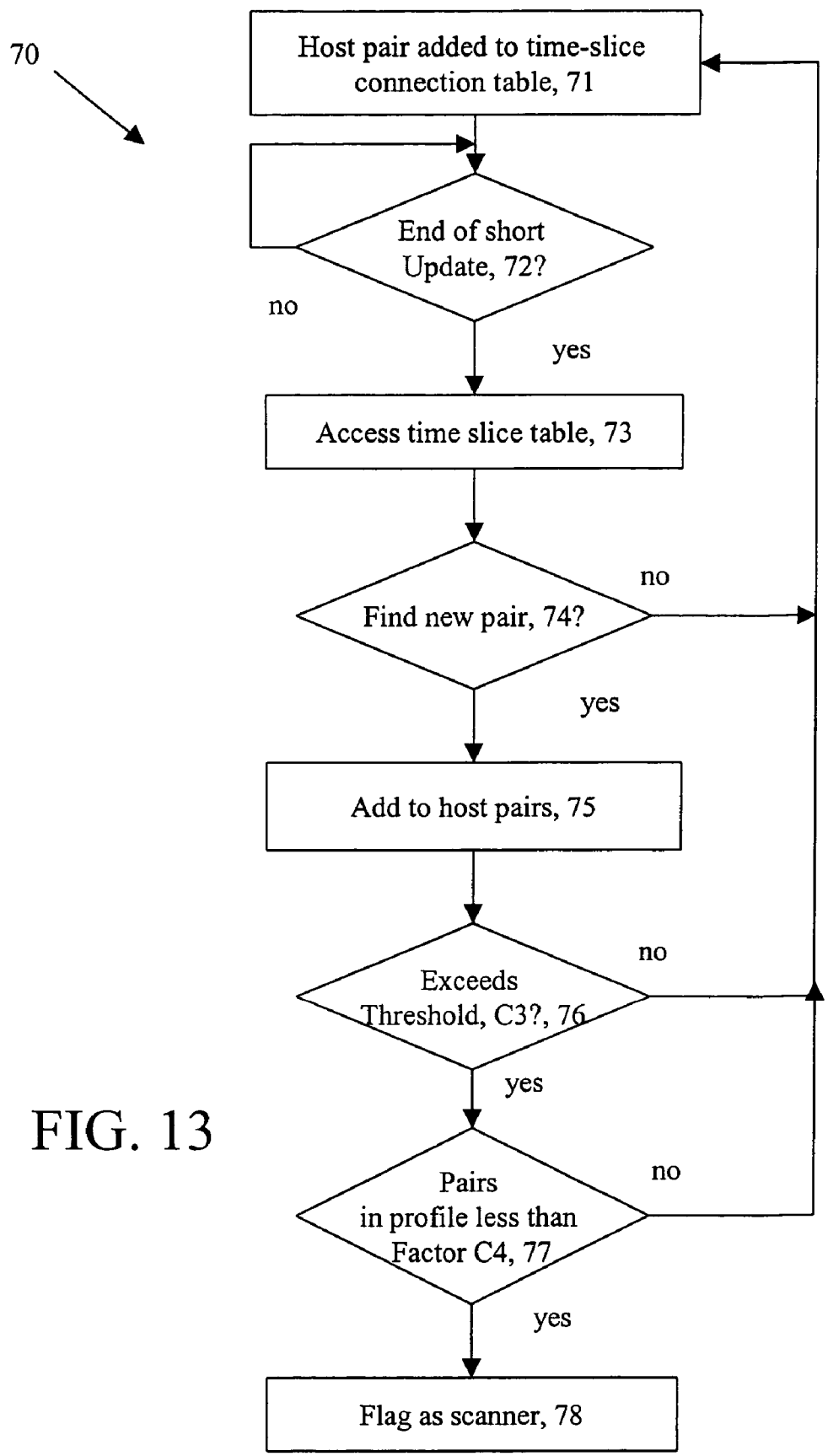
FIG. 13 is a flow chart depicting scanning detection.

Referring to FIG. 13, the scan detect process 70 tracks ping scans with an application of the connection table 40. Each time a host scans another host, a host pair record is added 71 to the current time slice connection table. At the end of each short update period 72, the scan detect process 70 accesses 73 the time slice connection table 41 to determine 74 new host pairs that the process had not determined before in the profile. The scan detect process 70 sums 75 the number of new host pairs determined and determines 76 if a host has made more than "C3" new host pairs. The process 70 checks if the number of historical host pairs in the profile is smaller 77 by a factor of "C4." If the historical number is smaller by the factor C4, the host is flagged 78 as a scanner. The constants "C3" and "C4" are adjustable thresholds. This will catch most ping scans since typically a ping scan will scan many hosts in a short time.

Stealthy ping scans ping the network slowly in order to avoid detection. Because a stealthy scan moves so slowly, the system 10 will produce only a few new host pair records in each SUP. Over time, the scan will still produce many new host pairs. The scan process 70 also checks for ping scans at the end of each long update period, flagging stealthy ping scans which produced more than "C5" new host pairs over the long update period. Thus, the scan detect process 70 detects stealthy ping scans in a reasonable amount of time, although detection does not occur as quickly as with normal ping scans. Essentially, for stealthy scans the process increases the reporting delay in order to decrease false positives.

Compared with traditional IDS systems, the scan detect process 70 has several advantages. Traditional IDS systems rely on heuristics that could be easily misled, such as looking for incremental IP addresses. Because the history of each host's network traffic is maintained in the connection tables, the scan detect process 70 will not incorrectly declare scans during normal traffic. An IDS that only detects signatures will not be able to distinguish scans from scan-like normal operations. The scan detect process 70 distinguishes normal host interconnections from abnormal ones, so a scan coming from a typically active host will still be detected, since the scan would produce new host inter-connections.

The scan detect process 70 also detects stealthy scans by looking at the activity of each host over a longer period of time. The scan detection process 70 thus examines host activity over a sufficiently long enough period of time to detect stealthy scans. The scan detect process does not consider the packet type in detecting scans. The scan may use ICMP packets, TCP packets, another protocol, or some combination. Rather, the scan detect process 70 will detect that the scanning host has initiated network communication with an unusual number of hosts.

A possible extension is to maintain ARP (Address Resolution Protocol) packet statistics to detect ping scans. Ping scans often produce a large number of ARP requests. If the scanner scans a dense subnet on which there are many hosts, the number of ARP requests will be similar to the number of successful "connections." However, for sparse subnets the host may fail to route many of its packets to their intended destination. In this case it will generate a high level of ARP requests that do not receive responses, and for which the new host will not produce follow-on IP packets. Keeping track of ARP packets would allow the scan detect process 70 to detect scans more quickly and accurately on sparse networks.

Port Scans

A port scan determines which ports are listening on a known host, indicating which services are running (port 80 indicates HTTP, port 22 indicates SSH, etc). Port scans use either TCP or UDP protocols.

Port scans may scan all "$2^{16}$" ports or they may only scan a few interesting ports. Port scans may use a variety of different packet types, sizes and flags to try to avoid detection. However, port scans send packets to many different ports, so ports scans can be detected with the connection table 40.

As discussed, the connection table 40 stores records that have data on protocols and ports used for each host pair. If the number of ports used in the historical profile is considerably smaller (e.g., by a factor "C5") than the current number of ports, and the current number is greater than some lower-bound threshold ("C6"), then the aggregator 14 will record the anomaly and report a port scan. The reported severity varies as a function of the deviation from historical norm.

The port scan detection process examines connection-based features of an anomaly rather than attempting to ascertain and develop a signature for a potential attack. The port scan detection process knows which ports hosts communicate with, so it is unlikely that the port scan detection process would declare a port scan for normal traffic. The port scan detection process does not examine the actual structure of the packets. Therefore, a scan may set any combination of TCP flags and the port scan detection process will still recognize it as a port scan.

Because the aggregator 14 examines data collected over a long period of time, it will detect stealthy scans which are too slow for some conventional IDS systems to recognize.

An extension of the scan process 70 is to use the connection table statistics about TCP RST packets and ICMP port-unreachable packets. Hosts respond to "failed" TCP probes with RST packets, and to "failed" UDP probes with ICMP port-unreachable packets. A spike in the number of these packets relative to the historical norms could be used to increase the severity of a port scan event. As with ping scans, the scan process 70 checks for port scans at the end of each short update period and each long update period. Normal scans will be quickly caught at the end of the current SUP. Stealthy scans will avoid immediate detection but will be caught later at the end of the long update period (LUP).

Worm Detection

Worms are programs that exploit weaknesses in network services to copy themselves to other computers and spread. They typically use ping scans to find new computers to infect. Some worms are so aggressive that they generate high levels of network traffic and cause denial of service attack side effects.

A worm's activity looks like a ping scan to the process 42. The presence of several ping scans from different hosts in a short time is reason to suspect the presence of a worm on those machines.

Figure 14:
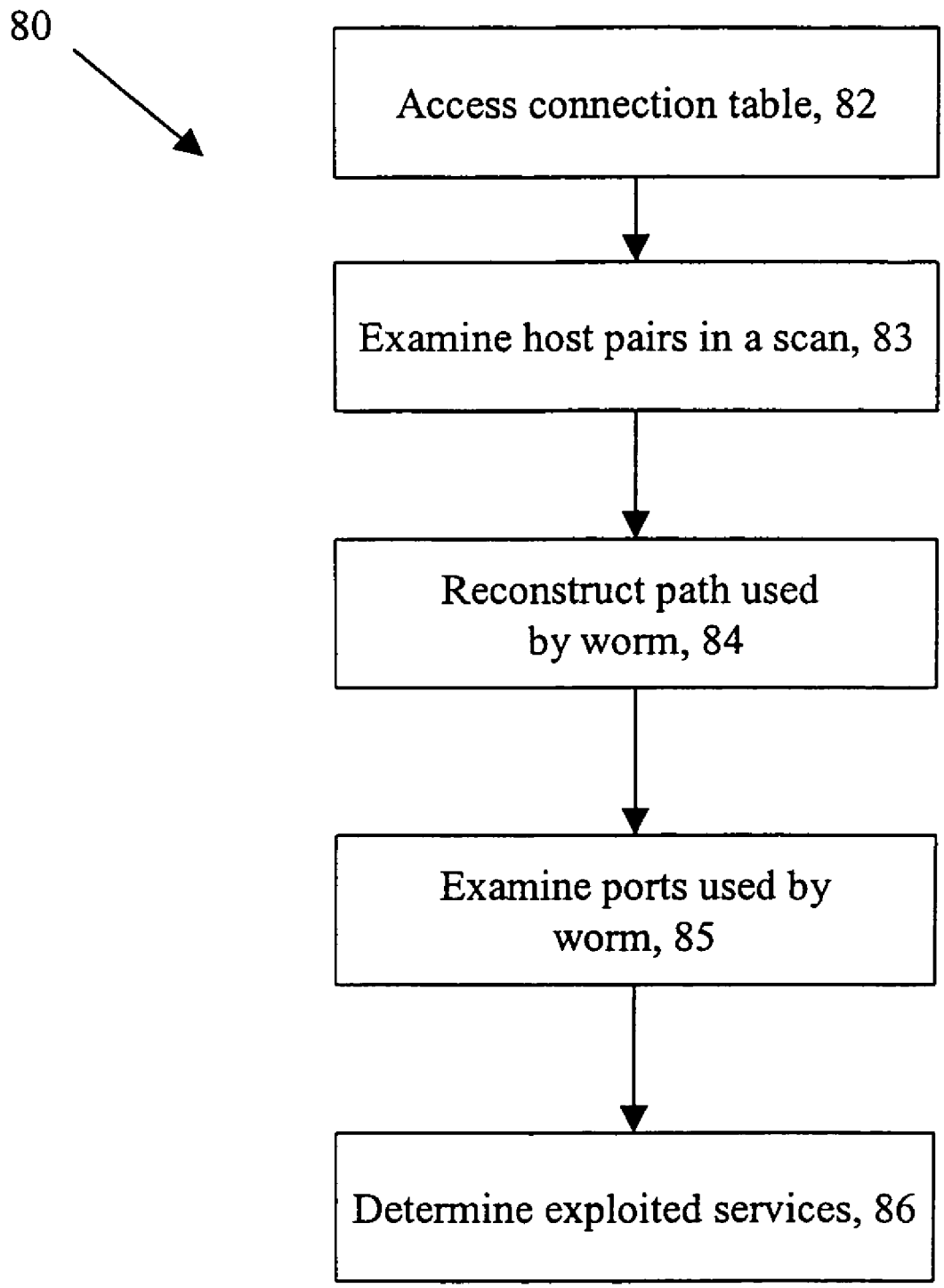
FIG. 14 is a flow chart depicting worm detection.

Referring to FIG. 14, the worm detection process 80 retrieves 82 from the connection table 40 information about effects in the network 18 caused by the worm, including the path by which it spread and the services that it is exploiting. The worm detection process 80 examines 83 the host pairs in the scan and reconstructs 84 the path by which the worm spread. The worm detection process 80 examines 85 the ports used by the worm and determines 86 which services were exploited.

Figure 15:
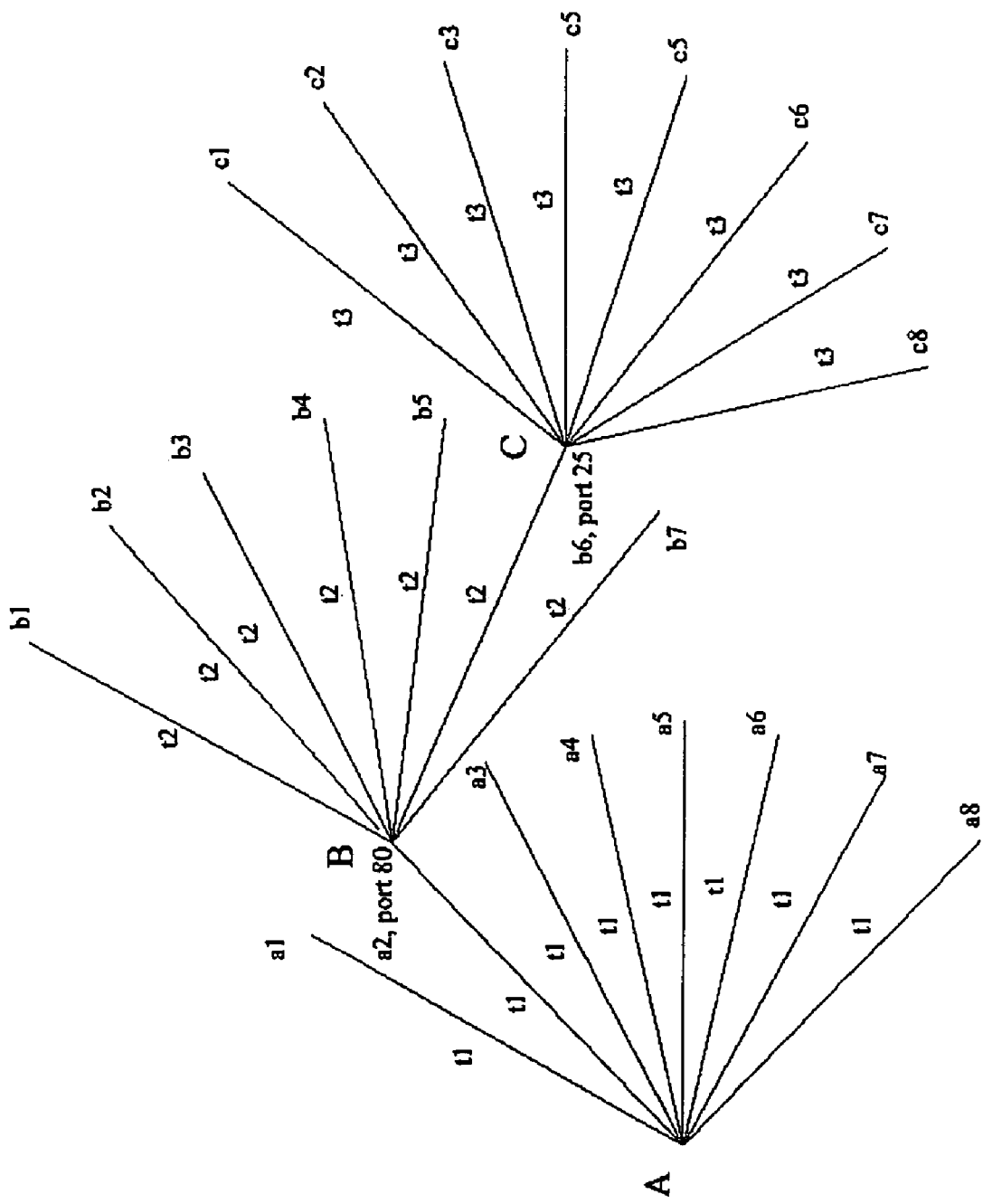
FIG. 15 is a diagram depicting worm propagation.

For example, consider the situation in FIG. 15, which represents that scans were detected emanating from hosts "A", "B", and "C."

FIG. 15 shows that in time period "$t_1$,", host "A" scanned host "$a_i$", at time "$t_2$", host "B" scanned "$b_i$", and at "$t_3$", host "C" scanned "$c_i$." Since, "B=$a_2$", and "C=$b_6$", the worm detection process determines that a worm has passed from "A" to "B" at time "$t_1$", and from "B" to "C" at time "$t_2$". The worm detection process also determines that "A" connected to "B" through port 80, and that "B" connected to "C" through port 25, indicating which services are vulnerable.

Assume that hosts "A", "B", and "C" were all flagged for ping scans in time periods "$t_a$", "$t_b$", and "$t_c$" respectively, with "$t_a$ being less than or equal to $t_c$". The worm detection process 80 analyzes the scan anomalies for the sets of hosts "$S_a$", "$S_b$", and "$S_c$" that hosts "A" "B" and "C" scanned. If host "B" is in "$S_a$", and host "C" is in "$S_b$", then the worm detection process determines that the worm spread from host "A" to host "B" to host "C." The worm detection process 80 examines which port host "A" used to connect to host "B", and which port host "B" used to connect to host "C." The process 80 also determines the vulnerable services on each of those hosts. These could be different ports for worms that have the ability to exploit multiple services.

It is possible for a worm to be stealthy by having the worm only connect to hosts that an infected host normally connects to. Or, if the worm has root access, the worm may listen to the network and discover more hosts. There are no common worms of this form. Also, such a worm could have difficulty spreading since it might not come into contact with many vulnerable hosts. Still, the worm detection process 80 could detect such worms by scanning for unauthorized access anomalies (as discussed below) and connecting the unauthorized access anomalies into a path as it does with scan anomalies.

Unauthorized access

Unauthorized access events occur when one machine makes an attempt to connect to a machine to which it would not normally connect. An example of such an event is a host normally used for engineering research connecting to a server used in a personnel department.

Figure 16:
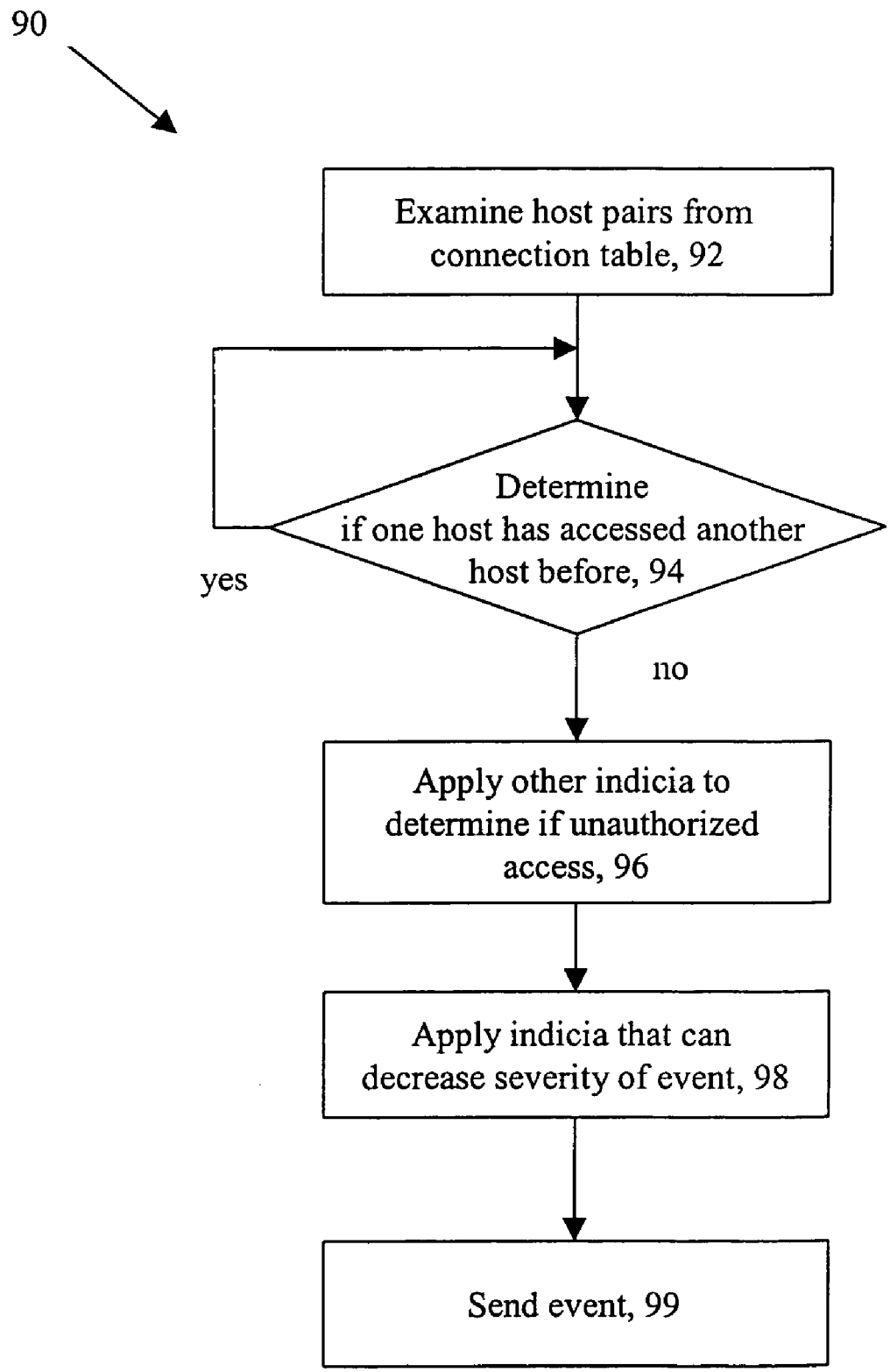
FIG. 16 is a flow chart of an unauthorized access detection process.

Referring to FIG. 16, an unauthorized access attempt detection process 90 is shown. The unauthorized access attempt detection process 90 obtains 92 connection pairs for a host that is attempting to gain access to another host from the connection table 40. The unauthorized access attempt detection process 90 determines 94 whether that one host attempting to gain access has accessed the other host previously. If the host has accessed the other host previously, the process 90 does not raise any events and merely continues to monitor accesses.

If that one host has not accessed the other host, the unauthorized detection process 90 will determine 96 if other anomalies in the connection patterns of each host exist in order to determine how likely it is that this is an instance of unauthorized access.

Heuristics can be used to increase 96 the severity of a possible unauthorized access event. For example, one heuristic is that connection patterns indicate that the hosts are in roles that are not normal for those hosts. For instance, in the example mentioned above, engineering hosts do not commonly access the personnel server host. Thus, if an engineering host connects to the personnel server, it could indicate that an unauthorized access is being attempted. Another indication is that connection requests use the transport control protocol (TCP). Use of TCP could indicate that someone is trying to access the host to gain or modify sensitive data as TCP is the protocol that is usually used to transfer data. Another indication is that the connections use ports that are not well known (i.e., not used for a common service), indicating a possible Trojan-type virus. Also, if the connections use ports that have not been used before, that could indicate an unauthorized access attempt. Another indicator is if several short connections occur in a short time period (possibly indicative of failed logins). Each of these patterns of connection behavior between two hosts can be determined from examination of connection patterns by analyzing data from the connection table 40.

Conversely, there are a few rules that will decrease 98 a likely event severity or make a potential event a non-event. One rule is that the hosts are in roles that commonly access each other's hosts. Another rule that can decrease severity is that the host being connected to commonly receives connections from new hosts. This may indicate, for example, that it is a server and new hosts connect to it sporadically. Another consideration is that the connecting host commonly makes connections to new hosts. This could indicate that the host is relatively new, i.e., the new host has appeared on the network recently. In this case, the process 40 will not know the connection habits of the new host. If an event is still indicated, the process 90 will send or raise 99 an event with the proper level of severity to the operator.

The unauthorized access detection 90 uses role grouping or role classification. In the example above, hosts in the engineering department frequently make connections to machines in a lab. Although all engineering hosts probably do not connect to all lab machines, individual engineering hosts likely would frequently connect to some lab machines. If roles are not considered, an engineering host that connects to a lab host for the first time may trigger an event. However, the engineering hosts will typically be assigned the same role, and lab machines will be assigned another role. By taking host roles into consideration, the unauthorized access detection process 90 understands that an engineering host connecting to a lab machine for the first time is probably not a suspicious event.

A traditional packet-based IDS has no notion of roles, and tries to detect intrusions based on packet payloads that it detects on a link. This approach can typically generate many false positives on a large network. Alternatively, operators may be able to explicitly define allowable connections or similar policies, but this is a tedious and error-prone process. Furthermore, since most conventional intrusion detection systems are standalone devices deployed on a single link, they may not catch access violations happening elsewhere on the network.

An example of pseudo-code for estimating the likelihood of a connection being unauthorized is shown below. Constants $C_0$ through $C_{11}$ may optionally be tuned to change the weight different factors have on the severity.

```
PROCEDURE UNAUTHORIZEDACCESS (host H1, H2) {
    badness ← 0
    if H1 has connection to H2
        if H1 has not previously connected to H2
            badness ← C0
        if machines in ROLE(H1) do not commonly
            access machines in ROLE(H2)
            badness += C1
        if connection protocol = TCP
            badness += C2
        if port on H2 is not well known
            badness += C3
        if port on H2 has not been used before
            badness += C4
        if connections are short
            badness += C5
        if machines in ROLE(H1) commonly
            access machines in ROLE(H2)
            badness -= C6
        if H2 has many connections
            badness -= C7
        if H1 makes many connections
            badness -= C8
        if UPTIME(H1) < C9
            badness -= (C9 - UPTIME(H1))
                (scaled to max C10)
        if UPTIME(H2) < C9
            badness =- (C9 - UPTIME(H2))
                (scaled to max C11)
    return badness
}
```

Detection of New and Failed Hosts

The process 39 also includes a process 100 that detects when a new host appears on the monitored network and, conversely, a process 110 that detects when a probe (or potentially a router or an entire subnet) appears to have failed.

Figure 17:
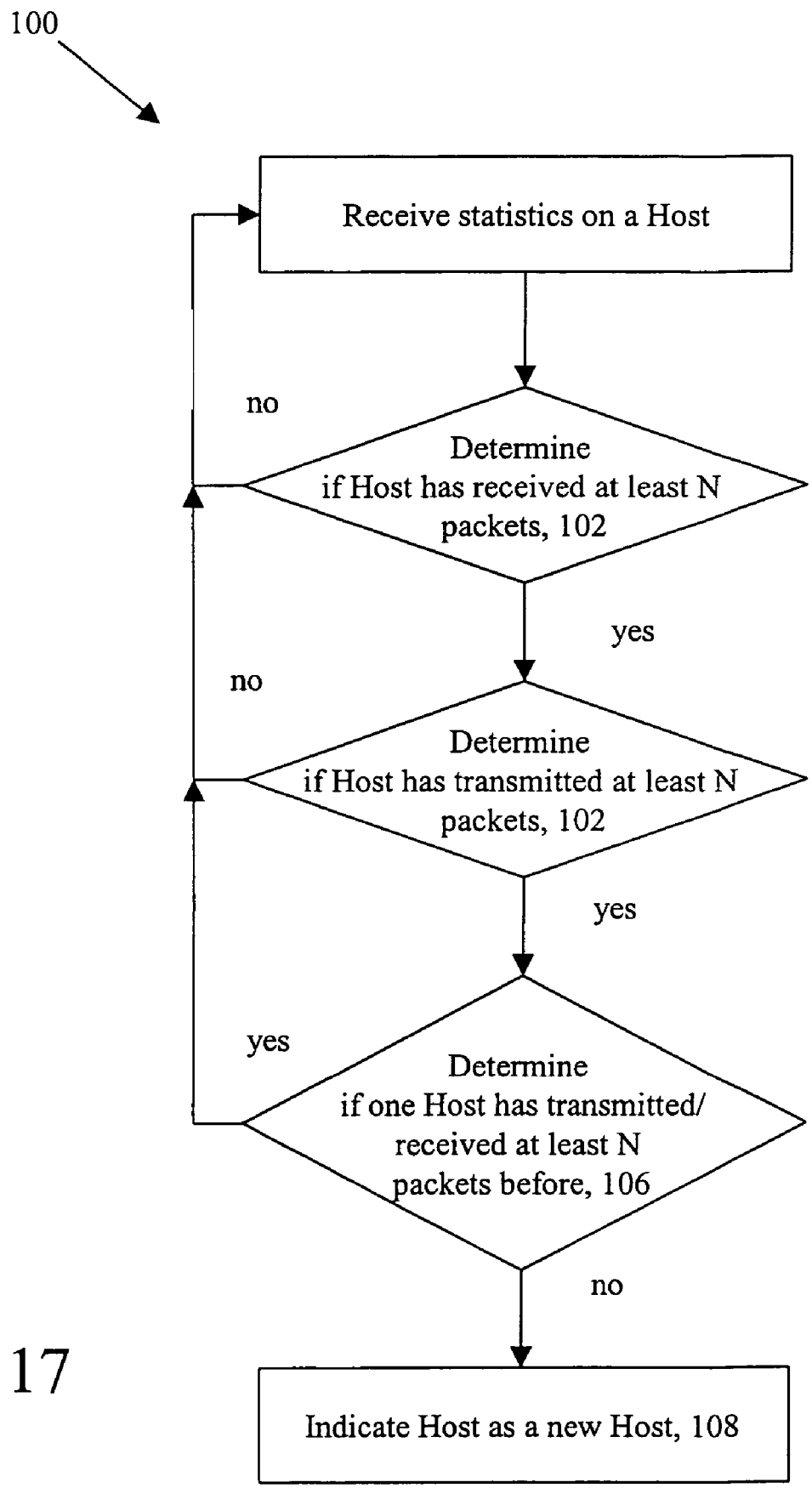
FIG. 17 is a flow chart of a new host detection process.

Referring now to FIG. 17, a new host detection process 100 is shown. New host detection process 100 receives statistics collected from a host "A." The new host detection process will consider Host "A" as a new host if, during a period of T seconds, the Host "A" transmits 102 at least N packets and receives 104 at least N packets, and if the Host "A" had never 106 transmitted and received more than N packets in any previous period of duration T. If these tests are met the Host A is indicated 108 as a new host. The emphasis on both transmission and receipt of packets, and the minimal rate of N/T packets/second, attempts to avoid false positives caused by scans or spoofing (e.g., reporting a "new host" when in reality the system detected a packet that was sent to a non-existent host as a result of a scan.

The "new host" detection process 100 detects and notifies when any host "H" has a minimal threshold amount of receive/transmit traffic no prior history of traffic in the network 18. The process notifies the operator of a new host in the network.

Failed Host Detection

Figure 18:
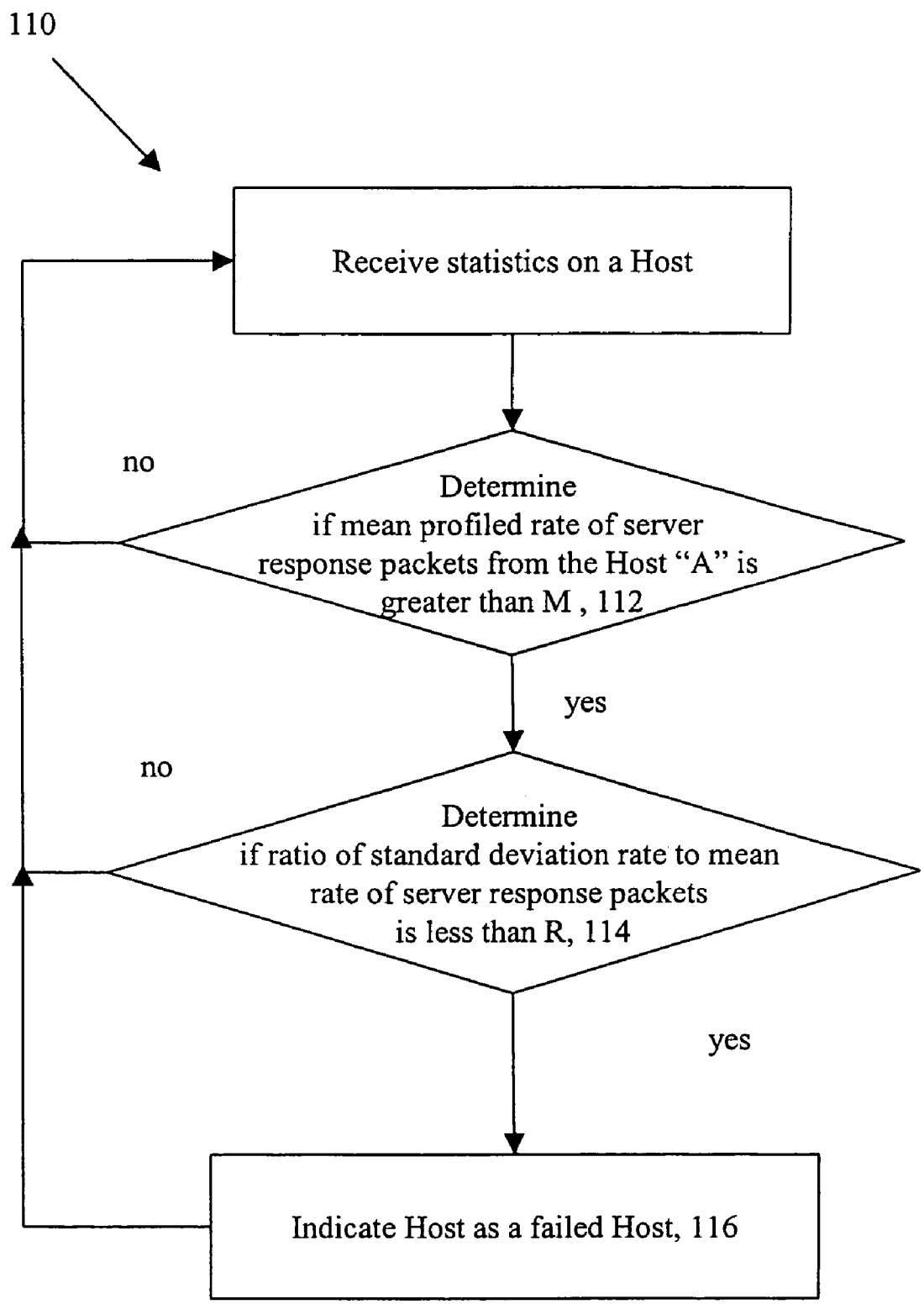
FIG. 18 is a flow chart of a failed host detection process.

Referring to FIG. 18, a failed host detection process 110 is shown. A Host "A" becomes a "candidate" for a failed host analysis if both a mean profiled rate of server response packets from the Host "A" is greater than M 112, and the ratio of (standard deviation of profiled rate of server response packets from the host) to (mean profiled rate of server response packets from the host) is less than R 114. That is, the system 10 analyzes hosts that are uniformly "chatty", e.g., have relatively high volumes of traffic over regular periods. This analysis avoids false positives for quiet hosts, or hosts with long periods of inactivity. If these two factors are present then the host is flagged as a candidate failed host.

The failed host analysis determines whether a host generates more than X server response packets per second in a given time slice, and immediately thereafter generates no outgoing traffic for at least S seconds. Failed hosts expire (they become "non-existent") after some period D seconds of continuous inactivity. The aggregator 14 will generate a new host event if a failed host comes back online after this time has elapsed.

A host failure can be considered as the inability to generate traffic on the network. It can also be applied to detect application failures (e.g., an HTTP server crashed).

Grouping

Figure 19:
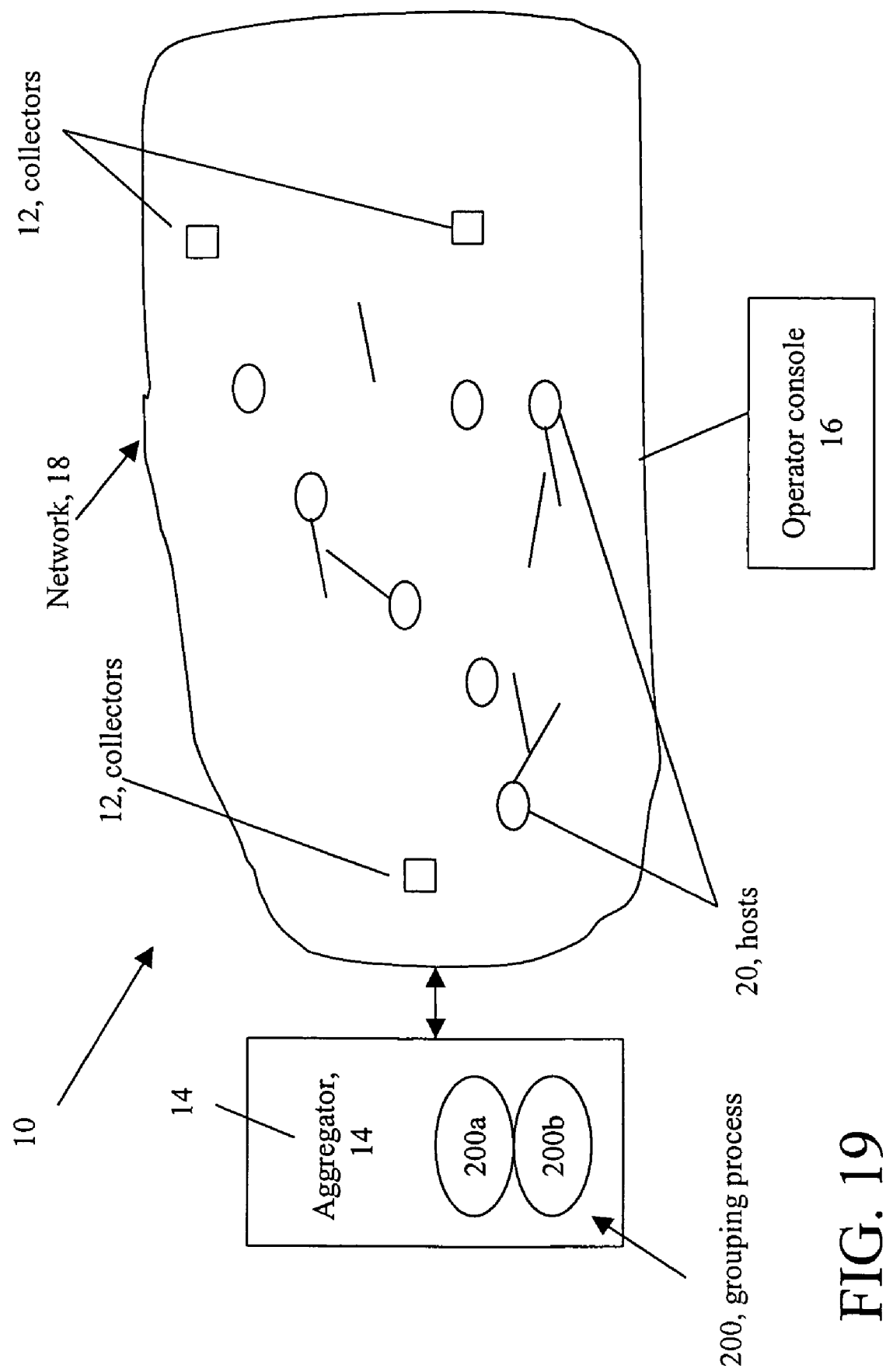
FIG. 19 is a block diagram of a network.

Referring to FIG. 19, intrusion detection system 10 as in FIG. 1 includes collectors 12 and an aggregator 14. System 10 detects and deals with security violations in large-scale enterprise networks 12 including a large plurality of computers and other devices such as switches, routers, etc, e.g., "hosts" 20, spread over different geographic locations. The probes 12 and aggregator 14 operate generally as in FIG. 1. In addition, the aggregator 14 executes the grouping process 200 that efficiently partitions hosts 20 on the network 18 into groups in a way that exposes the logical structure of the network 18.

The grouping process 200 assigns nodes to groups and includes a classification process 200a that classifies hosts by groups and a correlation process 200b that correlates groups. The classification process 200 is based upon analyzing connection behaviors of hosts and partitions hosts based upon the role that the hosts play in the network 18. The correlation process 200b correlates the groups produced by different runs of the classification process 200b. The two processes 200a, 200b form groups of hosts that have a strong degree of similarity in connection habits and roles in the network. The grouping process 200 provides a mechanism to merge groups and gives network administrators fine-grained control over merging, so that meaningful results can be provided to an administrator. In addition, the grouping process 200 can handle transient changes in connection patterns by analyzing profiled data over long periods of time. The grouping process 200 responds to non-transient changes in patterns of communication by producing a new partition and provides a useful description of the relationship of the new partition to the previous partition. Execution of the process 200 reduces the number of logical units with which a network administrator deals with, e.g., by one or two orders of magnitude.

Figure 20:
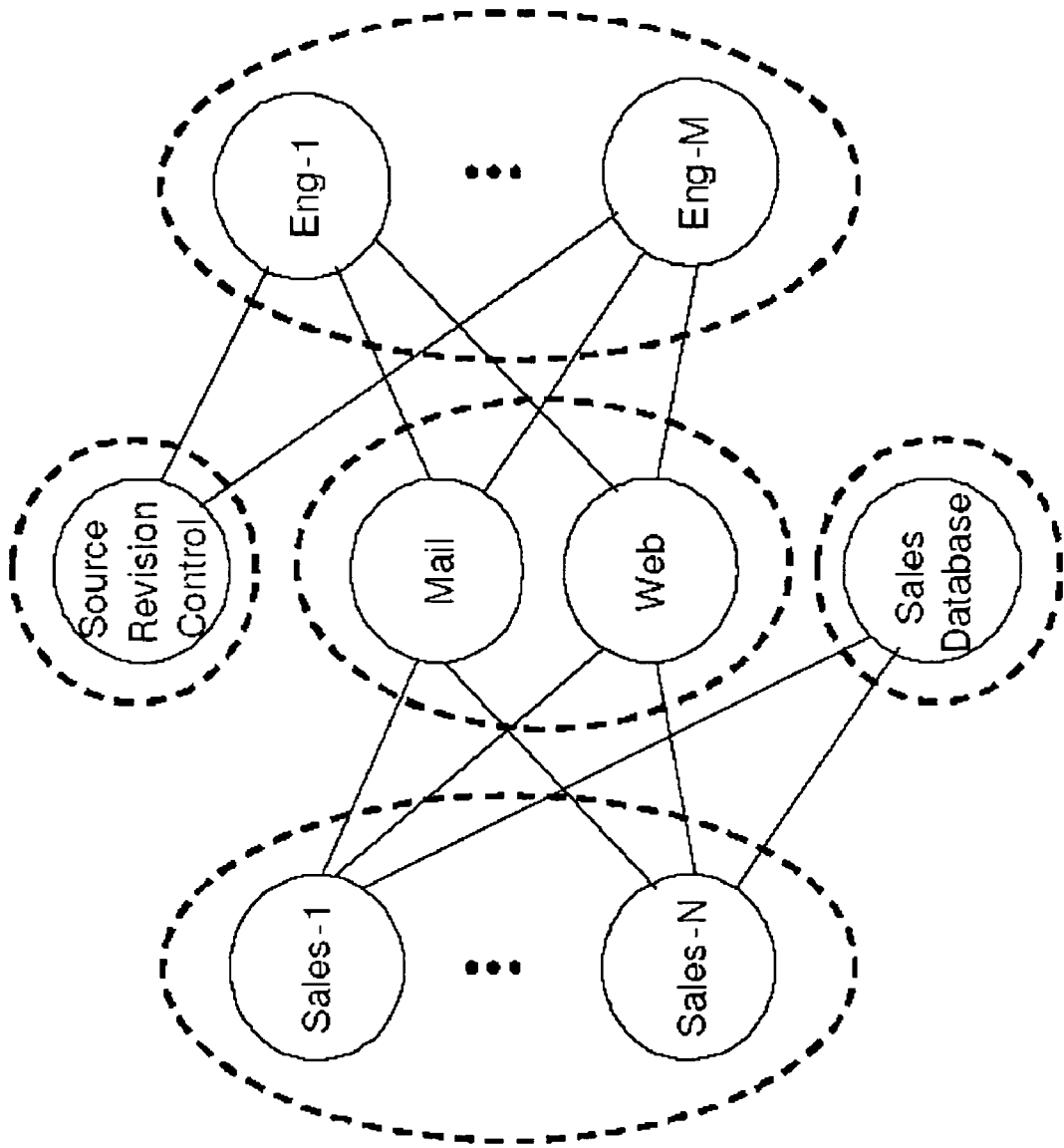
FIG. 20 is a diagram depicting a grouping.

Referring to FIG. 20, a partitioning of computers into groups that the aggregator 14 might produce based on observed communication patterns at the probes 12 is shown for the enterprise network 18. In FIG. 20, a line indicates that end nodes communicate regularly and dashed circles represent group boundaries. The connection patterns might indicate that Sales-1 to Sales-N nodes communicate with three servers: Mail server, Web server, and Sales Database server. Similarly the patterns might indicate that Eng-1 to Eng-M nodes communicate mostly with Mail server, Web server, and Source Revision Control server. Based on this information the grouping process 200 executed on, e.g., the aggregator 14 logically divides all the hosts into five groups as shown. One group is a sales group having hosts Sales-1 to Sales-N, a second group is engineering group having host Eng-1 to Eng-m. The other groups are a common server group having Mail and Web servers, sales server group having Sales Database server and engineering server group having Source Revision Control server.

A network manager can label each identified group with descriptive roles and set policies per group. The grouping process 200 continuously monitors communication patterns among the hosts and adjusts groups as computers are added and deleted from the network. In addition, the system flags policy violations, and raises alerts about potential security violations. Because information is presented on the level of groups (instead of individual hosts), a network manager is able to understand and process the changes of the network and alerts more easily.

In FIG. 20 that there are three server groups. The grouping process 200 does not necessarily combine the Sales Database group with the common server group of Mail and Web servers. This separation takes into consideration that the Sales Database server does not communicate with the hosts in the engineering group whereas the Mail and Web servers do. This distinction might be important in recognizing an intrusion detection event. For example, if a host in the engineering group were to suddenly start opening connections to the Sales Database server it might be a cause for alarm.

Role classification, or grouping, can be thought of as a graph theory problem. From the connection sets of I, role grouping generates a neighborhood graph, nbh-graph, where each node represents a host, and each edge with weight e represents that there are e common (one-hop) neighbors between the hosts. An undirected graph representation can be used since most communications between hosts is bi-directional.

One approach to the grouping problem is to treat grouping as a k-clique problem where the nbh-graph is partitioned into cliques of size k in which each edge in the clique has a weight greater than or equal to some constant c. Once a k-clique is identified, all the nodes in the k-clique are assigned to one group, since they all share at least c common neighbors. This approach is problematic, because the k-clique problem is NP-complete, that is it is solvable in exponential time. Moreover, requiring that all hosts in a group be one-hop neighbors may be too strong of a requirement.

Another approach is to treat grouping as related to the problem of identifying bi-connected components (BCCs). A BCC is a connected component in which any two edges lie in a simple cycle. Hence, to disconnect a BCC, one needs to remove at least two edges. Unlike the k-clique problem, BCC can be solved in O(V+E), where O is the order, V and E are the number of nodes and edges in the graph respectively. Moreover, all nodes in the BCC need not be connected to each other directly. However, forming groups simply based on similarity measures between host pairs may result in a partition that has more groups than desired, therefore after execution of a group formation process the grouping process executes an process that merges groups with similar connection habits.

Figure 21:
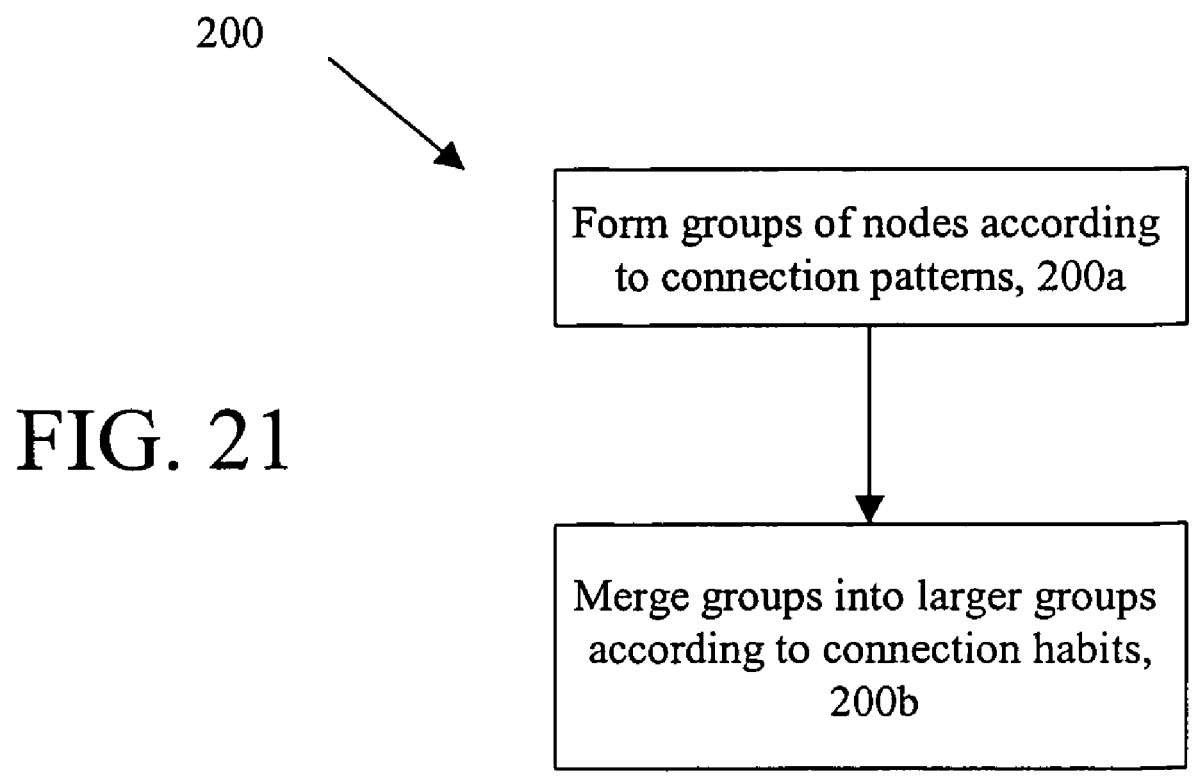
FIG. 21 is a flow chart depicting a grouping process.

Referring to FIG. 21, the grouping process 200 has two phases a group formation phase 200a and a group-merging phase 200b. In the group formation phase 200a, the goal is to identify groups each of which has one or more hosts with similar connection habits, and assign a unique integer identifier to each group. The group formation phase 200a may end up producing a large number of groups. The goal of the second phase 200b is to merge group pairs with similar connection habits to form larger groups. By merging similar groups, the group merging phase 200b produces results that more closely match the kind of partitioning that system administrators may find useful. The group merging phase 200b can be controlled in a fine-grained manner by setting the minimum similarity threshold required before two groups are merged to form a larger group.

Group Formation

Figure 22:
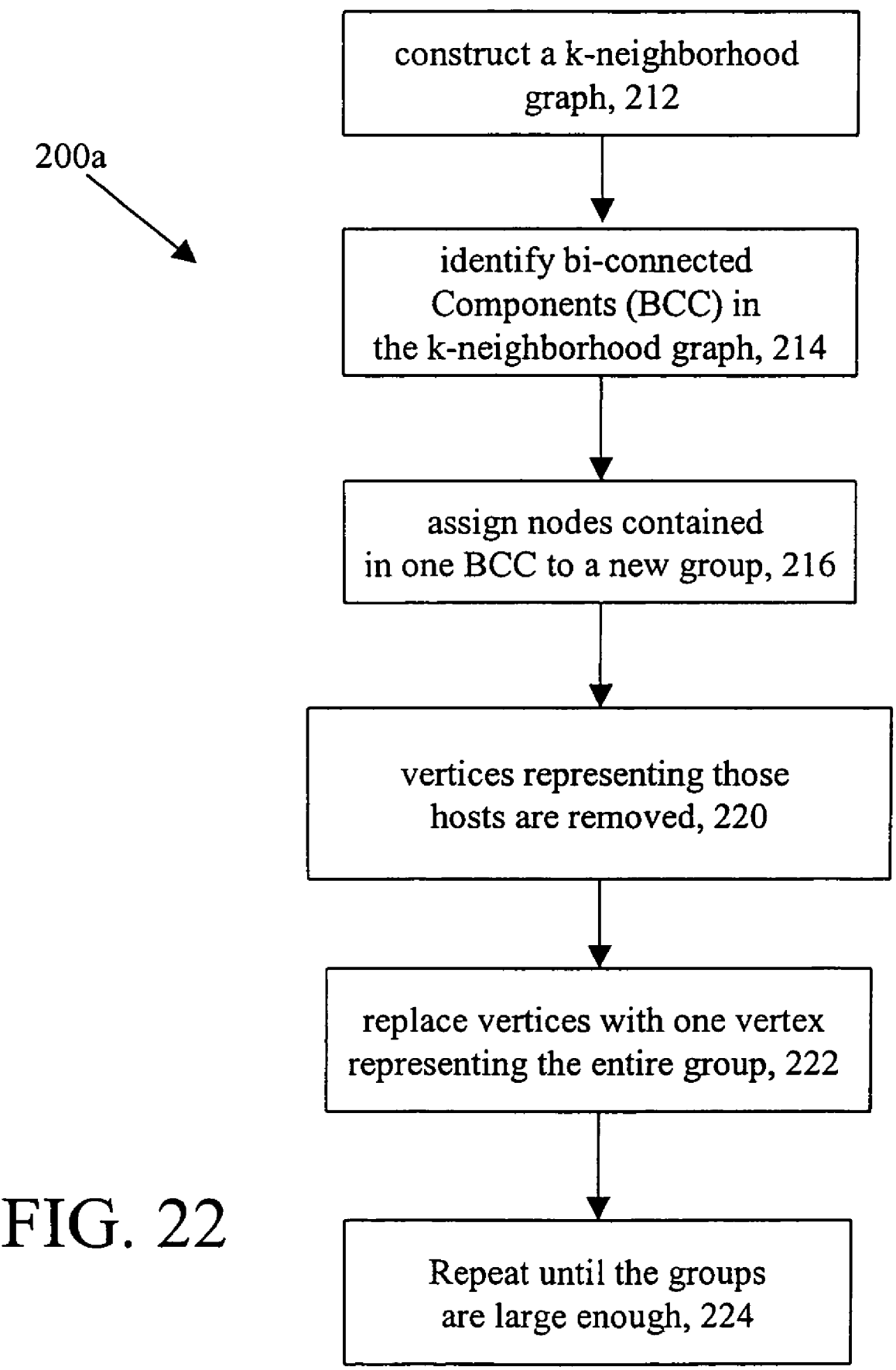
FIG. 22 is a flow chart depicting a group forming process.

Referring to FIG. 22, a group forming process 200a for grouping hosts is shown. The group forming process 200a produces groups based on observed connection patterns amongst the grouped hosts. Hosts as used herein can include computer systems, as well as other network devices. The grouping process 200a uses two types of representations of the network, connectivity graphs and k-neighborhood graphs. Initially, with a connectivity graph, each vertex of the connectivity graphs represents a host and an edge between vertices denotes a one-hop connectivity between corresponding hosts. From this connectivity graph, the grouping process constructs 212 a k-neighborhood graph. The grouping process 200a identifies 214 bi-connected components (BCC) in the k-neighborhood graph, and assigns 216 a group of nodes in one BCC to a new group. When a set of hosts is placed into a group, the vertices representing those hosts are removed 220 from the connectivity graph and replaced 222 by one vertex representing the entire group. There are edges connecting the new vertices to each node to which one of the hosts in the group was connected. The group forming process 200a is repeated 224 until the groups are large enough, e.g., approach the values of C1.

Figure 23:
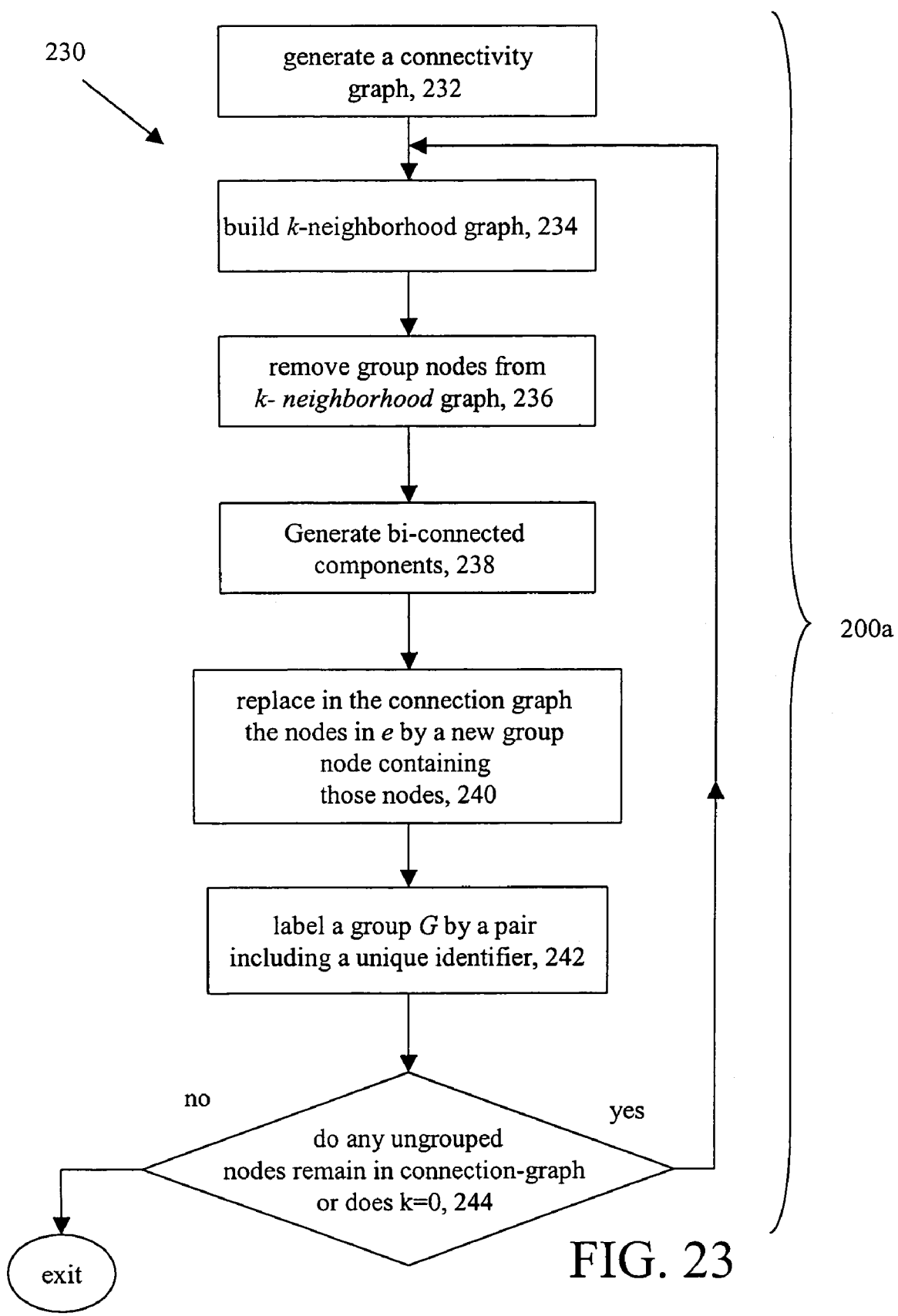
FIG. 23 is a flow chart depicting details of the group forming process.

Referring to FIG. 23, a detailed implementation 230 of the grouping forming process 200a is shown. The group forming process 200a generates 232 a connectivity graph, "conn-graph" based on observed connection patterns between hosts. For $k=k_{max}$ down to 1, where $k_{max}$ is the maximum number of hosts with which a single host communicates the grouping process iterates 233 over the following until no new groups can be assigned:

From "conn-graph" the group forming process 200a builds 234 the k-neighborhood graph "k-nbh-graph." The group forming process 200a removes 236 group nodes from "k-nbh-graph" and generates 238 all bi-connected components (BCCs) in "k-nbh-graph." For each BCC the group forming process 200a replaces 240 in the "conn-graph" the nodes in g by a new group node of those nodes.

The group forming process 200a labels 242 a group "G" by a pair (IDG, KG), where IDG is a unique identifier and KG is K. (KG is used to compute the degree of similarity between groups.) For each ungrouped host h, where h<PK (|C(h)|| and 0<PK<1 the process produces 244 a new group having only h.

The group forming process 200a executes iteratively over the conn-graph until no ungrouped node remains or k=0. Multiple bi-connected components (BCCs) may be identified simultaneously and a single node could be a part of several BCCs. In this case, the node becomes a part of a BCC with the largest size. By iterating over k from high to low, the group forming process 200a associates each host h with other hosts with the strongest similarity.

Since a bi-connected component (BCC) is not a clique, e.g., a related group, some node pairs in the BCC may not have edges between them and thus each of those node pairs does not share at least k common neighbors. Also any two nodes in the BCC have at least two disjoint paths between them. This is not true for the BCC with two nodes, which is treated as a special case as described above. Thus, the group forming process 200a identifies the cluster of nodes in which any two nodes form a "circular similarity relationship." The grouping process handles a "bootstrap" situation that could arise in some cases.

In some situations, the minimum-number of nodes required to form a BCC is two. In general, the minimum number of nodes to form a BCC is 3, since the process does not allow duplicate edges between any two nodes. However, two isolated nodes that are connected by an edge are allowed to form a group. The bootstrap problem occurs when there are hosts with a high number of connections, but no two hosts have many connections in common. In this situation, the first group will not be formed until k is low and the results may not be useful.

Assume, for example, that the group forming process 200a is grouping hosts on a small enterprise network with a Windows NT® server and a Unix® server. Assume that every non-server host in the network communicates with exactly one of the two servers. Since the Windows NT® server and the Unix® server are not similar to each other, no groups will be formed until k=1. There will be two resulting groups: one with the Unix® server and those hosts communicating with it, and the other with the Windows NT® server and the rest of the hosts. To prevent this, for any ungrouped host h, if k<Pk*|C(h)|, where Pk<Pk the process assigns a group, G=(H). In other words, the group forming process 200a forms a new group with only h members in the group, if the process finds any other nodes that do not have the number of common neighbors greater than or equal to Pk*C(h). Forming a group in this manner encourages BCCs of smaller size. With a value of Pk=0.6 group forming could work with similar types of networks.

Figure 24:
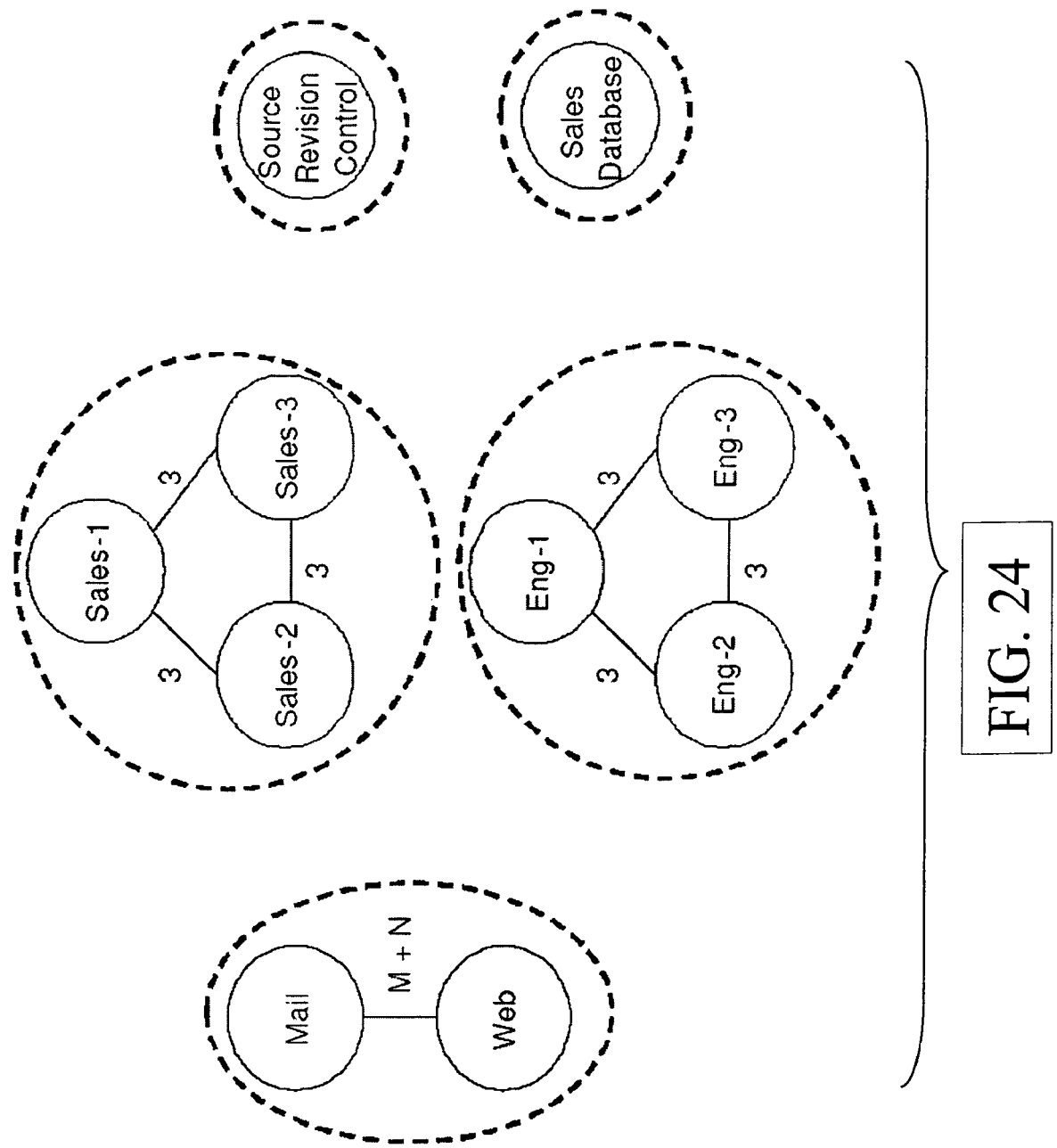
FIG. 24 is a diagram depicting a stage in grouping nodes.

Referring to FIG. 24, an example of the group forming process 200a for the network depicted in FIG. 20 is illustrated. The first group is formed when k=M+N, where M is the number of hosts used by sales personnel and N is the number of hosts used by engineers. For specificity, assume that M=N=3. As shown in the FIG. 24, the 6-nbh graph (6=M+N) has two hosts: Mail and Web and the group forming process 200a groups them in one group. When k=3, the group forming process 200a identifies two additional BCCs, one BCC having all the sales machines and the other BCC having all of the engineering machines. Because of the bootstrap condition, the group forming process 200a produces two groups, one having Sales Database and the other, SourceRevisionControl, when K=1<0.6*M.

Merging Groups

Figure 25:
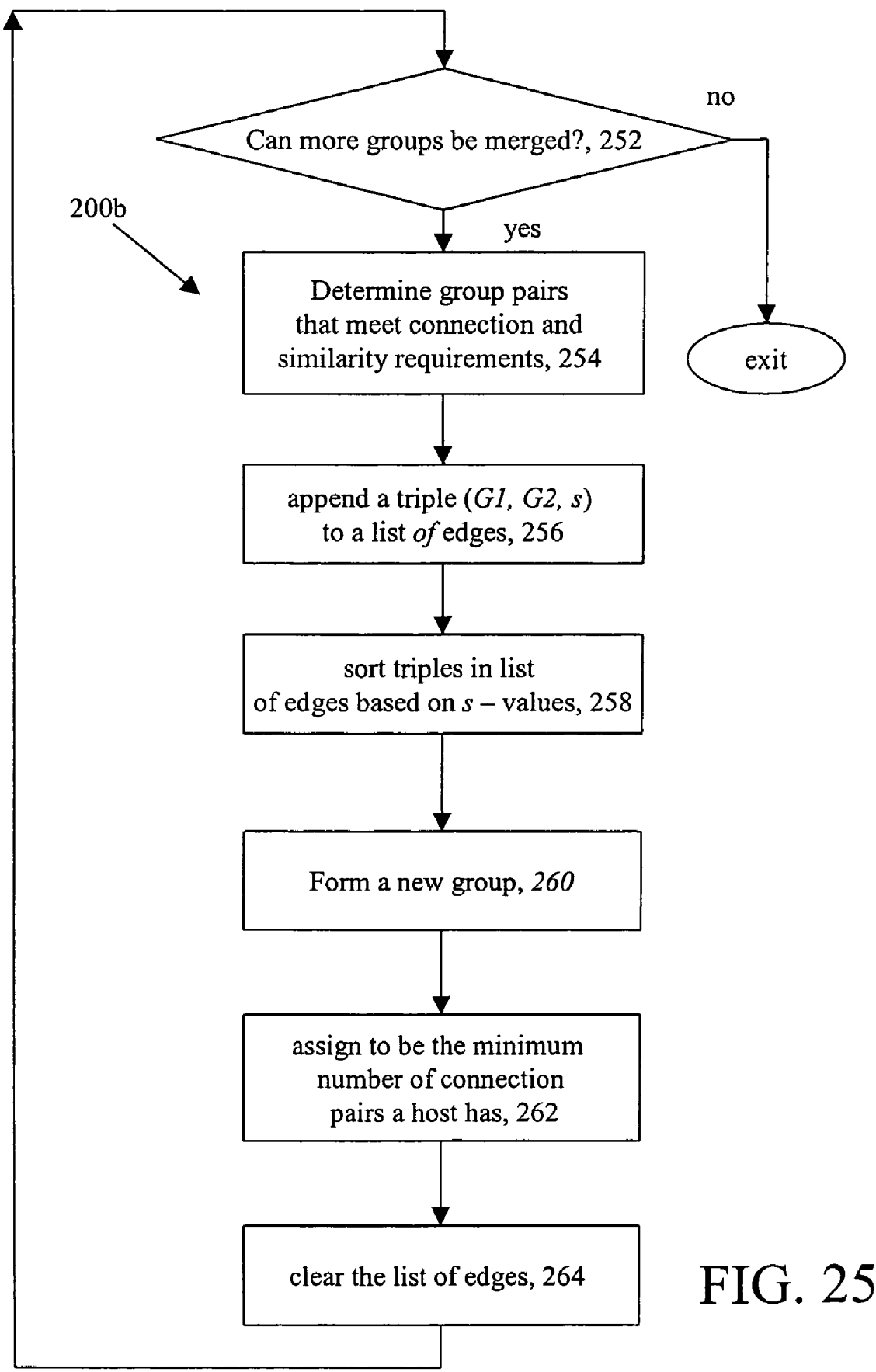
FIG. 25 is a flow chart depicting details of a group merging process.

Referring to FIG. 25, the group merging process 200b merges two or more groups with similar connection habits into a single group. Group merging can be used to reduce the number of groups. Consider the network in FIG. 20 with the modification that Sales-1 only communicates with Mail and SalesDatabase servers. The group forming process 200a produces two groups for the sales hosts, one that only has Sales-1 and the other that has the rest of the sales hosts. In some situations this is undesirable. Using a more sophisticated measure of similarity the group merging process 200b builds on the results generated by the group forming process 32. The group merging process 200b merges groups that are similar in connection habits, and provides users with the flexibility to have fine-grained control over the process so that more meaningful results can be achieved.

The group merging process 200b considers two groups to be similar if they meet a similarity requirement and a connection requirement. The similarity requirement is met if the similarity measure between the two groups exceeds user-defined thresholds. The connection requirement is met if the average number of connections of each group is comparable. This requirement keeps a group with a large number of connections from merging with another group with a much smaller number of connections. Although it is possible to incorporate this requirement in a single similarity measure, for simplicity, two separate measures are described. The group-merging process 200b iterates 252 over the following actions until no more groups can be merged.

For each group pair, (G1, G2), that meets 254 the average connection requirement and the similarity requirement, the group merging process 200b appends 256 a triple (G1, G2, s) to a list gnbh-edges, where s- represents the degree of similarity on the scale of 0 to 100. The group merging process 200b sorts 258 gnbh-edges based on their s— values in descending order. From the top triple (G1, G2, s), the grouping process 200a forms 260 a new group g=G1 U G2, and assigns 262 kg to be the minimum number of connection pairs a host in G has. The process 200a clears 264 the gnbh-edges.

TABLE 1

PROCEDURE MEETCONNECTIONREQ($G_1$, $G_2$) {

$$a1 \leftarrow \frac{\sum_{h1 \in G_1} C(h1)}{|G_1|}$$

$$a2 \leftarrow \frac{\sum_{h2 \in G_2} C(h2)}{|G_2|}$$

if (a1 is within $P_{conn}$ percent of a2)
    return true
else
    return false
}
PROCEDURE MEETSIMILARITYREQ($G_1$, $G_2$) { kmax ← max($K_{G_1}$, $K_{G_2}$)
    s ← SIMILARITY($G_1$, $G_2$)
    if (kmax ≥ $K^{hi}$ and s ≥ $S_g^{hi}$)

return true;

else if (kmax < $K^{hi}$ and s ≥ $S_g^{lo}$)

return true
    else
        return false

TABLE 1-continued

```
}
PROCEDURE SIMILARITY(G₁, G₂) {
```

$$c1 \leftarrow \sum_{h \in C(G_1)} \text{WEIGHT}(G_h) * CP(h, G_1)$$

$$c2 \leftarrow \sum_{h \in C(G_2)} \text{WEIGHT}(G_h) * CP(h, G_2)$$

$$\forall h \in C(G_1) \cap C(G_2)$$

$$s \leftarrow \text{WEIGHT}(G_h) * \min(CP(h, G_1), CP(h, G_2))$$
$$gs \leftarrow s + gs$$

$$gs \leftarrow \frac{gs}{\min(c1, c2)} - \left(R_d * \frac{c1 + c2 - (2*gs)}{c1 + c2}\right)$$

return $100 * \max(gs, 0)$

```
}
PROCEDURE WEIGHT(G) {
```

$$\text{return } \frac{K_G + K\text{Max}(\ )}{2 + K\text{Max}(\ )}$$

```
}
```

Table 1 above depicts pseudo-code for determining the average connection requirement and the similarity requirement. The procedure "MEETCONNECTIONREQ" decides whether the two groups, G1 and G2, meet the connection requirement and G1 and G2, meet the connection requirement if the average number of connected host pairs of each group is within Pconn percent of each other, where Pconn is between 0 and 1.

"MEETSIMILARITYREQ" determines whether the two groups meet the similarity requirement. Groups G1 and G2 meet the similarity requirement if the similarity measure between them exceeds the user-defined threshold. For the reasons explained shortly, two thresholds, Shi. and Slo are used, depending on whether max(KG1, KG2)>Khi or not. The value "Khi" is a constant that is used to determine whether a particular k value is "high." Recall that kg is the maximum number of one hop common neighbors that hosts in G share when forming the group. The values Shi and Slo (Shi.>Slo) are the similarity thresholds that can be set by the users to control the merging process. The condition (Shi.>Slo) is necessary since merging two groups could change the relations between other groups and may force additional merges of groups, which may not be desirable. The effects of a group merge depend on the particular groups that are merged and how the merged groups relate to other groups. In general, merges of groups with high k values could lead to undesirable results.

Using the groups in the network in FIG. 20 if N is large, the similarity measure between the "SalesDatabase" group and the Mail and Web group will be large. Similarly, for large x, the "SourceRevisionControl" group will be similar to the Mail and Web group. If all three groups were to merge, it will effectively cause the Sales group and the Engineering group to merge, resulting in a partitioning of two groups, one having all the servers and the other group having the remainder of the hosts.

In most situations such a partition would be undesirable since the network administrators lose important separation, e.g., between the Sales hosts and the Engineering hosts. For these reasons, groups with high k values are also required to have a higher similarity measure to merge. The goal in computing similarity measure is to ensure that groups with strong similarity in their roles (in terms of connection patterns) yield a large measure. Guidelines can be used in computing the similarity measure between groups including favoring groups that form a subset relation and favoring groups that have similar average numbers of connections.

"SIMILARITY" computes the similarity measure "$g_s$" between the two groups, G1 and G2, on a scale of 0 to 100. CP(h, G) returns the total number of connections between h and hosts in G. The ∀ loop computes the sum of the minimum number of weighted connections that the two groups have with each of their common neighbor. For each neighbor h of G, the connection between h and G is weighted according to the properties of the group that h belongs to (denoted by Gh).

The final similarity measure includes two terms. The first term is the ratio of the sum computed earlier to the minimum of the number of weighted connections that each group has. Thus, if a group is a proper subset of another group, the first term will evaluate to 1. The second term encourages the groups that have similar average numbers of connections by penalizing those groups with drastically different numbers of connections, (e.g., weighting them not similar). The value Rd is set to 0.4. Since the first term varies from 0 to 1, the combined similarity measure $g_s$ could be negative. For simplicity, the similarity measure is between 0 and 100 inclusively.

For the purpose of comparing connection sets, some groups should be deemed more valuable as a neighbor than some other groups. For instance, a connection with a server group is considered more valuable than a connection with a non-server group. A group is considered to be server-like if it has a high k value. A high k value actually implies that the group's average number of connections is high. A procedure WEIGHT calculates the weight of a group based on its k value. The weights are normalized between 1 and 2. $K_{MAX}$ returns the maximum k value assigned to any group. Whenever a new group G is formed as a result of combining two existing groups, KG is set to be the minimum number of connection pairs a host in G has. Other ways to calculate the k value of the new group are possible.

Model

Let I be the set of hosts in an enterprise network. The role grouping process uses "|I|" to denote the number of hosts in I. Let similarity be a commutative function from pairs of hosts in I to an integer greater than or equal to Q. Thus, if similarity (h1,h2) is high, then the grouping process should place hosts h1 and h2 in the same group. Techniques to define similarity so that it is both efficient to compute and yields a logical grouping are discussed below.

A partitioning P of I respects similarity if for all distinct groups:

Similarity $(h1,h2) \leq$ similarity $(h1,h3)$ similarity $(h1,h2) \leq$ similarity $(h2,h3)$ Extending this definition of similarity to define the average similarity between a host h1 and a group G2, avg similarity (h1, G2) is the ratio of the sum of the similarity between h1 and each h2∈G to the number of hosts in G2.

avg similarity$(h1,G2) = \Sigma h2 \Sigma_{h2 \in G}$similarity$(h1,G2)/|G2|$

A partitioning P of I respects average similarity if ∀h∈G and G1∈P if the average similar of (h,G) is greater than or equal to the average similarity of (h, G1). Similarity or average similarity is not sufficient to generate a useful partitioning of I, since a partitioning that puts all the nodes in one group or one that puts each node in a separate group can be based on similarity. The process has a parameter that can be used by network administrators to control how aggressive role grouping process is in partitioning nodes into groups.

Let $S_h$, the similarity threshold, be an integer greater Q. A partitioning of hosts into groups respects similarity and $S_h$, if the partitioning respects similarity and if, for h1 and h2 in G, similarity(h1,h2)≧Sh.

A partitioning P of I is said to be maximal with respect to similarity and $S_h$ if the partitioning P of I respects similarity and $S_h$ and there does not exist another partitioning of I that respects similarity and Sh and has a larger average group size. By increasing $S_h$, the grouping provides a maximal grouping with fewer groups in which the members of each group are more similar to each other.

Defining Similarity

Role grouping of hosts is based on connection habits between hosts. Similarity is defined in way that captures the extent to which pairs of nodes establish connections with each other. The role grouping process defines similarity between hosts as a function of the number of common hosts with which the pair of hosts communicate. A connection is a pair having a source host address and a destination host address. The connection set of a host, (CH) is the set, {a|a ∈ I and there is a connection between h and a}. If h1 ∈ C(h2), then h2 ∈ C(h1). A relation neighbor (h1,h2) is defined to be true if and only if h1=h2 or h1 ∈ C(h2). For later use, a neighbor to groups is extended by defining neighbor (G1,G2) to be true if and only if there exists a host h1 ∈ G1 that is a neighbor of another host h2 ∈ G2.

The notion of a connection set provides a simple definition of similarity:

$$similarity(h1, h2) = |C(h1) \cap C(h2)| \quad (1)$$

That is, similarity h1, h2 is equal to the number of one hop neighbors that hosts h1 and h2 have in common. The requirements of a grouping process can be specified. Given a set of hosts, I and a similarity threshold, $S_h$, the grouping process finds a partitioning, P of I that is maximal with respect to average similarity and $S_h$, i.e., that P respects average similarity. This constraint guarantees that each host is within the group with which it has the strongest average similarity (∀h∈G and G1∈P, avg similarity (h,G)≧Sh). This guarantees that each host in a group is sufficiently closely related to every other host in the group, ensuring that groups are not too large and that there is no other partitioning P of I that meets the first two requirements and has a larger average group size. This guarantees that groups are not too small.

FIG. 24 above shows the evolution of the grouping process at various k values. Note that this is independent of the definition of avg_similarity. For some networks, e.g., the one represented in FIG. 19, the above definition of avg_similarity may provide good results.

Role Correlation

Over time, connection habits may evolve as new servers and clients are added to a network while some existing hosts (servers and clients) leave the network. Sometimes hosts may behave erratically as a result of being victims or villains of denial of service (DOS) attacks. Due to any of these behaviors and others, the grouping process 30 may produce a drastically different set of groups than a grouping produced by the process a few days previously. As explained, the grouping process 30 assigns an integer ID to each group of hosts that it identifies. There is no guarantee that the sets of IDs produced by different executions of the grouping process will have any correlation between them. This is clearly undesirable to the users who may want to associate logical names and configurations to the group IDs and preserve these group specific data throughout the executions of the grouping process.

Figure 26:
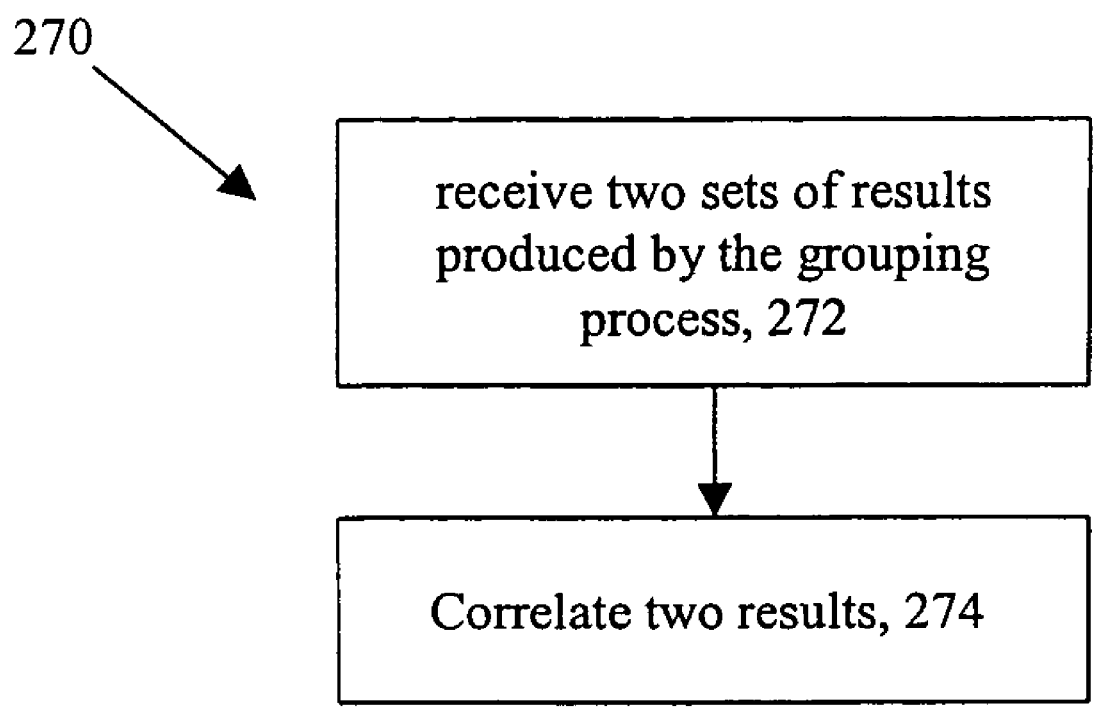
FIGS. 26-28 are flow charts depicting details of a group correlation process.

Referring to FIG. 26, a group correlation process 270 that takes 272 two sets of results produced by the grouping process 200a and correlates 274 the IDs of one set with those of the other set so that the two groups, one in each set of resulting groups, that have almost identical connection habits will have the same ID.

The process 270 uses a unique host identifier that does not change. In some implementations the IP address may be used. In others it may not be sufficient when the Dynamic Host Control Protocol (DHCP) is used since a host's IP address may change over time. One solution is to use DNS names as unique identifiers and dynamically update the changes in IP addresses. Other techniques may be used to deal with hosts that have link local IP addresses, which may change periodically.

The connection habits of a host may change as a result of arrival of new hosts, removal of existing hosts, and role changes by existing hosts. Due to one of these events, some existing hosts may communicate with different sets of hosts and thus, the results of the grouping process 30 before and after these events may be different. For instance, new groups can be formed or existing groups can be deleted. In addition, as the set of members belonging to an existing group changes, the connection set of an existing group changes. The changes affect the hosts directly involved in the aforementioned events and other hosts whose connection habits have not changed. This is because the changes in connection habits of a host also affect the similarity in connection patterns between that host and other hosts.

Given awareness of every single event that happens between two executions of the grouping process 30, the results of the first execution could be incrementally updated to achieve the new results. However, this is not realistic. The whole purpose of the grouping process 30 is to use the information available in the network and automatically generate grouping results that are meaningful to the users. Hypothetically, if the exact sequence of every single change event that happened between the two executions of the grouping process is known (e.g., by logging changes in a change log), the results of the first execution could be incrementally updated to achieve the new results. Having such a change log, although not impossible, can complicate network data gathering.

A detailed change log may not lead to correct ID correlations. Consider an example in which two nodes, A and B that are in different groups switch their roles. Assume that node C, which used to communicate with A now communicates with B instead. From the change log, it would seem that the connection habits of both C and B changed, whereas in reality C's logical role never changed. The difficulty here is in distinguishing which changes in connection habits are the primary effects that result in different group formations between the two executions of the grouping process 32. Furthermore, there may also be natural changes in connection habits of many nodes. For instance, an existing server machine may be replaced by two new machines that do load sharing among client machines. The logical roles of the client machines have not changed but their connection patterns have.

Described below is a role correlation process that does not rely on a change log but rather uses the same set of information made available to the grouping process 32.

Role Correlation Process

Figure 27:
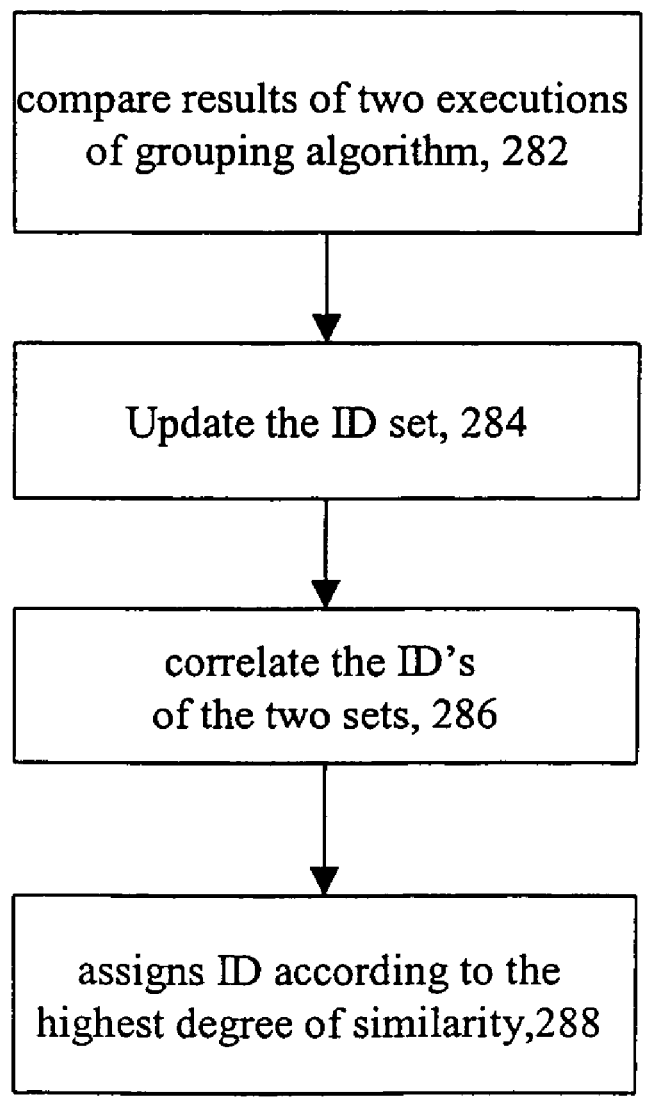

Referring to FIG. 27, an implementation of role correlation process 270 is shown. The role correlation process 270 compares 282 the results of two executions of the grouping process 30. Let $G^{t-1}$ and $G^t$ be the group sets generated by the grouping process at time t-1 and t respectively. The correlation process 270 updates 284 the ID set of $G^t$, $ID(G^t)$ so that $ID(g^{t-1})=ID(g^t)$ where $g^t$ is a member of the set $G^t$ and $g^{t-1}$ is a member of the set $G^t$ if $g^t$ and $g^{t-1}$ are considered to be the same group, i.e., if the connection habits of the members of $g^t$ and those of $g^{t-1}$ are very similar. The group correlation process correlates 286 the $ID(g^t)$ and $ID(g^{t-1})$ in a manner that allows applications to preserve data specific to a particular group. The role correlation process isolates primary events, such as node arrivals and removals that directly affect the connection habits of groups, identifies nodes that have not changed their neighbors and heuristically computes the similarity between the connection habits of two groups. The role correlation process assigns 288 $ID(g^t)=$ to $ID(g^{t-1})$ only if $g^{t-1}$ has the highest degree of similarity with $g^t$.

Figure 28:
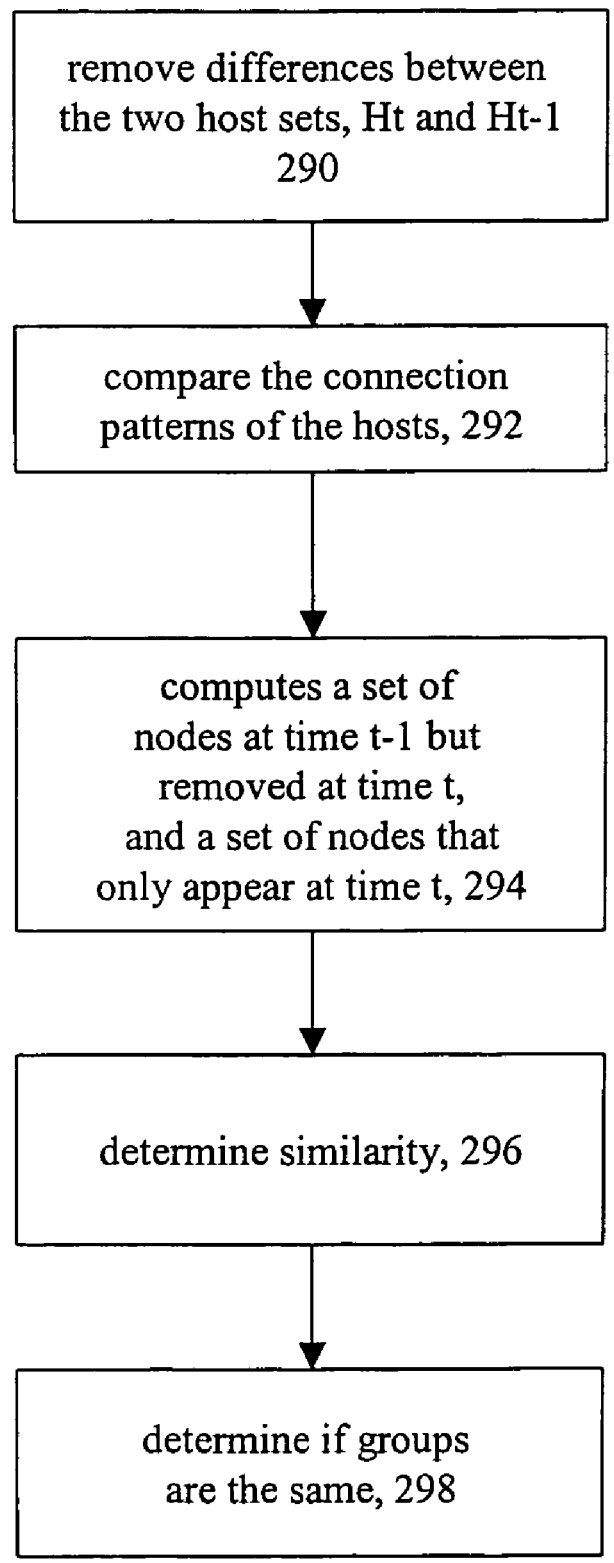

Referring to FIG. 28, the correlation process 270 removes 290 differences between the two host sets, $H^t$ and $H^{t-1}$ so that the correlation process 270 can compare 292 the connection patterns of the hosts. The process computes 294 a set of nodes that existed at time t-1 but have been removed in time t, and a set of nodes that only appear at time t. These two computed sets represent the difference sets between $H^t$ and $H^{t-1}$. All new nodes are removed from $H^t$ and deleted nodes are removed from $H^{t-1}$. Thus, the changes in the connection set of each host are only as a direct result of changing connection patterns between the host and its neighbors (which existed at time t).

The process attempts to correlate groups between $G^t$ and $G^{t-1}$ by determining 296 the similarity between the connection habits of hosts in each group. To do so, the process identifies the set, $H_{same}$, of nodes that have not changed their neighbors from t-1 to t. For the two groups, $g^t$ and $g^{t-1}$, the similarity is computed as follows:

If both groups have a common host neighbor, $nH_{same}$ is a member of $H_{same}$, then the similarity value is simply the minimum value of the average numbers of connections that $g^t$ and $g^{t-1}$, have with $nH_{same}$. For all neighboring nodes $nh^t$ $nh^{t-1}$ that are not in $nH_{same}$ the relation between $Nh^t$ and $g^t$ are considered similar to that between $Nh^{t-1}$ and $g^{t-1}$ if the total number of connections between $Nh^t$ and $g^t$ is close to the total number of connections between between $Nh^{t-1}$ and $g^{t-1}$. The similarity value between a similar neighbor pair, $nh^t$ $nh^{t-1}$, is again computed as the minimum of the average number of connection between $Nh^{t-1}$ and $g^{t-1}$ and that between $Nh^t$ and $g^t$.

The degree of similarity between $g^t$ and $g^{t-1}$ is the sum of the similarity values that $g^t$ and $g^{t-1}$ have with their similar neighbors. For all of the groups $g^t$ that are a member of $G^t$, and groups $g^{t-1}$ that are a member of $G^{t-1}$ that remain uncorrelated, the process determines whether $g^t$ and $g^{t-1}$ are similar based on how similar the connection patterns between $g^t$ and its neighbor groups are to the connection patterns between $g^{t-1}$ and its neighbor groups.

To decide whether $nh^t$ and $nh^{t-1}$ are similar the process 270 uses the total number of connections between the neighbor host and the group as a factor to decide whether the two groups share similar neighbors. All neighbors of $g^t$ that are not in $Hs_{ame}$ are sorted in descending order using the total number of connection between the neighbor host and $g^t$ as a key. This sorting is repeated for $g^{t-1}$ and its neighbors. The process 270 examines the two-sorted lists. Each list has a pointer, pointing to its first element. The two neighbor hosts that the two pointers point to are compared to see whether the total number of connections each node has with the corresponding group is within a specified threshold. If so, the total similarity value between $g^t$ and $g^{t-1}$ is incremented as explained earlier.

Otherwise, the process 270 increments one of the pointers that points to the neighbor host with the greater total number connection with the group. The two groups $g^t$ and $g^{t-1}$ are considered to be similar only if the degree of similarity between the two groups is greater than the predetermined threshold.

The aforementioned heuristics are applicable for a relatively small number of changes in the connection habits of the groups. In extreme situations, many groups may still remain uncorrelated. Another process to correlate the remaining uncorrelated groups examines the connection habits between groups. The two groups $g^t$ and $g^{t-1}$ are considered similar if $C(g^t)$ and $C(g^{t-1})$ are similar.

The similarity between group connection habits, as opposed to host connection habits, is used to make the decision 298 on whether the two groups, $g^t$ and $g^{t-1}$ are logically similar. The group connection habits of a group g, C(g) are the set of pairs in which each pair (n, ng) is made up of the neighbor group, ng and the total number of connections, n, between g and ng. The technique for determining whether $C(g^t)$ and $C(g^{t-1})$ are similar, is similar to the technique used for determining whether the connection patterns to the neighbor hosts are similar (as discussed above), and thus is omitted for brevity.

Feedback Mechanism and Graphical User Interfaces

Figure 29:
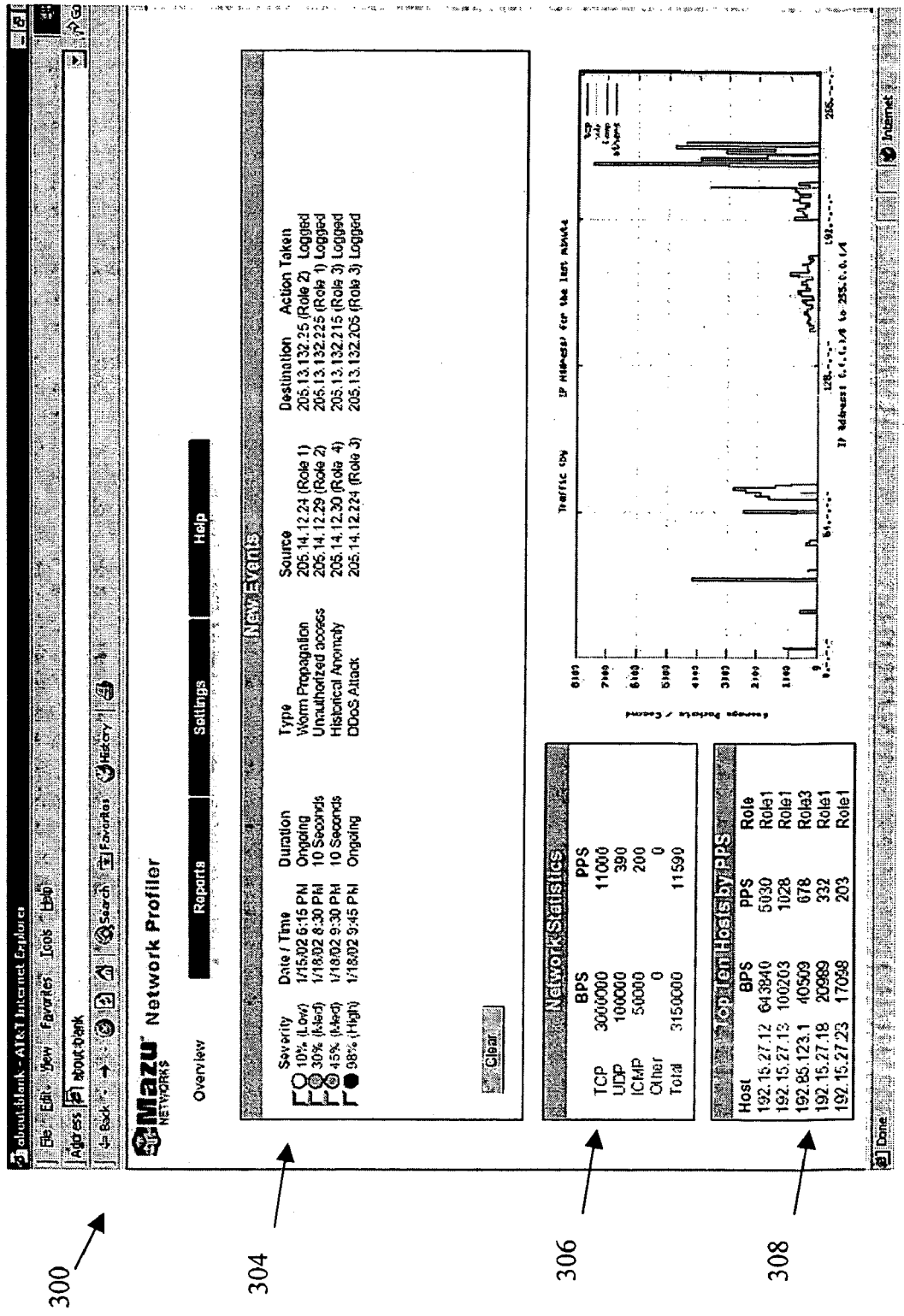
FIGS. 29-30 depict screens in a feedback mechanism.

Referring to FIG. 29, an overview graphical user interface 302 (GUI), provides an operator with an aggregated view of network status. The overview graphical user interface 302 displays a list of events 304 identified by the system 10. Within the list of events 304, the overview graphical user interface 302 shows information such as indicating whether the events are new events and includes parametric information pertaining to the event such as Severity, Date, Time, Duration, Type of event, Source, Destination, and Action Taken. Severity is bucketed into various categories such as low, medium, and high. The severity is determined based on what percentage of an established threshold for issuing an event notification is reached by the event. The type of event can be any of the types of events monitored by the system 10 and can include event types such as "worm propagation", "unauthorized access", "DDOS attack" "historical anomaly" and so forth.

Destination and source fields are populated with IP addresses, as well as, role classification of the host in the network. For instance, for the source on the DDOS attack the source host is shown by an network address "205.14.12.224" and the role is displayed as "(Role 3)", which could be an assigned role in the system or an alphanumeric or equivalent identification. The destination is similarly identified by network address, e.g., 205.13.132.205 and role, (Role 3). Actions taken can include any of the actions permissible in the system such that the event was "Logged", as shown or other actions.

The overview graphical user interface 302 also displays network statistics 306 such as the number of bytes per second and packets per second of each type of protocol observed in the system, e.g., TCP, UDP, ICMP and Other, as noted. The overview graphical user interface 302 displays 308 the highest ranked hosts according to some statistical measure, e.g., by packets per second or other statistical measure.

Figure 30:
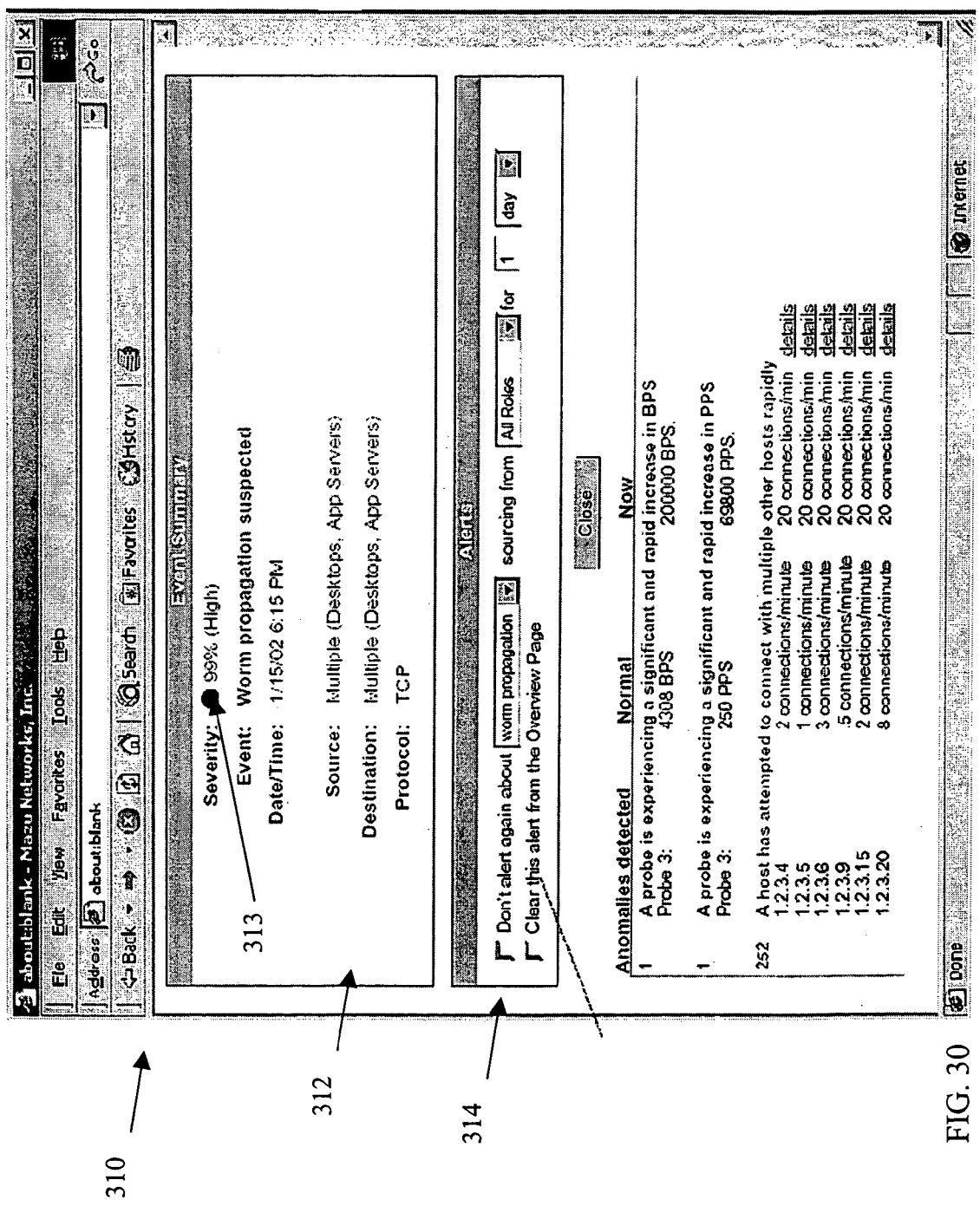

Referring to FIG. 30, to view the details of an event, a user can click on the line-item in the overview graphical user interface 302 and launch an event details screen 310. The event details screen 310 provides further detail about events. In particular, the event details screen 310 provides a summary 312 of the anomalies identified as part of the event. In the summary 312 the event severity as well as details such as the Date/Time, Source, Destination, and Protocol used are displayed along with values for these items. Event severity is coded, e.g., by a color or other indicia 313 applied to the event or an icon to attract the user's attention.

The event details screen 310 also includes an alert action region 314 where a user can "snooze" future alerts related to this event for a fixed period of time (for example, while the event is being addressed). The "snooze" feature can be for selected event types, sourced from "All Roles" for a defined period of time. A control "clear this alert from the Overview Page" will appear if the alert appears on the overview page. That is, the "clear this alert from the Overview Page" can be launched from the Alert Report page on an event that was cleared from the overview page.

An event details region 316 of the event details screen 310 depicts those anomalies that were used to classify the event. For instance in FIG. X1, the event details screen 310 displays what has happened, i.e., current statistics on anomalies detected and historical values for these anomalies, such as the anomalies that a probe is experiencing.

A significant and rapid increase in Bytes Per Second (based on historical values) and can actual identify the probe, e.g., "Probe 3: 4308 BPS normal and 200000 BPS current." A similar measure can be provided for packets per second as shown.

In addition, in the illustrated example, "252" occurrences of the anomaly of the type: "A host attempted to connect with multiple other hosts rapidly" occurred. The event details region 316 indicates that the hosts, e.g., Host "1.2.3.4" if operating under a normal connection rate would have historically had two (2) connections/minute attempted, the whereas the operator can observe the much higher rate of 20 connections/min and can take action based on the connection rate. For instance, the event details region 316 allows a user to select "details" that will show details about the selected anomaly. For example, if the user clicks on the first "details" link in the list, the user is presented with the list of IP addresses to which the host attempted to connect.

Figure 31:
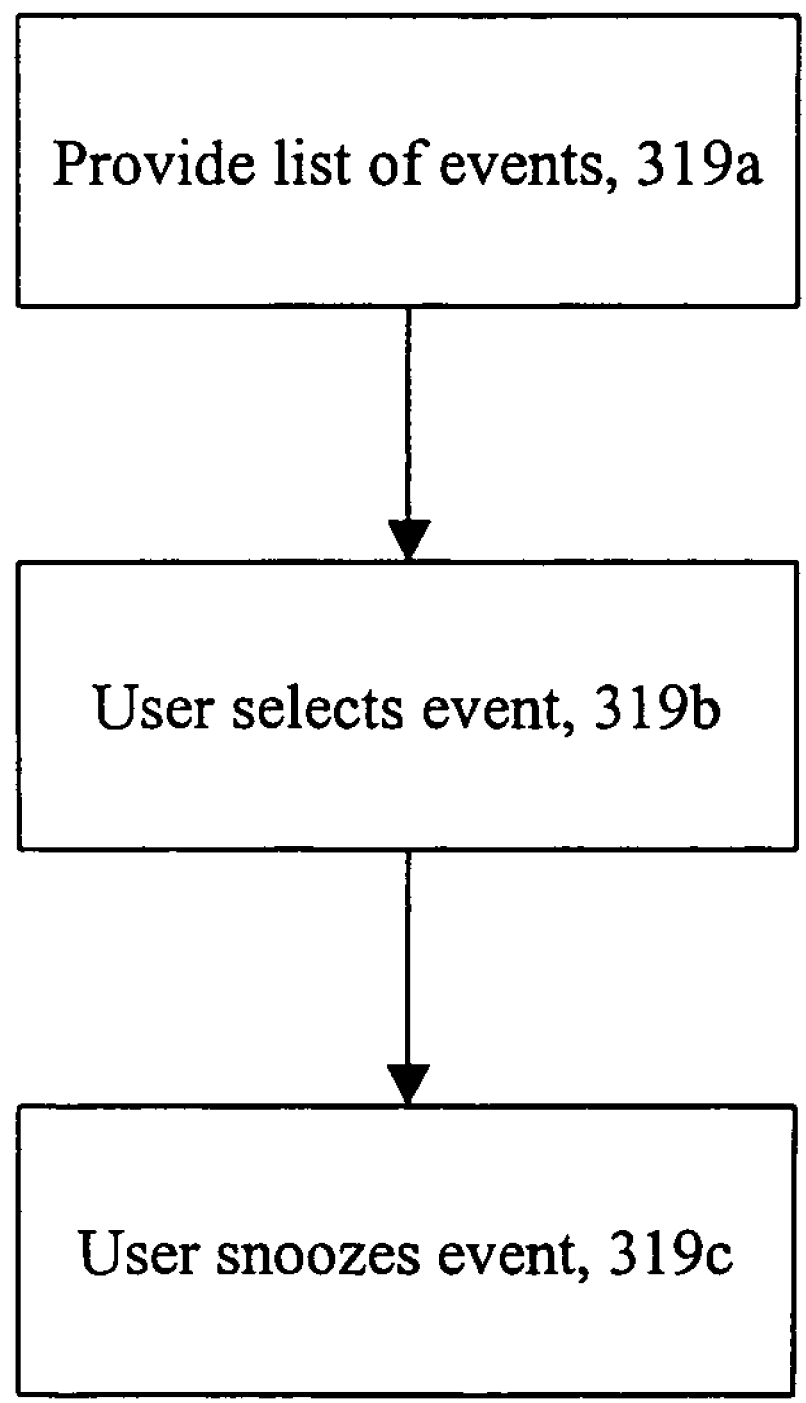
FIG. 31 depicts a flow chart in a feedback mechanism.

Referring to FIG. 31, a process 319 to minimize false assertions of alert conditions and train algorithms to recognize when anomalies should or should not be classified as events is shown. The process provides 319 an operator with a list of events identified by the intrusion detection system. Within the list of events is information that indicates event severity, with severity determined based on an event having a percentage relationship to an established threshold for issuing an event notification, as discussed above. The information can be provided by the overview graphical user interface 302. The overview graphical user interface 302 displays the list of events. Selecting 319b one of the listing of events launches the event details screen 310 displaying details of a selected one of the events to a user.

The user can "snooze" 319c future alerts related to the selected event by selecting the snooze control in the event details screen 310. Future alerts related to the selected event can be snoozed for a fixed period of time. The snooze control allows a user to select event types and roles. The event details screen 310 allows a user to clear a selected alert from the list of events and displays event details including anomalies that were used to classify the event. The event details screen 310 indicates normal operating conditions of a host and current operating conditions of a host to allow the operator to take action. Examples of the operating conditions displayed include normal and current connection rates of the host, packets per second (PPS) and bytes per second (BPS) and so forth.

The process can display network statistics and display a ranking of hosts in the network according to a network statistical measure. The network statistical measure can be a number of bytes per second and/or packets per second of each type of protocol observed in the system.

The event types include worm propagation, unauthorized access, denial of service attacks, and historical anomaly detections. Other event details that can be displayed include destination and source fields populated with IP addresses and role classification of the host in the network.

Reports

Referring to FIGS. 32-36, the system provides reports including the following: "an event history report" 320, "a host profile statistics report" 330, "a role profile statistics report" 340, and "a probe profile statistics report 350."

Figure 32:
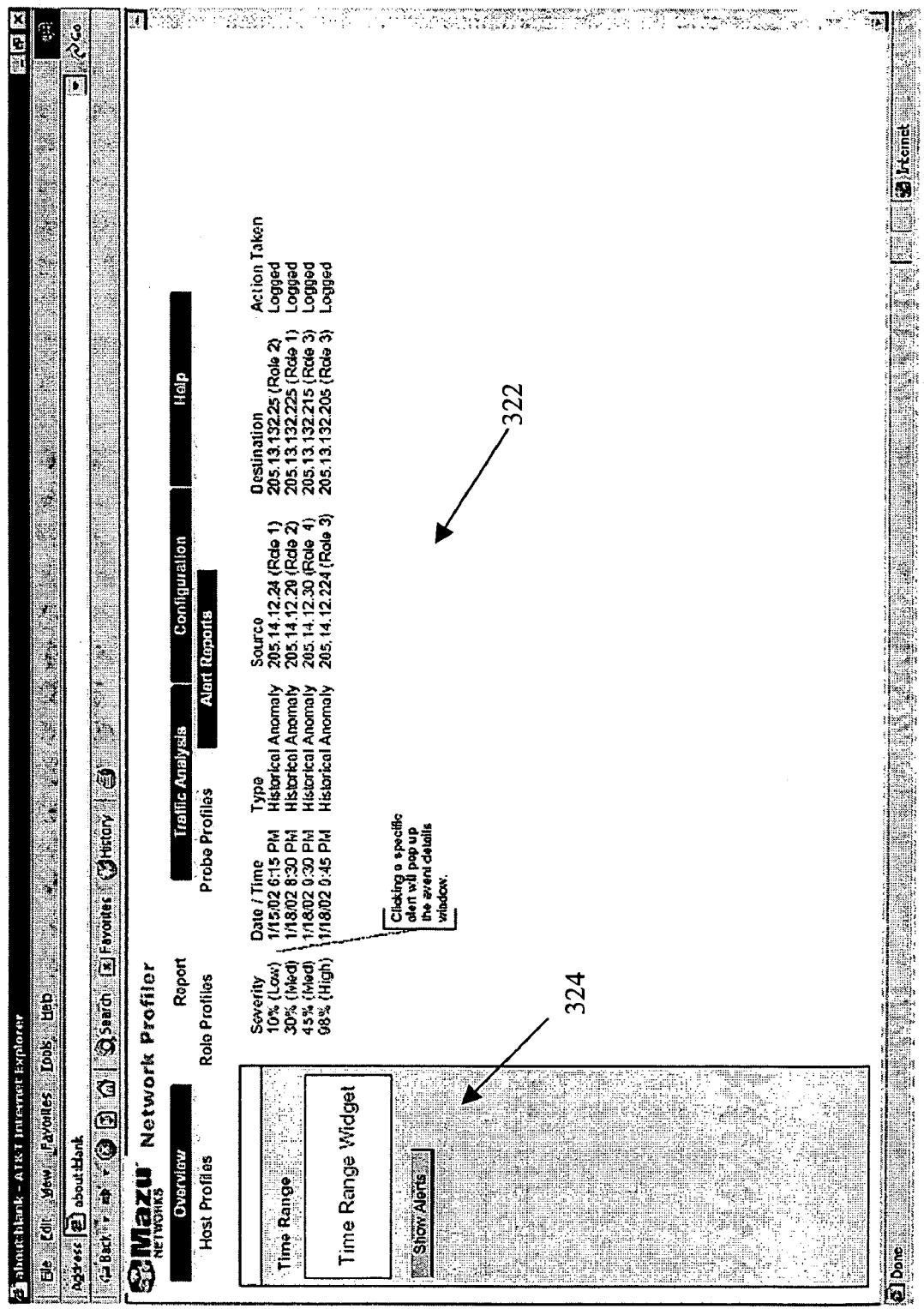
FIGS. 32-36 depicts screens for reports.

Referring to FIG. 32, the event history report 320, depicts similar information as in the top portion 322 of the overview GUI 300 (FIG. 29). The event history report 320 also includes a "time widget tool" 324, which allows a user to select a time range over which to base the report. As with the overview interface 300, clicking on a specific alert will pop up the event details screen 310. This report allows the user to search all of the events triggered during the specified time period.

Figure 33:
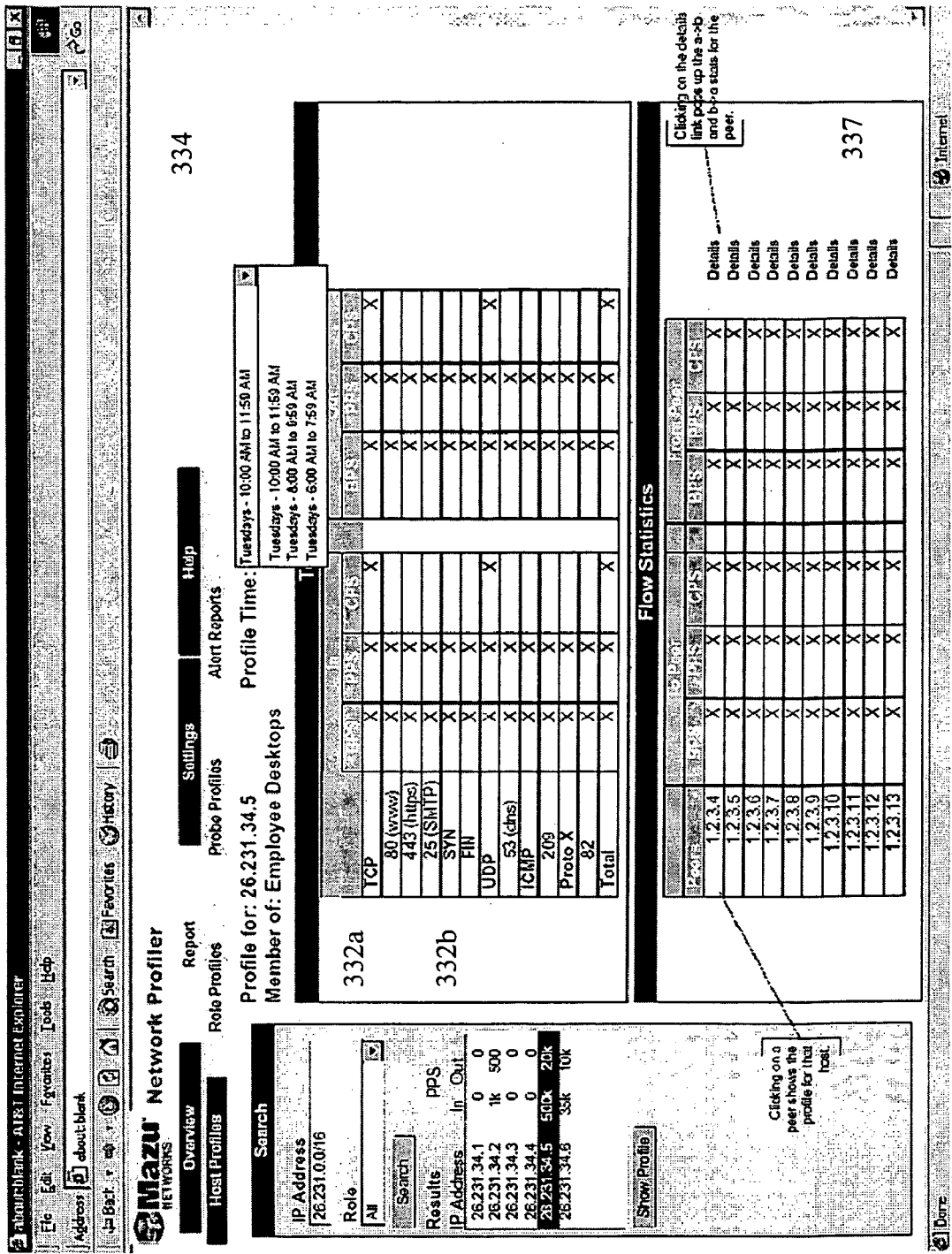

Referring to FIG. 33 a host profile report 330 is shown. The host profile report 330 includes a search region 332 that allows a user to search for a particular host by entering an exact IP address (in which case, the profile information appears directly or specifying a CIDR block and selecting the host from a list of IP addresses matching that CIDR block that have been seen on the network. Also the search region 332 of the host profile report 330 has a field 332b that allows a user to specify a role and select the host from a list of IP addresses within that role. A user can specify a CIDR block and Role and select a host from a list of IP addresses within that role and CIDR block. This report shows in a first list 334 traffic statistics for the selected host and in a second list 336 traffic statistics for traffic between that host and its peers. By clicking on a details link 337, the user will see more detailed traffic statistics for the traffic between the host and the selected peer.

Thus, a search for the IP address "26.231.0.0/16 yields the IP addresses and packet per second rates as in Table 2:

TABLE 2

| IP address | In | Out |
| --- | --- | --- |
| 26.231.34.1 | 0 | 0 |
| 26.231.34.2 | 1k | 500 |
| 26.231.34.3 | 0 | 0 |
| 26.231.34.4 | 0 | 0 |
| 26.231.34.5 | 500k | 20k |
| 26.231.34.6 | 36k | 10k |

Clicking on one of the entries depicts the profile for that IP address, (e.g., 26.231.34.5) will launch the profile shown in the FIG. 32 indicating that the profile for "26.231.34 5" indicates that the host "26.231.34 5" is a member of "Employee Desktops" role, and will depict totals of traffic into the host and out of the host in table 364 and flow statistics in table 366. Clicking on a peer shows the profile for that peer host. Clicking on the details link pops up the connection (a→b and b→a) statistics for the peer.

Figure 34:
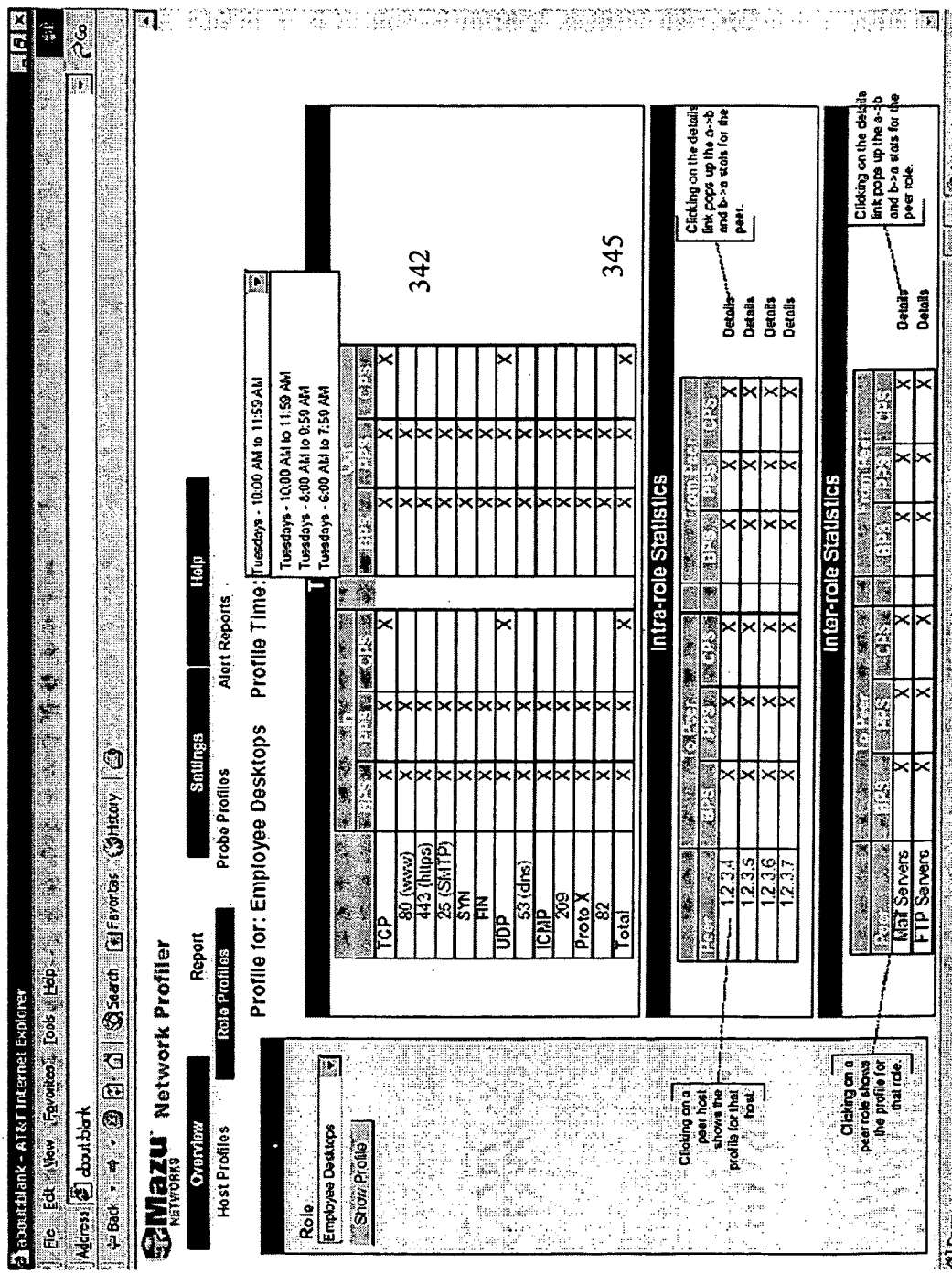

Referring to FIG. 34 a role profiles alert report 340 is shown. The role profiles alert report 340 includes a field 341 that selects a role to evaluate. The role profiles alert report 340 depicts for a specific role traffic statistics for the role in a table 342, traffic statistics for the hosts within the role in a table 344, and traffic statistics for traffic between the role and its peer roles a table 346. By clicking on a details link 345 in table 344 or a details link 347 in table 346, the user can see more detailed traffic statistics for traffic between the role and the selected peer role.

Figure 35:
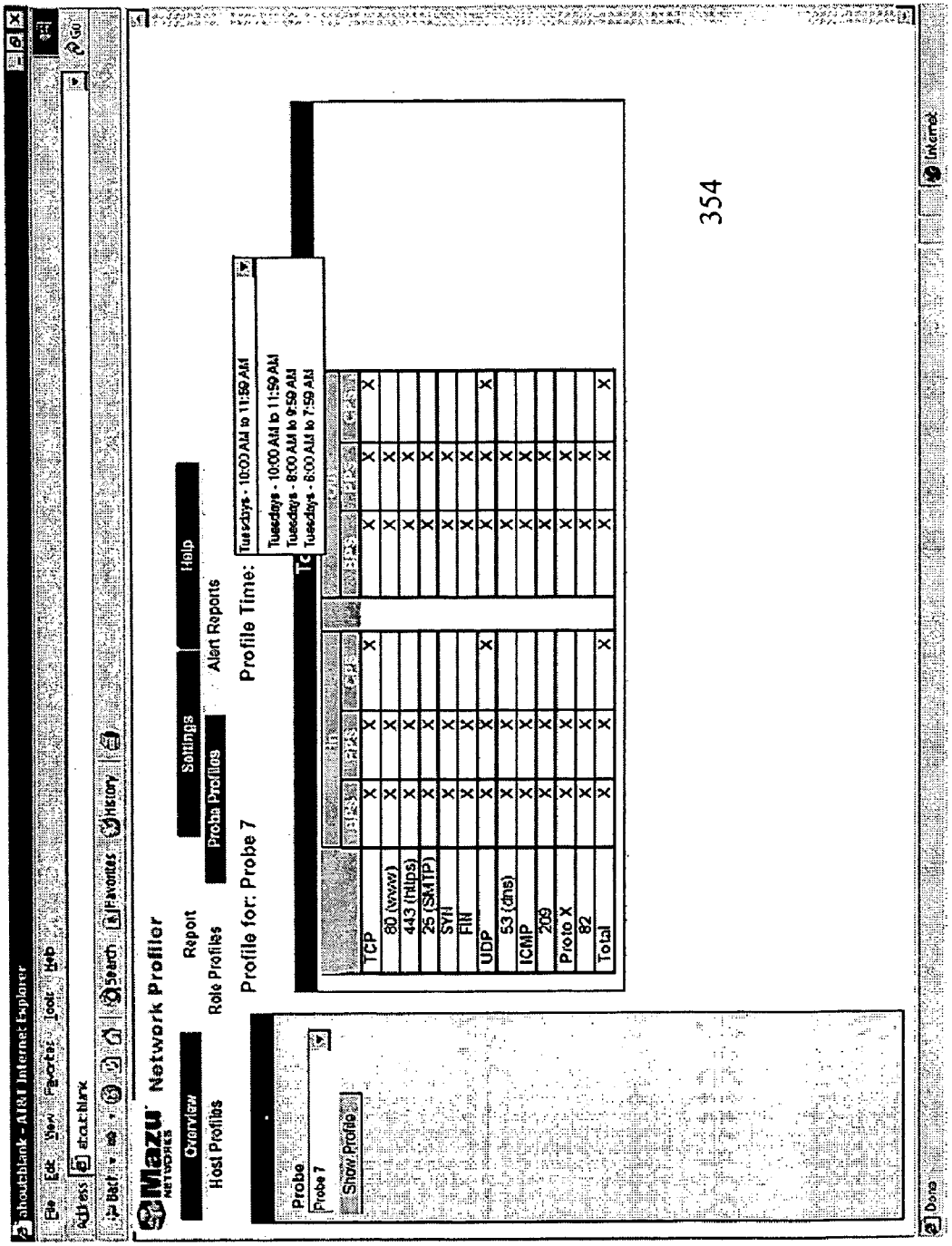

Referring to FIG. 35, a role profile report for a probe 350 is depicted. The role profile report for a probe 350 is provided by selecting a probe from a dropdown list 352 on the left side of the report 350. The user may view the traffic statistic for that probe on a protocol and in/out basis for bytes per second (BPS), packets per second (PPS) and connections per second (CPS) in table 354.

Figure 36:
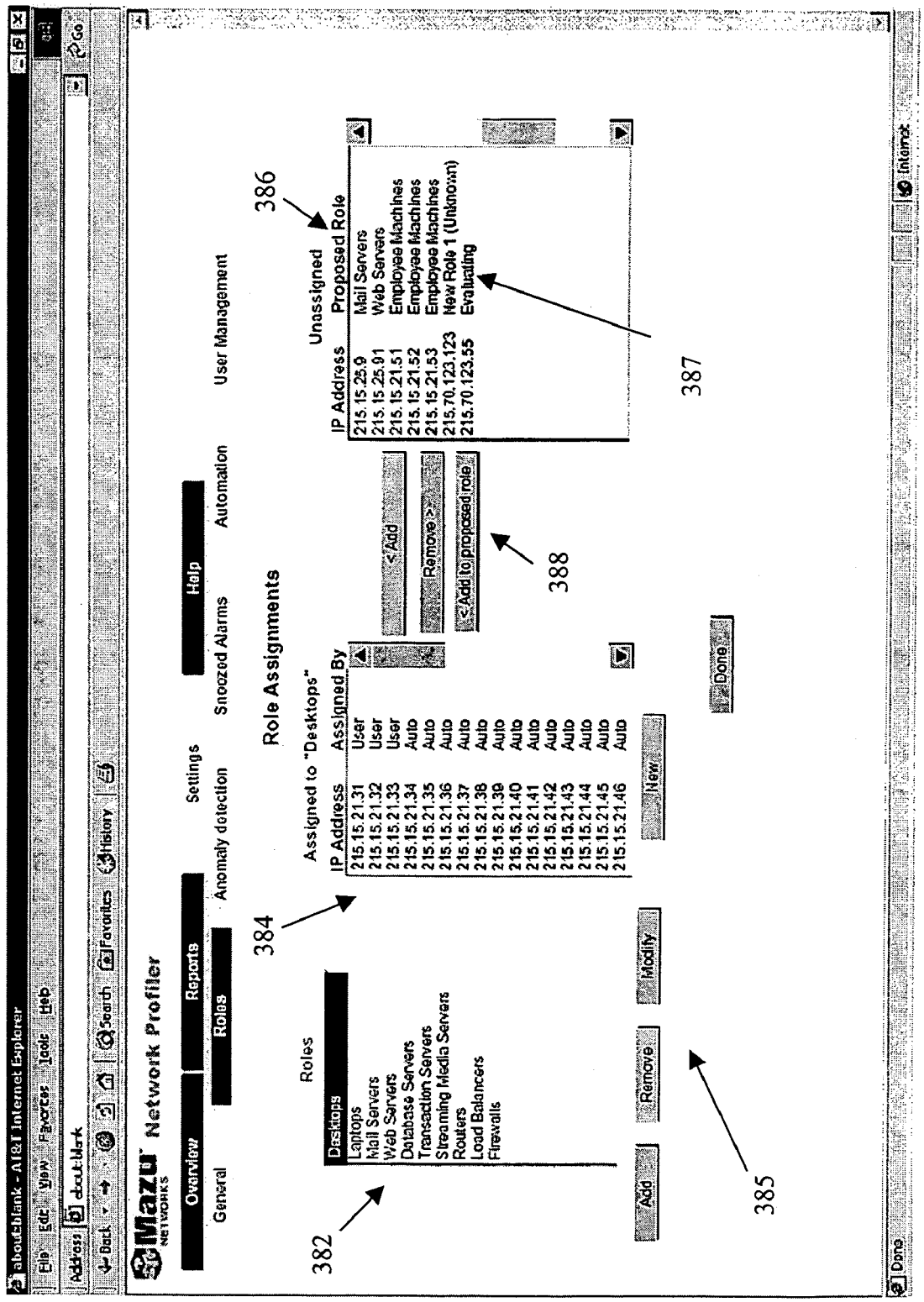

Referring to FIG. 36, roles are provided by a role grouping process as described above. The system 10 includes an interface 380 for manually defining roles and assigning defined roles to sets of hosts. To make the process efficient in large networks, the system 10 has an automated role discovery process. The system collects data from the network, analyzes the behavior of different devices and assigns devices with similar behavior, e.g., connection behavior to the same role. Once discovered, roles can be renamed or otherwise changed by the operator. When a new device appears on the network, if it matches some known role, it can be automatically assigned to that role.

The interface 380 allows role assignments to be "User selected" or "automatic." The interface 380 displays a list 382 of roles, and by selecting one of the roles, the interface 380 displays a second list 384 of assigned hosts to the particular role, along with the host's IP address. The interface 380 includes controls 385 "Add", "Remove", "Modify", and "New" which allows roles to be edited or added to.

The interface 380 also displays a list 386 of unassigned hosts and provides proposed assignments 387 of roles to the unassigned hosts, indicates that a new role needs to be produced, or that a newly discovered host is being evaluated. Controls 388 "Add", "Remove" and "Add to proposed role" control the addition of hosts in the unassigned list 386 to the roles depicted in list 382. Also, the Remove control in control set 388 allows the interface to remove a previously assigned host and place that host in the unassigned list 386. Done closes the interface 380.

Referring to FIGS. 37-40, sensitivity level settings are set at different sensitivity levels for different roles per event type.

Figure 37:
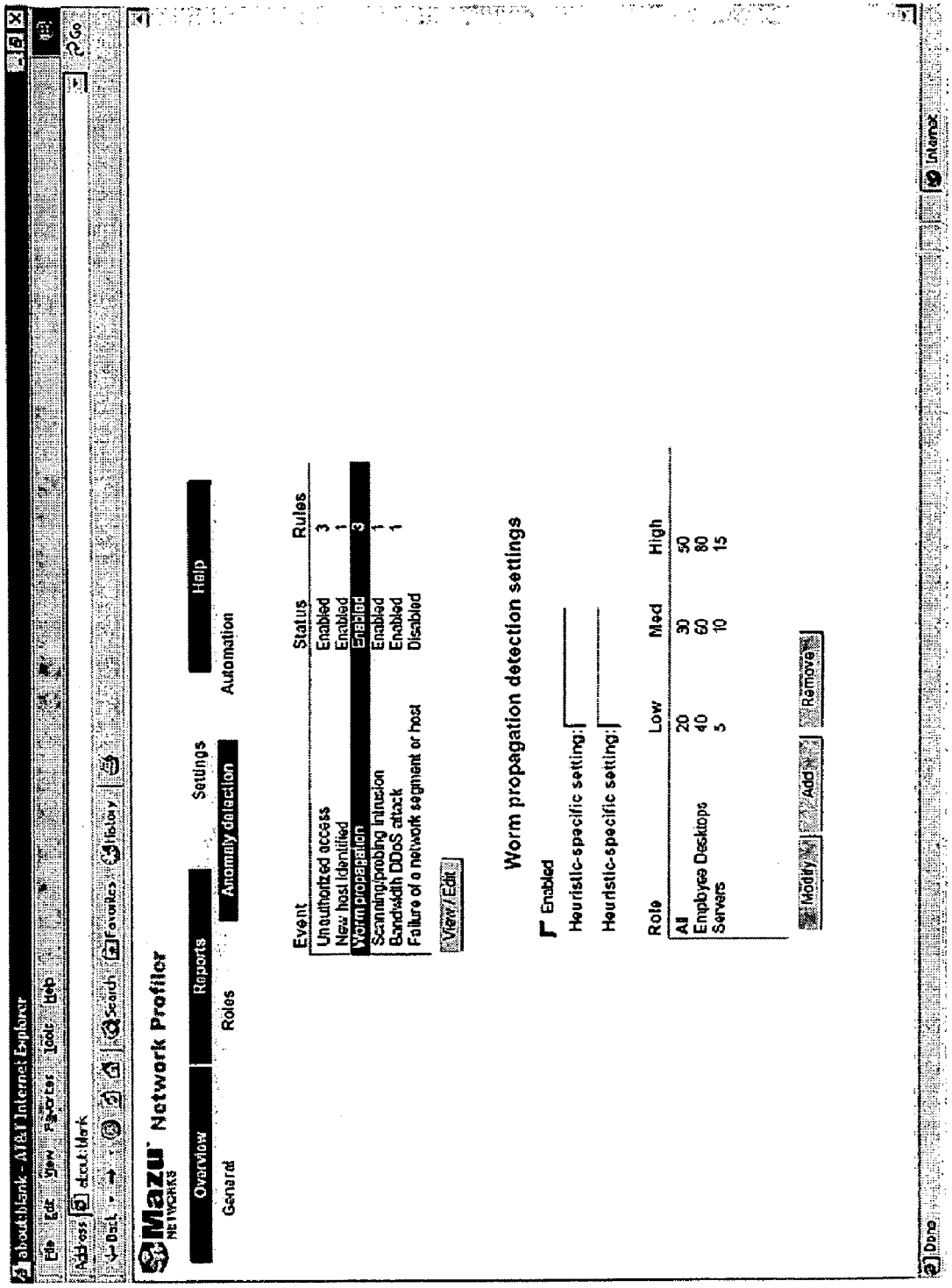
FIGS. 37-40 depicts screens for settings.

Referring to FIG. 37, various event types are depicted in the window that provides a region where event detection settings can be set. For instance, for a worm propagation event the event status rules for worm propagation can be viewed or edited. For instance, detection can be enabled for various heuristic-specific settings. The window allows a user to select an event type, and for that event, set the global, heuristic-specific variables. The system can have reasonable defaults for these parameters. Also, the window allows the user to set role-specific thresholds for low, medium, and high severities.

Figure 38:
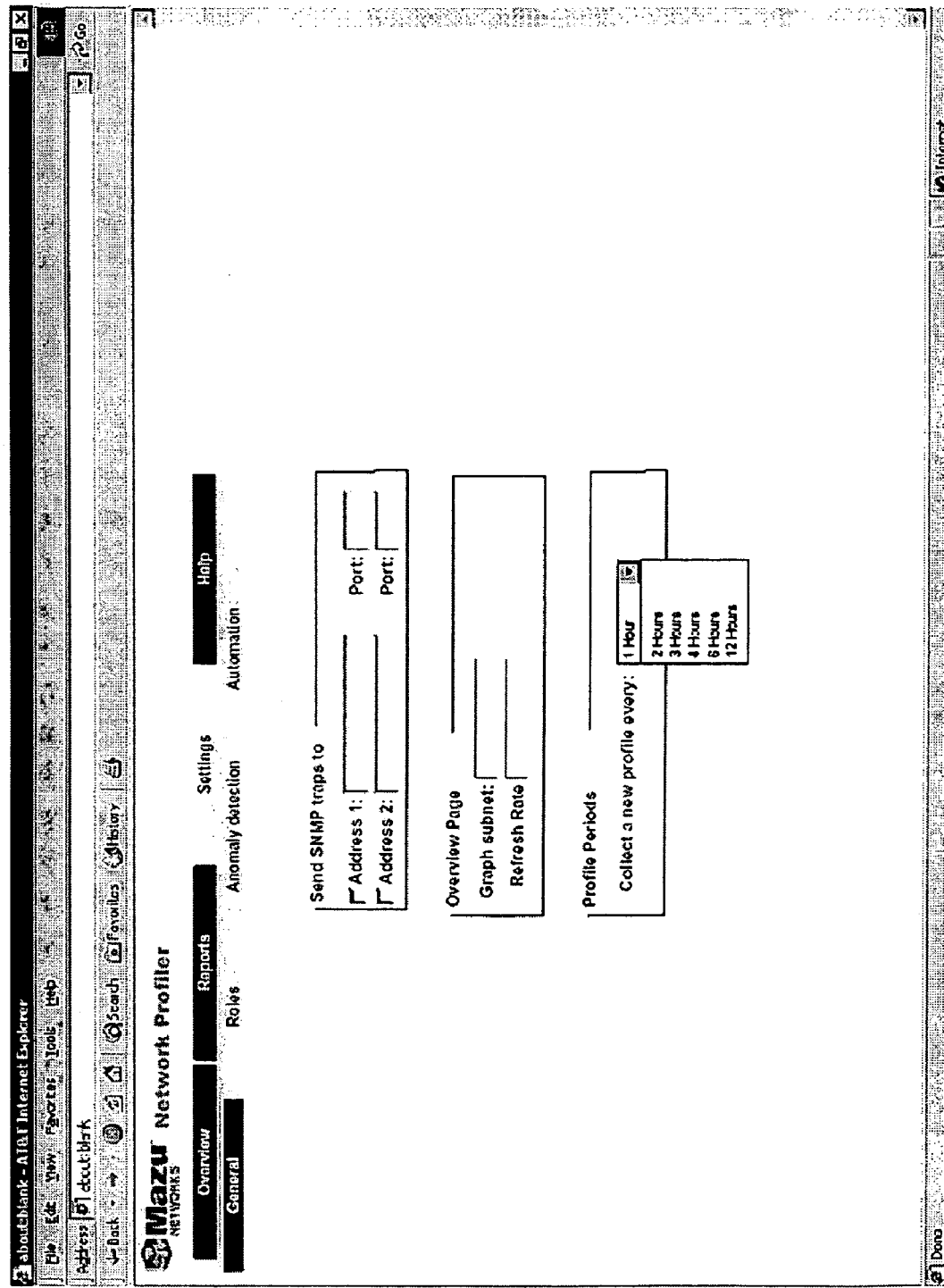

Referring to FIG. 38, a setup screen allows general settings such as specifying where to send SNMP traps to, details of the overview screen and frequency of profile periods over which to collect a new profile.

Figure 39:
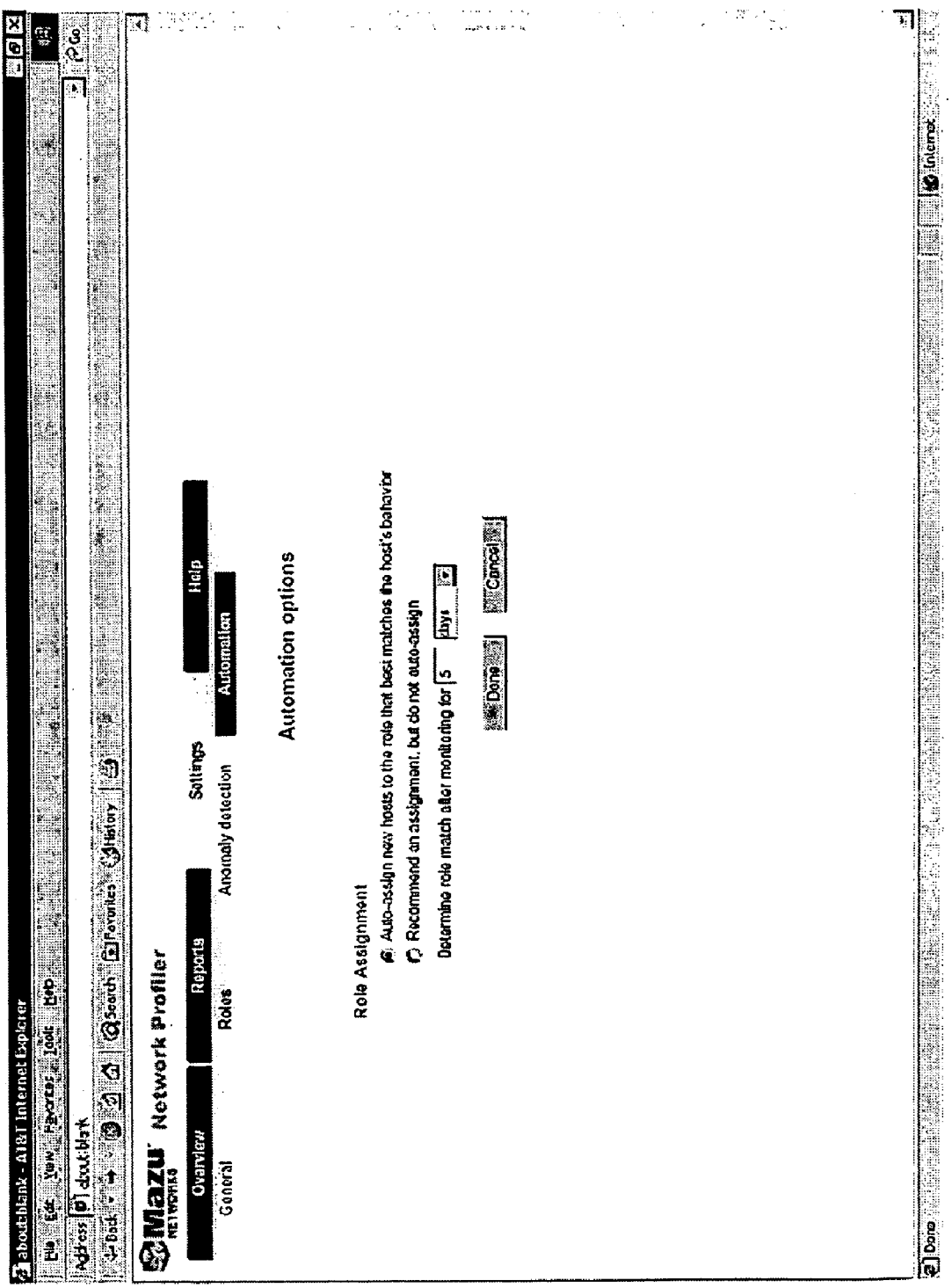

Referring to FIG. 39, a screen 420 provides automation options that allows for role management or role assignment. The user can have the system recommend an assignment but disable auto-assign, or can have the system use auto-assign to assign new hosts to the role that best matches the host's behavior. The interface can select the amount of time over which to monitor a host's connection behavior in order to determine role match. These settings allow the user to adjust the automation rules for assigning roles to groups.

Figure 40:
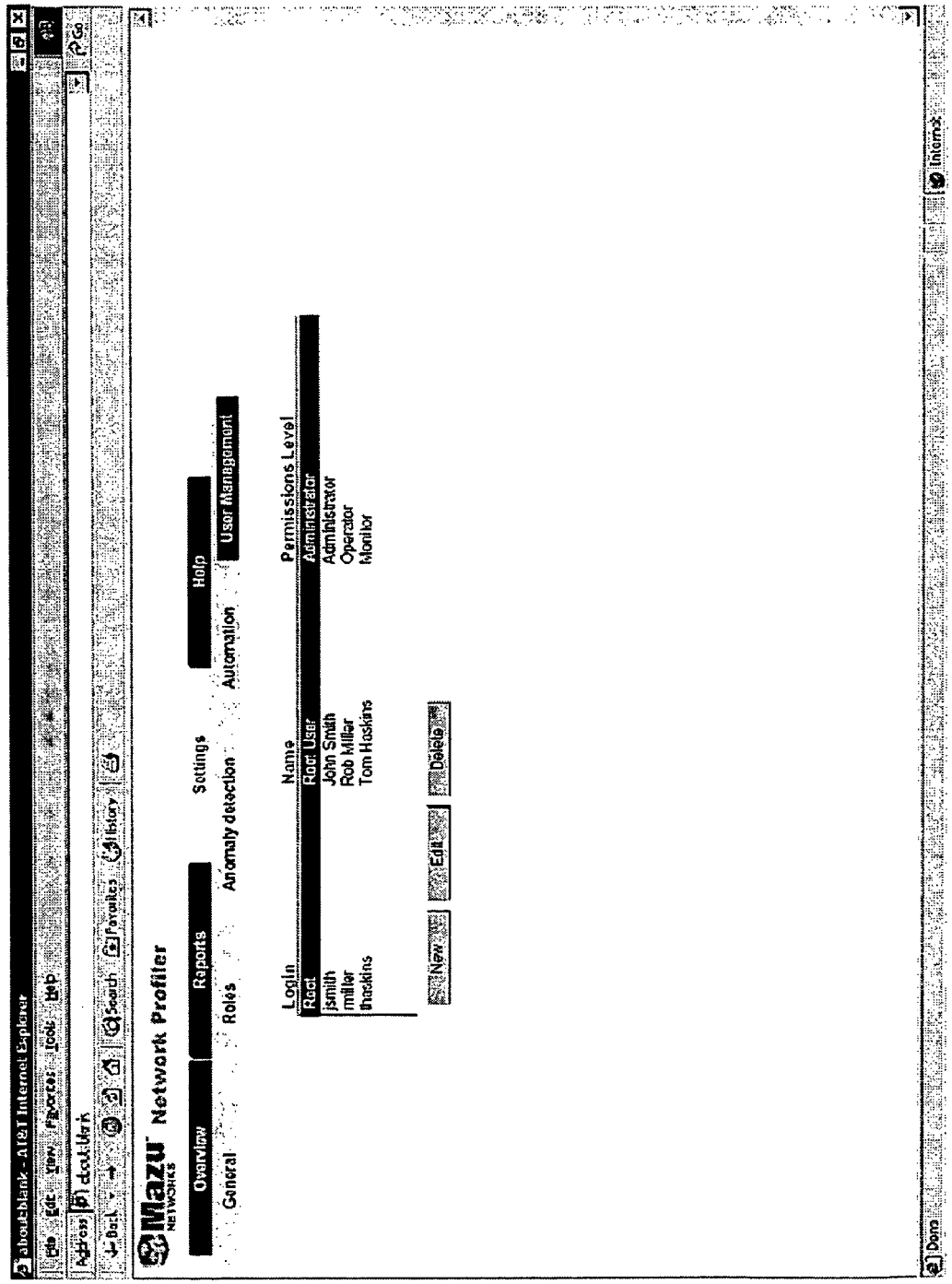

Referring to FIG. 40, a user management screen 430 allows the user to add, modify, and remove users. Users can be granted various permissions including User Level Permissions, monitor and operator. The administrator can change any setting. The operator level allows the user to snooze alerts.

A number of embodiments of the invention have been described. Nevertheless, it will be understood that various modifications may be made without departing from the spirit and scope of the invention.

What is claimed is:

1. A computer implemented method of detecting scanning attacks, comprises:
    adding host-pair connection records to a first data structure stored on a computer readable medium when a host accesses another host during a first update period;
    determining the number of new host pairs added to the first data structure over the first update period;
    aggregating host-pair connection records from the first data structure into a second data structure which corresponds to a second update period that is greater than the first update period, wherein aggregating host-pair connection records involves partitioning hosts into groups that have similar connection habits;
    determining the number of new host pairs added to the second data structure over the second update period; and
    indicating a host as a scanner when at least one of the following conditions is true:
    (1) the host appears in more than a first threshold number of host pairs within the first update period, and a first historical number of host pairs is smaller than the first threshold number by a first factor value; and
    (2) the host appears in more than a second threshold number of host pairs within the second update period, and a second historical number of host pairs is smaller than the second threshold number by a second factor value.

2. The method of claim 1 wherein the first threshold number and the first factor value are adjustable.

3. The method of claim 2 wherein the first data structure is a current time-slice connection table and host-pair connection records are added to the current time slice connection table.

4. The method of claim 3, further comprising:
    checking for ping scans at the end of the second update period; and
    indicating hosts which produced more than the second threshold number of new host pairs over the second update period.

5. The method of claim 1 further comprising:
    maintaining Address Resolution Protocol (ARP) packet statistics in the first data structure and for sparse subnets tracking the number of generated ARP requests that do not receive responses to detect scans on sparse subnetworks.

6. The method of claim 1 wherein the scanning attack is a ping scanning attack.

7. A computer implemented method of detecting port scanning attacks, the method comprises:
    retrieving from a first data structure stored on a computer readable medium logged values of protocols and ports in host-pair connection records added in the first data structure during a first update period;
    determining the number of ports associated with a host over the first update period based on the host-pair connection records in the first data structure;
    aggregating host-pair connection records from the first data structure into a second data structure which corresponds to a second update period that is greater than the first update period, wherein aggregating host-pair connection records involves partitioning hosts into groups that have similar connection habits;

determining the number of ports associated with a host over the second update period based on the host-pair connection records in the second data structure; and reporting a host associated with a port scan when at least one of the following conditions is true:

(1) the number of ports associated with the host within the first update period is greater than a first threshold number, and a first historical number of ports associated with the host is smaller than the first threshold number by a first factor value; and (2) the number of ports associated with the host within the second update period is greater than a second threshold number, and a second historical number of ports associated with the host is smaller than the second threshold number by a second factor value.

8. The method of claim 7 further comprising:

assigning a severity level to the port scan and reporting the severity level of the port scan.

9. The method of claim 7 wherein the reported severity varies as a function of the deviation from historical norm.

10. The method of claim 7 further comprising:

determining from accessing data in the first data structure, statistics about TCP reset (RST) packets and ICMP port-unreachable packets, to detect a spike in the number of RST packets and ICMP port-unreachable packets to determine the severity of a port scan event.

11. A computer program product residing on a computer readable medium for detecting scanning attacks, comprises instructions for causing a computer to:

add host-pair connection records to a first data structure when a host accesses another host during a first update period;

determine the number of new host pairs added to the first data structure over the first update period;

aggregate host-pair connection records from the first data structure into a second data structure which corresponds to a second update period that is greater than the first update period, wherein aggregating host-pair connection records involves partitioning hosts into groups that have similar connection habits;

determine the number of new host pairs added to the second data structure over the second update period; and indicate a host as a scanner when at least one of the following conditions is true:

(1) the host appears in more than a first threshold number of host pairs within the first update period, and a first historical number of host pairs is smaller than the first threshold number by a first factor value; and (2) the host appears in more than a second threshold number of host pairs within the second update period, and a second historical number of host pairs is smaller than the second threshold number by a second factor value.

12. The computer program product of claim 11 wherein the first threshold number and the first factor value are adjustable.

13. The computer program product of claim 11 wherein the first data structure is a current time-slice connection table and host-pair connection records are added to the current time slice connection table.

14. The computer program product of claim 13, further comprising instructions to:

check for ping scans at the end of a the second update period; and indicate hosts which produced more than the second threshold number of new host pairs over the second update period.

15. The computer program product of claim 11 further comprising instructions to:

maintain Address Resolution Protocol (ARP) packet statistics in the first data structure; and track the number of generated ARP requests that do not receive responses to detect scans on sparse sub-networks.

16. A computer program product residing on a computer readable medium for detecting port scanning attacks, the computer program product comprises instructions for causing a processor to:

retrieve from a first data structure logged values of protocols and ports in host-pair connection records in the first data structure during a first update period;

determine the number of ports associated with a host over the first update period based on the host-pair connection records in the first data structure;

aggregate host-pair connection records from the first data structure into a second data structure which corresponds to a second update period that is greater than the first update period, wherein aggregating host-pair connection records involves partitioning hosts into groups that have similar connection habits;

determine the number of ports associated with a host over the second update period based on the host-pair connection records in the second data structure; and report a host associated with a port scan when at least one of the following conditions is true:

(1) the number of ports associated with the host within the first update period is greater than a first threshold number, and a first historical number of ports associated with the host is smaller than the first threshold number by a first factor value; and (2) the number of ports associated with the host within the second update period is greater than a second threshold number, and a second historical number of ports associated with the host is smaller than the second threshold number by a second factor value.

17. The computer program product of claim 16 further comprising instructions to:

assign a severity level to the port scan and report the severity level of the port scan.

18. The computer program product of claim 17 wherein the reported severity varies as a function of the deviation from historical norm.

19. The computer program product of claim 17 further comprising instructions to:

determine from the first data structure statistics about TCP reset (RST) packets and ICMP port-unreachable packets to detect a spike in the number of RST packets and ICMP port-unreachable packets to determine the severity of a port scan event.

20. Apparatus comprising:

circuitry for detecting scanning attacks, comprising:

circuitry to add host-pair connection records to a first data structure when a host accesses another host during a first update period;

circuitry to determine the number of new host pairs added to the first data structure over a first update period;

circuitry to aggregate host-pair connection records from the first data structure into a second data structure which corresponds to a second update period that is greater than the first update period, wherein aggregating host-pair connection records involves partitioning hosts into groups that have similar connection habits;

circuitry to determine the number of new host pairs added to the second data structure over the second update period; and circuitry to indicate a host as a scanner when at least one of the following conditions is true:

(1) the host appears in more than a first threshold number of host pairs within the first update period, and a first historical number of host pairs is smaller than the first threshold number by a first factor value; and (2) the host appears in more than a second threshold number of host pairs within the second update period, and a second historical number of host pairs is smaller than the second threshold number by a second factor value.

21. The apparatus of claim 20 wherein the first threshold number and the first factor value are adjustable.

22. The apparatus of claim 20 wherein the first data structure is a current time-slice connection table and host-pair connection records are added to the current time slice connection table.

23. The apparatus of claim 20, further comprising:
circuitry to check for ping scans at the end of a second update period; and
circuitry to indicate hosts which produced more than the second threshold number of new host pairs over the second update period.

24. Apparatus comprising:
a processing device; and
a computer readable medium tangible embodying a computer program product for detecting scanning attacks, the computer program product comprising instructions for causing the processing device to:
add host-pair connection records to a first data structure when a host accesses another host during a first update period;
determine the number of new host pairs added to the first data structure over the first update period;
aggregate host-pair connection records from the first data structure into a second data structure which corresponds to a second update period that is greater than the first update period, wherein aggregating host-pair connection records involves partitioning hosts into groups that have similar connection habits;
determine the number of new host pairs added to the second data structure over the second update period; and
indicate a host as a scanner when at least one of the following conditions is true:
(1) the host appears in more than a first threshold number of host pairs within the first update period, and a first historical number of host pairs is smaller than the first threshold number by a first factor value; and
(2) the host appears in more than a second threshold number of host pairs within the second update period, and a second historical number of host pairs is smaller than the second threshold number by a second factor value.

25. The apparatus of claim 24 wherein the first threshold number and the first factor value are adjustable.

26. The apparatus of claim 24 wherein the first data structure is a current time-slice connection table and host-pair connection records are added to the current time slice connection table.

27. The apparatus of claim 24, wherein the computer program product further comprises instructions to:
check for ping scans at the end of a second update period; and
indicate hosts which produced more than second threshold number of new host pairs over the second update period.

28. Apparatus comprising:
a processing device;
a computer readable medium tangibly embodying a computer program product for detecting port scanning attacks, the computer program product comprises instructions for causing a processor to:
retrieve from a first data structure logged values of protocols and ports in host-pair connection records in the first data structure during a first update period;
determine the number of ports associated with a host over the first update period based on the host-pair connection records in the first data structure;
aggregate host-pair connection records from the first data structure into a second data structure which corresponds to a second update period that is greater than the first update period, wherein aggregating host-pair connection records involves partitioning hosts into groups that have similar connection habits;
determine the number of ports associated with a host over the second update period based on the host-pair connection records in the second data structure; and
report a host associated with a port scan when at least one of the following conditions is true:
(1) the number of ports associated with the host within the first update period is greater than a first threshold number, and a first historical number of ports associated with the host is smaller than the first threshold number by a first factor value; and
(2) the number of ports associated with the host within the second update period is greater than a second threshold number, and a second historical number of ports associated with the host is smaller than the second threshold number by a second factor value.

29. The apparatus of claim 28 further comprising instructions to:
assign a severity level to the port scan and report the severity level of the port scan.

30. The apparatus of claim 29 wherein the reported severity varies as a function of the deviation from a historical norm.

31. The apparatus of claim 29 further comprising instructions to:
determine from the first data structure statistics about TCP reset (RST) packets and ICMP port-unreachable packets to detect a spike in the number of RST packets and ICMP port-unreachable packets to determine the severity of a port scan event.

32. A computer implemented method of detecting scanning attacks, comprises:
adding host-pair connection records to a first data structure stored on a computer readable medium when a host accesses another host during a first update period;
determining the number of new host pairs added to the first data structure over the first update period;
aggregating host-pair connection records from the first data structure into a second data structure which corresponds to a second update period that is greater than the first update period, wherein aggregating host-pair connection records involves partitioning hosts into groups that have similar connection habits;
determining the number of new host pairs added to the second data structure over the second update period; and
indicating a host as a scanner when the host appears in more than a first threshold number of host pairs within the first update period, and a first historical number of host pairs is smaller than the first threshold number by a first factor value.

33. A computer implemented method of detecting scanning attacks, comprises:
- adding host-pair connection records to a first data structure stored on a computer readable medium when a host accesses another host during a first update period;
- determining the number of new host pairs added to the first data structure over the first update period;
- aggregating host-pair connection records from the first data structure into a second data structure which corresponds to a second update period that is greater than the first update period, wherein aggregating host-pair connection records involves partitioning hosts into groups that have similar connection habits;
- determining the number of new host pairs added to the second data structure over the second update period; and
- indicating a host as a scanner when the host appears in more than a second threshold number of host pairs within the second update period, and a second historical number of host pairs is smaller than the second threshold number by a second factor value.

34. A computer implemented method of detecting port scanning attacks, the method comprises:
- retrieving from a first data structure stored on a computer readable medium logged values of protocols and ports in host-pair connection records added in the first data structure during a first update period;
- determining the number of ports associated with a host over the first update period based on the host-pair connection records in the first data structure;
- aggregating host-pair connection records from the first data structure into a second data structure which corresponds to a second update period that is greater than the first update period, wherein aggregating host-pair connection records involves partitioning hosts into groups that have similar connection habits;
- determining the number of ports associated with a host over the second update period based on the host-pair connection records in the second data structure; and
- reporting a host associated with a port scan when the number of ports associated with the host within the first update period is greater than a first threshold number, and a first historical number of ports associated with the host is smaller than the first threshold number by a first factor value.

35. A computer implemented method of detecting port scanning attacks, the method comprises:
- retrieving from a first data structure stored on a computer readable medium logged values of protocols and ports in host-pair connection records added in the first data structure during a first update period;
- determining the number of ports associated with a host over the first update period based on the host-pair connection records in the first data structure;
- aggregating host-pair connection records from the first data structure into a second data structure which corresponds to a second update period that is greater than the first update period, wherein aggregating host-pair connection records involves partitioning hosts into groups that have similar connection habits;
- determining the number of ports associated with a host over the second update period based on the host-pair connection records in the second data structure; and
- reporting a host associated with a port scan when the number of ports associated with the host within the second update period is greater than a second threshold number, and a second historical number of ports associated with the host is smaller than the second threshold number by a second factor value.

* * * * *